US012604302B2

(12) United States Patent　　　　　(10) Patent No.:　US 12,604,302 B2
Lim et al.　　　　　　　　　　　　　　　(45) Date of Patent:　　Apr. 14, 2026

(54) ELECTRONIC DEVICE AND METHOD FOR PROVIDING MODULATION COMPRESSION INFORMATION IN FRONTHAUL INTERFACE

(71) Applicant: Samsung Electronics Co., Ltd., Suwon-si (KR)

(72) Inventors: Hyoungjin Lim, Suwon-si (KR); Song Kim, Suwon-si (KR); Hyeri Bang, Suwon-si (KR); Jongho Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 18/495,351

(22) Filed: Oct. 26, 2023

(65) Prior Publication Data

US 2024/0137912 A1　　Apr. 25, 2024

Related U.S. Application Data

(63) Continuation of application No. PCT/KR2023/015886, filed on Oct. 13, 2023.

(30) Foreign Application Priority Data

Oct. 14, 2022　(KR) ........................ 10-2022-0132782
Nov. 9, 2022　(KR) ........................ 10-2022-0149104
(Continued)

(51) Int. Cl.
　H04W 72/04　　　(2023.01)
　H04L 1/00　　　　(2006.01)
　　　　　(Continued)

(52) U.S. Cl.
　CPC ........... H04W 72/04 (2013.01); H04L 1/0003 (2013.01); H04L 1/0006 (2013.01);
　　　　　(Continued)

(58) Field of Classification Search
　CPC ............ H04W 72/04; H04W 72/0446; H04W 72/0453; H04L 1/0003; H04L 1/0006; H04L 5/0007; H04L 27/2602
　See application file for complete search history.

(56) References Cited

U.S. PATENT DOCUMENTS 11,612,016 B2　　3/2023　Raghothaman et al.
11,778,632 B2　　10/2023　Jeon et al.
　　　　　(Continued)

FOREIGN PATENT DOCUMENTS

CN　　　　115777222 A　　　3/2023
KR　　10-2021-0046486 A　　4/2021
　　　　　(Continued)

OTHER PUBLICATIONS

O-RAN Working Group 4 (Open Fronthaul Interfaces WG) Control, User and Synchronization Plane Specification, O-RAN.WG4.CUS. 0-v09.00, 2022.
(Continued)

*Primary Examiner* — Nam T Huynh
(74) *Attorney, Agent, or Firm* — Jefferson IP Law, LLP

(57)　　　　　ABSTRACT

A method performed by a distributed unit (DU) in a wireless communication system is provided. The method includes identifying a subblock in one section. The method includes generating a control plane (C-plane) message including section extension information including modulation compression information corresponding to the subblock. The method includes transmitting, to a radio unit (RU), the C-plane message through a fronthaul interface.

22 Claims, 18 Drawing Sheets

(30) Foreign Application Priority Data

| Nov. 25, 2022 | (KR) | ......................... | 10-2022-0160967 |
| Apr. 7, 2023 | (KR) | ......................... | 10-2023-0046404 |

(51) Int. Cl.

| | |
|---|---|
| *H04L 5/00* | (2006.01) |
| *H04L 27/26* | (2006.01) |
| *H04W 72/0446* | (2023.01) |
| *H04W 72/0453* | (2023.01) |

(52) U.S. Cl.

CPC ........ *H04L 5/0007* (2013.01); *H04L 27/2602* (2013.01); *H04W 72/0446* (2013.01); *H04W 72/0453* (2013.01)

(56) References Cited

U.S. PATENT DOCUMENTS

| | | | |
|---|---|---|---|
| 12,047,785 | B2 | 7/2024 | Salahuddeen et al. |
| 12,507,230 | B2 | 12/2025 | Singh et al. |
| 2021/0273704 | A1 | 9/2021 | Ahmed et al. |
| 2021/0352526 | A1 | 11/2021 | Kim et al. |
| 2022/0078631 | A1 | 3/2022 | Salahuddeen et al. |
| 2023/0224118 | A1 | 7/2023 | Lim et al. |
| 2023/0328712 | A1* | 10/2023 | Singh ................... H04L 5/0092 |
| | | | 370/329 |
| 2023/0336295 | A1 | 10/2023 | Sung et al. |

FOREIGN PATENT DOCUMENTS

| | | | |
|---|---|---|---|
| KR | 10-2022-0037305 | A | 3/2022 |
| WO | 2021/234739 | A1 | 11/2021 |
| WO | 2022/005709 | A1 | 1/2022 |
| WO | 2022/015598 | A1 | 1/2022 |
| WO | 2022/015659 | A1 | 1/2022 |
| WO | 2022/046980 | A2 | 3/2022 |
| WO | 2022/055988 | A1 | 3/2022 |
| WO | 2023/243876 | A1 | 12/2023 |
| WO | 2024/014735 | A1 | 1/2024 |

OTHER PUBLICATIONS

3rd Generation Partnership Project; Technical Specification Group Radio Access Network; NR; Physical channels and modulation (Release 18), 3GPP TS 38.211 V18.0.0 (Sep. 2023).

3rd Generation Partnership Project; Technical Specification Group Radio Access Network; NR; Base Station (BS) radio transmission and reception (Release 18), 3GPP TS 38.104 V18.3.0 (Sep. 2023).

International Search Report dated Feb. 2, 2024, issued in International Application No. PCT/KR2023/015886.

Japanese Office Action dated Jan. 6, 2026, issued in Japanese Application No. 2025-521375.

European Search Report dated Jan. 14, 2026, issued in European Application No. 23877771.8.

* cited by examiner

DU (210)                                    RU (220)

M-PLANE MESSAGE (601)

MC CHUNK-BASED SCHEDULING
(603)

C-PLANE MESSAGE INCLUDING COMPRESSION
INFORMATION FOR MC CHUNK (605)

U-PLANE MESSAGE (607)

700

800 numPrbc (810)

Symbol chunk #(0,0)
numMcSymbol(0,0)
(831)

Symbol chunk #(0,1)
numMcSymbol(0,1)
(832)

Symbol chunk #(1,0)
numMcSymbol(1,0)
(833)

Symbol chunk #(2,0)
numMcSymbol(2,0)
(834)

Symbol chunk #(2,1)
numMcSymbol(2,1)
(835)

numSymbol (820)

Prb chunk #0
numMcPrbc(0)
(811)

Prb chunk #1
numMcPrbc(1)
(812)

Prb chunk #2
numMcPrbc(2)
(813)

900

950

| MC chunk #(0) numMcSymbol(0) numMcPrbc(0) (931) | MC chunk #(1) numMcSymbol(1) numMcPrbc(1) (932) |
|---|---|
| MC chunk #(2) numMcSymbol(2) numMcPrbc(2) (933) ||

ELECTRONIC DEVICE AND METHOD FOR PROVIDING MODULATION COMPRESSION INFORMATION IN FRONTHAUL INTERFACE

CROSS-REFERENCE TO RELATED APPLICATION(S)

This application is a continuation application, claiming priority under § 365(c), of an International application No. PCT/KR2023/015886, filed on Oct. 13, 2023, which is based on and claims the benefit of a Korean patent application number 10-2022-0132782, filed on Oct. 14, 2022, in the Korean Intellectual Property Office, of a Korean patent application number 10-2022-0149104, filed on Nov. 9, 2022, in the Korean Intellectual Property Office, of a Korean patent application number 10-2022-0160967, filed on Nov. 25, 2022, in the Korean Intellectual Property Office, and of a Korean patent application number 10-2023-0046404, filed on Apr. 7, 2023, in the Korean Intellectual Property Office, the disclosure of each of which is incorporated by reference herein in its entirety.

TECHNICAL FIELD

The disclosure relates to a fronthaul interface. More particularly, the disclosure relates to an electronic device and a method for providing modulation compression information in a fronthaul interface.

BACKGROUND ART

Along with increasement of transmission capacity in wireless communication systems, a function split that functionally separates a base station is being applied. According to such a function split, the base station may be split into a distributed unit (DU) and a radio unit (RU). A fronthaul interface is defined for communications between the DU and the RU.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an electronic device and a method for providing modulation compression information in a fronthaul interface.

Additional aspects will be set forth in part in the description which follows and, in part, will be apparent from the description, or may be learned by practice of the presented embodiments.

In accordance with an aspect of the disclosure, a method performed by a distributed unit (DU) in a wireless communication system is provided. The method may include identifying a subblock in one section. The method may include generating a control plane (C-plane) message including section extension information including modulation compression information corresponding to the subblock. The method may include transmitting, to a radio unit (RU), the C-plane message through a fronthaul interface. The modulation compression information may include a flag for indicating whether a constellation for the subblock is shifted or not and scale information to be applied to the subblock. The section extension information may include information for indicating the number of one or more symbols of the subblock and information for indicating the number of one or more physical resource blocks (PRBs) of the subblock.

In accordance with aspect of the disclosure, a method performed by a radio unit (RU) is provided. The method may include receiving, from a distributed unit (DU) through a fronthaul interface, a control plane (C-plane) message including section extension information. The method may include identifying modulation compression information corresponding to a subblock in one section. The modulation compression information may include a flag for indicating whether a constellation for the subblock is shifted or not and scale information to be applied to the subblock. The section extension information may include information for indicating the number of one or more symbols of the subblock and information for indicating the number of one or more physical resource blocks (PRBs) of the subblock.

In accordance with aspect of the disclosure, an electronic device of a distributed unit (DU) in a wireless communication system is provided. The electronic device includes at least one transceiver and at least one processor coupled to the at least one transceiver. The at least one processor may be configured to identify a subblock in one section. The at least one processor may be configured to generate a control plane (C-plane) message including section extension information including modulation compression information corresponding to the subblock. The at least one processor may be configured to transmit, to a radio unit (RU), the C-plane message through a fronthaul interface. The modulation compression information may include a flag for indicating whether a constellation for the subblock is shifted or not and scale information to be applied to the subblock. The section extension information includes information for indicating the number of one or more symbols of the subblock and the number of one or more physical resource blocks (PRBs) of the subblock.

In accordance with aspect of the disclosure, an electronic device of a radio unit (RU) in a wireless communication system is provided. The electronic device includes at least one transceiver and at least one processor coupled to the at least one transceiver. The at least one processor may be configured to receive, from a distributed unit (DU) through a fronthaul interface, a control plane (C-plane) message including section extension information. The at least one processor may be configured to identify modulation compression information corresponding to a subblock in one section. The modulation compression information may include a flag for indicating whether a constellation for the subblock is shifted or not and scale information to be applied to the subblock. The section extension information may include information for indicating the number of one or more symbols of the subblock and information for indicating the number of one or more physical resource blocks (PRBs) of the subblock.

In accordance with aspect of the disclosure, a method performed by a distributed unit (DU) is provided. The method comprises generating a control plane (C-plane) message including section extension information for modulation compression. The method comprises transmitting, to a radio unit (RU), the C-plane message through a fronthaul interface. The section extension information for the modulation compression includes information for indicating the number of one or more subblocks for the modulation compression, first symbol information for indicating one or more symbols of a first subblock of the one or more subblocks, first physical resource block (PRB) information for indicating one or more PRBs in the first subblock, a first flag for indicating whether a constellation for the first subblock is shifted or not, first scale offset information for indicating a first scale value to be applied to the first subblock, and first remask information for indicating whether the first scale value is applied for each resource element (RE) in a PRB in the first subblock.

In accordance with aspect of the disclosure, a method performed by a radio unit (RU) is provided. The method comprises receiving, from a distributed unit through a fronthaul interface, a control plane (C-plane) message including section extension information for modulation compression. The section extension information for the modulation compression includes information for indicating the number of one or more subblocks for the modulation compression, first symbol information for indicating one or more symbols of a first subblock of the one or more subblocks, first physical resource block (PRB) information for indicating one or more PRBs in the first subblock, a first flag for indicating whether a constellation for the first subblock is shifted or not, first scale offset information for indicating a first scale value to be applied to the first subblock, and first remask information for indicating whether the first scale value is applied for each resource element (RE) in a PRB in the first subblock.

In accordance with aspect of the disclosure, an electronic device of a distributed unit (DU) is provided. The electronic device comprises at least one transceiver for a fronthaul interface, at least one processor, and memory configured to store program instructions. The instructions, when executed by the at least one processor, cause the electronic device to perform functions comprising generating a control plane (C-plane) message including section extension information for modulation compression and transmitting, to a radio unit (RU), the C-plane message through the fronthaul interface. The section extension information for the modulation compression includes information for indicating the number of one or more subblocks for the modulation compression, first symbol information for indicating one or more symbols of a first subblock of the one or more subblocks, first physical resource block (PRB) information for indicating one or more PRBs in the first subblock, a first flag for indicating whether a constellation for the first subblock is shifted or not, first scale offset information for indicating a first scale value to be applied to the first subblock, and first remask information for indicating whether the first scale value is applied for each resource element (RE) in a PRB in the first subblock.

In accordance with aspect of the disclosure, an electronic device of a radio unit (RU) is provided. The electronic device comprises at least one transceiver for a fronthaul interface, at least one processor, and memory configured to store program instructions. The instructions, when executed by the at least one processor, cause the electronic device to perform functions comprising receiving, from a distributed unit (DU) through the fronthaul interface, a control plane (C-plane) message including section extension information for modulation compression. The section extension information for the modulation compression includes information for indicating the number of one or more subblocks for the modulation compression, first symbol information for indicating one or more symbols of a first subblock of the one or more subblocks, first physical resource block (PRB) information for indicating one or more PRBs in the first subblock, a first flag for indicating whether a constellation for the first subblock is shifted or not, first scale offset information for indicating a first scale value to be applied to the first subblock, and first remask information for indicating whether the first scale value is applied for each resource element (RE) in a PRB in the first subblock.

In accordance with aspect of the disclosure, a non-transitory computer-readable medium comprising memory storing a program including instructions is provided. When the instructions are executed by one or more processors, the instructions cause a distributed unit (DU) to generate a control plane (C-plane) message including section extension information for modulation compression and transmitting, to a radio unit (RU), the C-plane message through a fronthaul interface. The section extension information for modulation compression includes information for indicating the number of one or more subblocks for the modulation compression, first symbol information for indicating one or more symbols of a first subblock of the one or more subblocks, first physical resource block (PRB) information for indicating one or more PRBs in the first subblock, a first flag for indicating whether a constellation for the first subblock is shifted or not, first scale offset information for indicating a first scale value to be applied to the first subblock, and first remask information for indicating whether the first scale value is applied for each resource element (RE) in a PRB in the first subblock.

In accordance with aspect of the disclosure, a non-transitory computer-readable medium comprising memory storing a program including instructions is provided. When the instructions are executed by one or more processors, the instructions cause a radio unit (RU) to receive, from a distributed unit (DU) through a fronthaul interface, a control plane (C-plane) message including section extension information for modulation compression. The section extension information for modulation compression includes information for indicating the number of one or more subblocks for the modulation compression, first symbol information for indicating one or more symbols of a first subblock of the one or more subblocks, first physical resource block (PRB) information for indicating one or more PRBs in the first subblock, a first flag for indicating whether a constellation for the first subblock is shifted or not, first scale offset information for indicating a first scale value to be applied to the first subblock, and first remask information for indicating whether the first scale value is applied for each resource element (RE) in a PRB in the first subblock.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
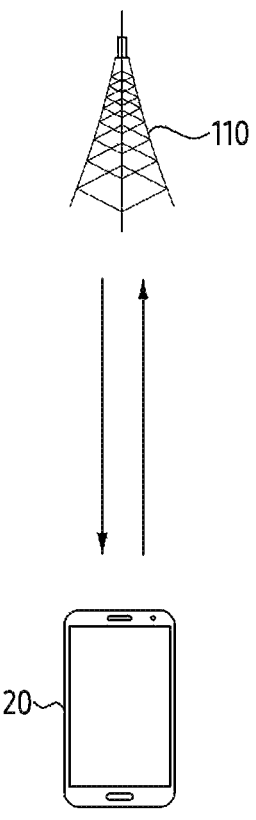
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various examples of the disclosure described below, a hardware approach will be described as an example. However, since various embodiments of the disclosure may include the technology that utilizes both the hardware-based approach and the software-based approach, they are not intended to exclude the software-based approach.

As used in the following description, the terms referring to a signal (e.g., packet, message, signal, information, signaling), the terms referring to a resource (e.g. section, symbol, slot, subframe, radio frame, subcarrier, resource element (RE), resource block (RB), bandwidth part (BWP), opportunity), the terms referring to an operation state (e.g., step, operation, procedure), the terms referring to data (e.g. packet, message, user stream, information, bit, symbol, codeword), the terms referring to a channel, the terms referring to a network entity (distributed unit (DU), radio unit (RU), central unit (CU), control plane (CU-CP), user plane (CU-UP), open radio access network (O-RAN) DU (O-DU), O-RAN RU (O-RU), O-RAN CU (O-CU), O-RAN CU-CP (O-CU-UP), O-RAN CU-CP (O-CU-CP)), the terms referring to components of an apparatus or device, or the like are only illustrated for convenience of description in the disclosure. Therefore, the disclosure is not limited to those terms described below, and other terms having the same or equivalent technical meaning may be used therefor. Further, as used herein, the terms such as '~module', '~unit', '~section', '~part', '~body', or the like may refer to at least one shape of structure or a unit for processing a certain function.

Further, throughout the disclosure, an expression such as e.g., 'above' or 'below' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with an expression such as 'above', a condition described as 'less than or equal to' may be replaced with an expression such as 'below', and a condition described as 'more than or equal to and below' may be replaced with 'above and less than or equal to', respectively. Furthermore, hereinafter, 'A' to 'B' means at least one of the elements from A (including A) to B (including B). Hereinafter, 'C' and/or 'D' means including at least one of 'C' or 'D', that is, {'C', 'D', or 'C' and 'D'}.

The disclosure describes various embodiments using terms used in some communication standards (e.g., 3rd Generation Partnership Project (3GPP), extensible radio access network (xRAN), open-radio access network (O-RAN) or the like), but they are only of an example for explanation. The various embodiments of the disclosure may be easily modified even in other communication systems and applied thereto.

FIG. 1 illustrates a wireless communication system according to an embodiment of the disclosure.

Referring to FIG. 1, the wireless communication system includes a base station 110 and a terminal 120 as a part of nodes using a wireless channel. Although FIG. 1 illustrates only one base station, the wireless communication system may further include another base station that is the same as or similar to the base station 110.

The base station 110 is a network infrastructure that provides wireless access to the terminal 120. The base station 110 may have a coverage defined based on a range capable of transmitting a signal. In addition to the term 'base station', the base station 110 may be referred to as 'access point (AP)', 'eNodeB (eNB)', '5th generation node', 'next generation nodeB (gNB)', 'wireless point', 'transmission/reception point (TRP)', or any other terms having the same or equivalent meaning thereto.

The terminal 120, which is a device used by a user, performs communications with the base station 110 via a wireless channel. A link from the base station 110 to the terminal 120 is referred to as a downlink (DL), and a link from the terminal 120 to the base station 110 is referred to as an uplink (UL). Further, although not shown in FIG. 1, the terminal 120 and other terminals may perform communications with each other through the wireless channel. In this context, a link between the terminal 120 and another terminal (device-to-device link, D2D) is referred to as a side link, and the side link may be used mixed with a PC5 interface. In some other embodiments, the terminal 120 may be operated without any involvement by a user. According to an embodiment of the disclosure, the terminal 120, which may be a device that performs machine-type communication (MTC), may not be carried by a user. According to another embodiment, the terminal 120 may be a narrowband (NB)-Internet of things (IoT) device.

The terminal 120 may be referred to as 'user equipment (UE), 'customer premises equipment (CPE)', 'mobile station', 'subscriber station', 'remote terminal', 'wireless terminal', 'electronic device', 'user device', or any other term having the same or equivalent technical meaning thereto.

The base station 110 may perform beamforming with the terminal 120. The base station 110 and the terminal 120 may transmit and receive radio signals in a relatively low frequency band (e.g., FR 1 (frequency range 1) of NR). Further, the base station 110 and the terminal 120 may transmit and receive radio signals in a relatively high frequency band (e.g., FR 2 of NR (or FR 2-1, FR 2-2, FR 2-3), FR 3 of NR, or a millimeter wave (mmWave) band (e.g., 28 GHz, 30 GHz, 38 GHz, 60 GHz)). In order to enhance the channel gain, the base station 110 and the terminal 120 may perform beamforming. In this context, the beamforming may include transmission beamforming and reception beamforming. The base station 110 and the terminal 120 may assign directivity to a transmission signal or a reception signal. To this end, the base station 110 and the terminal 120 may select serving beams by means of a beam search or beam management procedure. After the serving beams are selected, subsequent communication may be performed through a resource having a QCL relationship with a resource that has transmitted the serving beams.

If the large-scale characteristics of a channel carrying symbols on a first antenna port can be inferred from a channel carrying symbols on a second antenna port, the first antenna port and the second antenna port may be evaluated to be in such a QCL relationship. For example, the large-scale characteristics may include at least one of delay spread, Doppler spread, Doppler shift, average gain, average delay, or spatial receiver parameters.

Although FIG. 1 describes that both the base station 110 and the terminal 120 perform beamforming, embodiments of the disclosure are not necessarily limited thereto. In some embodiments, the terminal may or may not perform beamforming. Likewise, the base station may or may not perform beamforming. That is to say, only either one of the base station and the terminal may perform beamforming, or none of the base station and the terminal may perform beamforming.

In the disclosure, a beam that means a spatial flow of a signal in a wireless channel may be formed by one or more antennas (or antenna elements), of which formation process may be referred to as beamforming. The beamforming may include at least one of analog beamforming and digital beamforming (e.g., precoding). Reference signals transmitted based on beamforming may include, for example, a demodulation-reference signal (DM-RS), a channel state information-reference signal (CSI-RS), a synchronization signal/physical broadcast channel (SS/PBCH), or a sounding reference signal (SRS). Further, for a configuration for each reference signal, an IE such as e.g., a CSI-RS resource, an SRS-resource, or the like may be used, and such a configuration may include information associated with a beam. Beam-associated information may refer to whether a corresponding configuration (e.g., CSI-RS resource) uses the same spatial domain filter as other configuration (e.g., another CSI-RS resource in the same CSI-RS resource set) or uses a different spatial domain filter, or with which reference signal it is quasi-co-located (QCLed), or if it is QCLed, what type it is (e.g., QCL type A, B, C, or D).

According to the related art, in a communication system with a relatively large cell radius of base station, each base station has been installed such that the respective base station includes functions of a digital processing unit (or distributed unit (DU)) and a radio frequency (RF) processing unit (or radio unit (RU)). However, as high-frequency bands are used in $4^{th}$ generation (4G) systems and/or its subsequent communication systems (e.g., fifth-generation (5G) and the cell coverage of a base station decreased, the number of base stations to cover a certain area has increased. This has led to an increased initial installation cost for communication providers to install more base stations. In order to minimize the installation costs of the base stations, a structure has been proposed in which a DU and an RU of a base station are separated so that one or more RUs are connected to one DU through a wired network, and one or more RUs geographically distributed to cover a specific area are arranged. Hereinafter, examples of deployment structure and expansion of base stations according to various embodiments of the disclosure will be described with reference to FIGS. 2A to 2B.

Figure 2A:
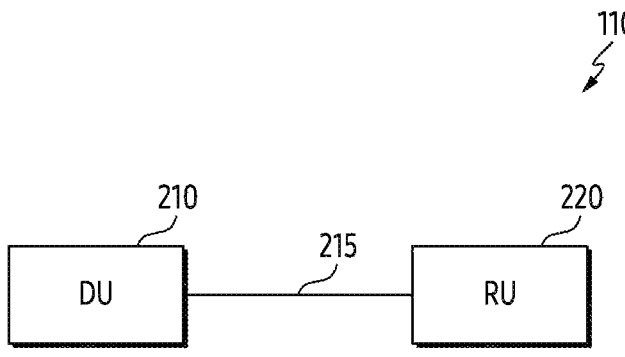
FIG. 2A illustrates a fronthaul interface according to an embodiment of the disclosure.

FIG. 2A illustrates a fronthaul interface according to an embodiment of the disclosure.

Referring to FIG. 2A, a fronthaul refers to a link for entities between a wireless LAN and a base station, as opposed to a backhaul for a link between a base station and a core network. Although FIG. 2A illustrate an example of a fronthaul structure between the DU 210 and one RU 220, it is only for convenience of description and the disclosure is not limited thereto. In other words, an embodiment of the disclosure may also be applied to a fronthaul structure between one DU and a multiplicity of RUs. For example, an embodiment of the disclosure may be applied to a fronthaul structure between one DU and two RUs. Further, an embodiment of the disclosure may be also applied to a fronthaul structure between one DU and three RUs.

Referring to FIG. 2A, the base station 110 may include a DU 210 and an RU 220. A fronthaul 215 between the DU 210 and the RU 220 may be operated through an $F_x$ interface. For the operation of the fronthaul 215, an interface such as e.g., an enhanced common public radio interface (eCPRI) or a radio over ethernet (ROE) may be used.

Along with further development of the communication technology, the mobile data traffic has increased a great deal, and thus, the bandwidth requirement demanded by the fronthaul between the digital unit and the radio unit has also increased significantly. In a deployment such as a centralized/cloud radio access network (C-RAN), the DU may be implemented to perform the functions for packet data convergence protocol (PDCP), radio link control (RLC), media access control (MAC), and physical (PHY), and the RU may be implemented to further perform the functions for a PHY layer in addition to the radio frequency (RF) function.

The DU 210 may serve as an upper layer of function of a wireless network. For example, the DU 210 may perform a function of a MAC layer and/or part of a PHY layer. The part of the PHY layer, which is performed at a higher level of the functions of the PHY layer, may include channel encoding (or channel decoding), scrambling (or descrambling), modulation (or demodulation), or layer mapping (or layer de-mapping). In case that the DU 210 conforms to the O-RAN standard, the DU 210 may be referred to as an O-DU (O-RAN DU). The DU 210 may be represented replaced by a first network entity for a base station (e.g., gNB) in embodiments of the disclosure, as occasion demands.

The RU 220 may serve as a lower layer of function of a wireless network. For example, the RU 220 may perform part of the PHY layer and/or the RF function. The part of the PHY layer, which is performed at a relatively lower level than the DU 210 amongst functions of the PHY layer, may include, for example, iFFT transformation (or FFT transformation), CP insertion (CP removal), and digital beamforming. An example of such a specific function split will be described in more detail with reference to FIG. 4. The RU 220 may be referred to as 'access unit (AU)', 'access point (AP)', 'transmission/reception point (TRP)', 'remote radio head (RRH)', 'radio unit (RU)', or any other terms having an equivalent technical meaning thereto. In case that the RU 220 conforms to the O-RAN standard, the RU 220 may be referred to as an O-RU (O-RAN RU). The RU 220 may be represented replaced by a second network entity for a base station (e.g., gNB) in embodiments of the disclosure, as occasion demands.

Although FIG. 2A illustrates that the base station 110 includes the DU 210 and the RU 220, embodiments of the disclosure are not limited thereto. The base station may be implemented with a distributed deployment according to a centralized unit (CU) configured to perform a function of upper layers (e.g., packet data convergence protocol (PDCP), radio resource control (RRC), etc.) of an access network, and a distributed unit (DU) configured to perform a function of a lower layer. In this context, the distributed unit (DU) may include a digital unit (DU) and a radio unit (RU) of FIG. 1. Between a core network (e.g., 5G core (5GC) or next generation core (NGC) network) and a radio access network (RAN), the base station may be implemented with a deployment disposed in the order of CU, DU, and RU. An interface between the CU and the distributed unit (DU) may be referred to as an F1 interface.

The centralized unit (CU) may be connected to one or more DUs to act as an upper layer of function than the DU. For example, the CU may act as the functions of radio resource control (RRC) and packet data convergence protocol (PDCP) layers, and the DU and the RU may act as for the functions of lower layers. The DU may perform some functions (high PHY) of the radio link control (RLC), the media access control (MAC), and the physical (PHY) layers, and the RU may be responsible for the remaining functions (low PHY) of the PHY layer. The digital unit (DU) may be included in the distributed unit (DU) according to implementation of a distributed deployment of the base stations. Hereinafter, unless otherwise defined, description will be made of the operations of the digital unit (DU) and the RU, but it is to be noted that various embodiments of the disclosure may be applied to both the deployment of base stations including the CU or the deployment with the DU being directly connected to the core network (i.e., being implemented incorporated into a base station (e.g., NG-RAN node) where the CU and the DU constitute one entity).

Figure 2B:
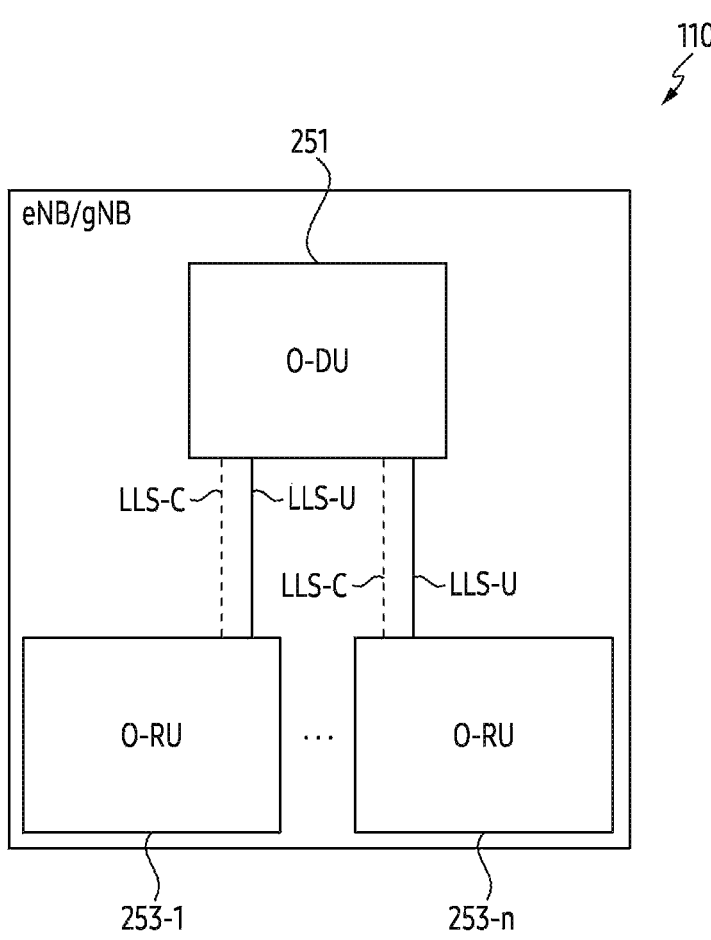
FIG. 2B illustrates a fronthaul interface of an O-RAN (open radio access network) according to an embodiment of the disclosure.

FIG. 2B illustrates a fronthaul interface of an open-radio access network (O-RAN), wherein an eNB or a gNB is illustrated as a base station 110 according to a distributed deployment according to an embodiment of the disclosure.

Referring to FIG. 2B, the base station 110 may include an O-DU 251 and O-RUs (253-1, . . . , 253-*n*). Hereinafter, for convenience of explanation, the operation and function of the O-RU 253-1 may be understood with an explanation for each of other O-RUs (e.g., O-RU 253-*n*).

The O-DU 251 is a logical node including functions except for the functions exclusively assigned to O-RU 253-1 amongst the functions of the base station (e.g., eNB, gNB) according to FIG. 4 to be described later. The O-DU 251 may control the operation of the O-RUs (253-1, . . . , 253-*n*). The O-DU 251 may be referred to as a lower layer split (LLS) central unit (CU). The O-RU 253-1 is a logical node including a subset amongst the functions of the base station (e.g., eNB, gNB) according to FIG. 4 to be described later. A real-time aspect of control plane (C-plane) communication and user plane (U-plane) communication with the O-RU 253-1 may be controlled by the O-DU 251.

The O-DU 251 may communicate with the O-RU 253-1 via an LLS interface. The LLS interface corresponds to the fronthaul interface. The LLS interface means a logical interface between the O-DU 251 and the O-RU 253-1, using a lower layer functional split (i.e., intra-PHY-based function split). The LLS-C between the O-DU 251 and the O-RU 253-1 provides a C-plane through the LLS interface. The LLS-U between the O-DU 251 and the O-RU 253-1 provides a U-plane through the LLS interface.

In FIG. 2B, the entities of the base station 110 are referred to as O-DU and O-RU to describe O-RAN. However, such a naming is not to be construed to limit the embodiments of the disclosure thereto. In the embodiments described with reference to FIGS. 3A, 3B, 4, 5A, 5B, 6, 7A, 7B, 8A, 8B, 9A, 9B, and 10 to 12, the operations of the DU 210 may be performed by the O-DU 251. The description of the DU 210 may be also applied to the O-DU 251. Likewise, in the embodiments described with reference to FIGS. 3A, 3B, 4, 5A, 5B, 6, 7A, 7B, 8A, 8B, 9A, 9B, and 10 to 12, the operations of the RU 220 may be performed by the O-RU 253-1, of course. The description of the RU 220 may be also applied to the O-DU 253-1.

Figure 3A:
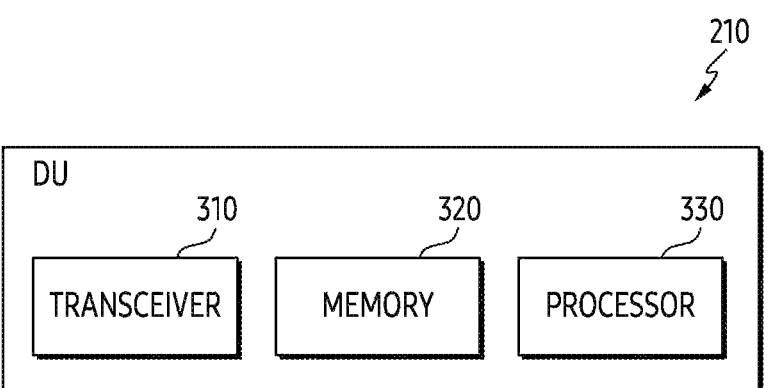
FIG. 3A illustrates a functional configuration of a distributed unit (DU) according to an embodiment of the disclosure.

FIG. 3A illustrates a functional configuration of a distributed unit (DU) according to an embodiment of the disclosure.

Referring to FIG. 3A, the illustrated configuration may be understood as a configuration of the DU 210 of FIG. 2A (or O-DU 251 of FIG. 2B), which is a part of the base station. As used herein, the terms such as '~module', '~unit', or '~part' may mean a unit for processing at least one function or operation, which may be implemented by hardware, software, or a combination of hardware and software.

Referring to FIG. 3A, the DU 210 includes a transceiver 310, a memory 320, and a processor 330.

The transceiver 310 may perform functions for transmitting and/or receiving signals in a wired communication environment. The transceiver 310 may include a wired interface for controlling a direct connection between an apparatus and another apparatus via a transmission medium (e.g., copper wire, optical fiber, or the like). For example, the transceiver 310 may transmit an electrical signal to other device through a copper wire or perform conversion between an electrical signal and an optical signal. The DU 210 may communicate with a radio unit (RU) via the transceiver 310. The DU 210 may be connected to a core network or a distributed CU via transceiver 310.

The transceiver 310 may perform the functions for transmitting and receiving signals in a wireless communication environment. For example, the transceiver 310 may perform a function for conversion between a baseband signal and a bit string according to a physical layer standard of a communication system. Upon data transmission, the transceiver 310 generates complex symbols by encoding and modulating a transmit bit string. Upon data reception, the transceiver 310 restores the received bit string through demodulation and decoding of the baseband signal. The transceiver 310 may include a plurality of transmission/reception paths. The transceiver 310 may be connected to a core network or connected to other nodes (e.g., integrated access backhaul (IAB)).

The transceiver 310 may be configured to transmit and receive various signals. For example, the transceiver 310 may transmit a management plane (M-plane) message, a synchronization plane (S-plane) message, or a control plane (C-plane) message. Similarly, the transceiver 310 may transmit or receive a user plane (U-plane) message. Although only the transceiver 310 is illustrated in FIG. 3A, the DU 210 may include two or more transceivers.

The transceiver 310 may be configured to transmit and receive signals as described above. As such, all or at least part of the transceiver 310 may be also referred to as a communication unit, a transmission unit, a reception unit, or a transmission/reception unit. Further, throughout the following description, the transmission and/or reception performed via a wireless channel is used as a meaning including that the aforementioned process is performed by the transceiver 310.

Although not illustrated in FIG. 3A, the transceiver 310 may further include a backhaul transceiver for connection with a core network or another base station. The backhaul transceiver provides an interface for performing communication with other nodes in the network. The backhaul transceiver converts a bit string transmitted from a base station to another node, such as another access node, another base station, a higher layer node, a core network, or the like, into a physical signal and converts the physical signal received from the other node into a bit string.

The memory 320 stores data such as a basic program, application programs, and setting information for the overall operation of the DU 210. The memory 320 may be referred to as a storage unit. The memory 320 may be configured with a volatile memory, a non-volatile memory, or a combination of a volatile memory and a non-volatile memory. Further, the memory 320 provides stored data according to a request of the processor 330.

The processor 330 controls the overall operations of the DU 210. The processor 380 may be referred to as a controller. For example, the processor 330 transmits and receives signals via the transceiver 310 (or via a backhaul communication unit). The processor 330 records and reads data into/from the memory 320. The processor 330 may perform functions of a protocol stack required by the communication standard. Although only the processor 330 is illustrated in FIG. 3A, the DU 210 may include two or more processors, according to another implementation.

The configuration of the DU 210 illustrated in FIG. 3A is only of an example, and the configuration of the DU performing the embodiments of the disclosure is not limited to the configuration illustrated in FIG. 3A. In some embodiments, a portion of the configuration may be added, deleted, or changed.

Figure 3B:
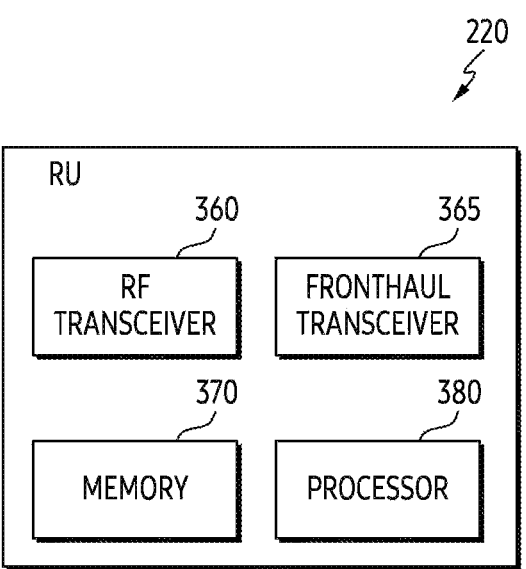
FIG. 3B illustrates a functional configuration of a radio unit (RU) according to an embodiment of the disclosure.

FIG. 3B illustrates a functional configuration of a radio unit (RU) according to an embodiment of the disclosure.

Referring to FIG. 3B, the illustrated configuration may be understood as a configuration of the RU 220 of FIG. 2B or the O-RU 253-1 of FIG. 2B, which is a part of the base station. As used herein, the terms such as '~module', '~unit', or '~part' may mean a unit for processing at least one function or operation, which may be implemented by hardware, software, or a combination of hardware and software.

Referring to FIG. 3B, the RU 220 may include an RF transceiver 360, a fronthaul transceiver 365, a memory 370, and a processor 380.

The RF transceiver 360 performs the functions for transmitting and receiving signals through a wireless channel. For example, the RF transceiver 360 up-converts a baseband signal into an RF band signal to transmit the RF band signal through an antenna, and down-converts an RF band signal received through the antenna into a baseband signal. The RF transceiver 360 may include a transmission filter, a reception filter, an amplifier, a mixer, an oscillator, a DAC, an ADC, or the like.

The RF transceiver 360 may include a plurality of transmission/reception paths. The RF transceiver 360 may also include an antenna unit. The RF transceiver 360 may include at least one antenna array configured with a plurality of antenna elements. In terms of hardware, the RF transceiver 360 may be configured with a digital circuit and an analog circuit (e.g., radio frequency integrated circuit (RFIC)). The digital circuit and the analog circuit may be implemented in a single package. The RF transceiver 360 may include a plurality of RF chains. The RF transceiver 360 may perform beamforming. The RF transceiver 360 may apply a beamforming weight to a signal in order to give a directivity according to the setting of the processor 380 to the signal for transmission and reception. The RF transceiver 360 may include a radio frequency (RF) block (or an RF unit).

The RF transceiver 360 may transmit and receive a signal over a radio access network. For example, the RF transceiver 360 may transmit a downlink signal. The downlink signal may include a synchronization signal (SS), a reference signal (RS) (e.g., cell-specific reference signal (CRS), DM (demodulation)-RS), system information (e.g., MIB, SIB, RMSI (remaining system information), OSI (other system information)), configuration messages, control information, or downlink data. The RF transceiver 360 may receive an uplink signal. The uplink signal may include a random access related signal (e.g., random access preamble: RAP) (or Msg1 (message 1), Msg3 (message 3)), a reference signal (e.g., sounding reference signal (SRS), DM-RS), a power headroom report (PHR) or the like. Although only the RF transceiver 360 is illustrated in FIG. 3B, the RU 220 may include two or more RF transceivers, according to an example of another implementation.

The RF transceiver 460 may transmit RIM-RS. The RF transceiver 460 may transmit a first type of RIM-RS (e.g., RIM-RS type 1 of 3GPP) for notifying detection of far-field interference. The RF transceiver 460 may transmit a second type of RIM-RS (e.g., RIM-RS type 2 of 3GPP) for notifying presence or absence of the far-field interference.

The fronthaul transceiver 365 may transmit and receive a signal. According to an embodiment, the fronthaul transceiver 365 may transmit and receive the signal on a fronthaul interface. For example, the fronthaul transceiver 365 may receive a management plane (M-plane) message, a synchronization plane (S-plane) message, or a control plane (C-plane) message. Similarly, the fronthaul transceiver 365 may transmit or receive a user plane (U-plane) message. Although only the fronthaul transceiver 365 is illustrated in FIG. 3B, the RU 220 may include two or more fronthaul transceivers, according to an example of another implementation.

The RF transceiver 360 and the fronthaul transceiver 365 transmit and receive signals as described above. As such, all or at least part of the RF transceiver 360 and the fronthaul transceiver 365 may be referred to as 'communication unit', 'transmission unit', 'reception unit', or 'transceiver unit'. Further, throughout the following description, the transmission and/or reception performed via a wireless channel may be used as a meaning including that the aforementioned process is performed by the transceiver 310.

The memory 370 stores data such as a basic program, application programs, and setting information for the overall operation of the RU 220. The memory 370 may be referred to as a storage unit. The memory 370 may be configured with a volatile memory, a nonvolatile memory, or a combination of a volatile memory and a nonvolatile memory. The memory 370 provides stored data according to a request of the processor 380. The memory 370 may include a memory for storing conditions, instructions, or setting values related to the SRS transmission scheme.

The processor 380 controls the overall operations of the RU 220. The processor 380 may be referred to as a controller. For example, the processor 380 transmits and receives signals via the RF transceiver 360 or the fronthaul transceiver 365. The processor 380 writes and reads data into/from the memory 370. The processor 380 may perform the functions of a protocol stack required by the communication standard. Although only the processor 380 is illustrated in FIG. 3B, the RU 220 may include two or more processors, according to another implementation example. The processor 380 may include a storage space for storing instructions/codes at least temporarily resident in the processor 380, the instructions/codes being an instruction set or code stored in the memory 370, or may be part of a circuitry configuring the processor 380. The processor 380 may include various communication modules for performing the communication. The processor 380 may control the RU 220 to perform operations according to the following embodiments of the disclosure.

The configuration of the RU 220 illustrated in FIG. 3B is only of an example, and the example of the RU performing the embodiments of the disclosure is not limited to the configuration illustrated in FIG. 3B. In some configurations, some of the configuration may be subject to addition, deletion, or change.

Figure 4:
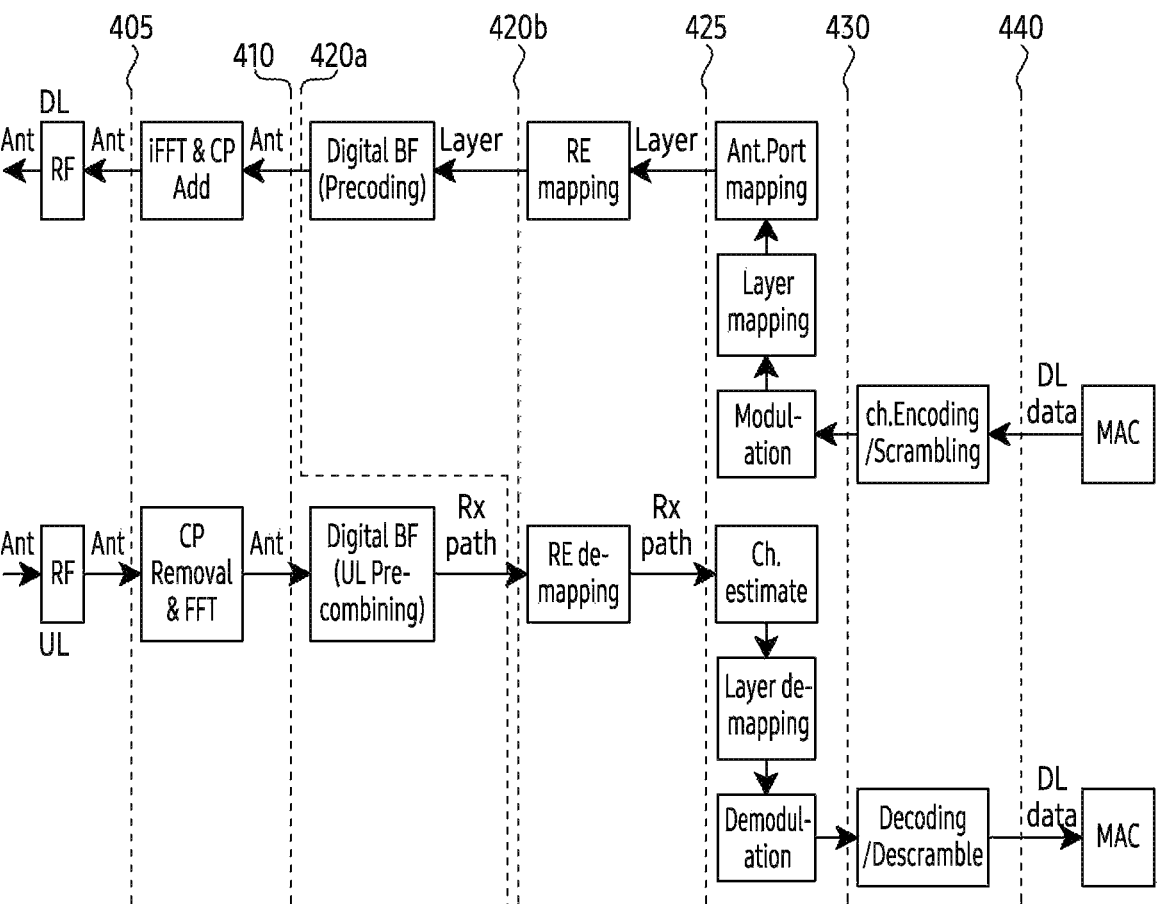
FIG. 4 illustrates an example of a function split in between a DU and an RU according to an embodiment of the disclosure.

FIG. 4 illustrates an example of a function split in between a DU and an RU according to an embodiment of the disclosure.

Referring to FIG. 4, along with latest developments in wireless communication technologies (e.g., the introduction of 5G communication system or NR (new radio) communication system), the frequency band used has increased even more. Further, as the cell radius of a base station becomes very small, the number of RUs requiring installation further increases. In the 5G communication system, the amount of data transmission has greatly increased by 10 times or more, and thus, the data transmission capacity of a wired network transmitted to a fronthaul has significantly increased. Therefore, due to the above-described factors, the initial installation costs for the wired network in the 5G communication system may increase very significantly. As such, in order to decrease the transmission capacity of the wired network and reduce the installation costs for the wired network, the 'function split' may be used to reduce the transmission capacity of the fronthaul by transferring some functions of a modem of a DU to a RU.

To reduce the burden on the DU, a role of the RU, which is only responsible for the existing RF function, may be extended to some function of the physical layer. The higher layer of functions the RU performs, the more the throughput of the RU may increase to increase the transmission bandwidth at the fronthaul, and simultaneously, lower constraint of the latency requirement due to response processing. The higher layer of function the RU performs, the less virtualization gain the RU obtains and the more the size, weight, and cost of the RU increase. Therefore, it is required to implement the optimal function split in consideration of the trade-off of the above-described advantages and disadvantages.

Referring to FIG. 4, the function splits in the physical layer below the MAC layer are illustrated. In the case of a downlink (DL) transmitting signals to a terminal over a wireless network, a base station may sequentially perform channel encoding/scrambling, modulation, layer mapping, antenna mapping, RE mapping, digital beamforming (e.g., precoding), iFFT transformation/CP insertion, and RF conversion. In the case of uplink (UL) receiving signals from a terminal over a wireless network, a base station may sequentially perform RF conversion, FFT transformation/CP removal, digital beamforming (e.g., pre-combining), RE de-mapping, channel estimation, layer de-mapping, demodulation, decoding/de-scrambling. The function split of uplink functions and downlink functions may be defined in various types by the needs between the vendors, the discussion on the standards, and so on, according to the aforementioned trade-off.

In the first function split 405, the RU performs the RF function and the DU performs the PHY function. In the first function split, the PHY function in the RU is not substantially implemented, and the first function split may be referred to as Option 8, for example. In the second function split 410, the RU performs iFFT transformation/CP addition in the DL of the PHY function and FFT transformation/CP removal in the UL, and the DU performs the remaining PHY functions. For example, the second function split 410 may be referred to as Option 7-1. In the third function split 420a, the RU performs iFFT transformation/CP addition in DL of the PHY function and FFT transformation/CP removal and digital beamforming in the UL, and the DU performs the remaining PHY functions. For example, the third function split 420a may be referred to as Option 7-2x Category A. In a fourth function split 420b, the RU performs up to digital beamforming in both the DL and the UL, and the DU performs the upper PHY functions after the digital beamforming. For example, the fourth function split 420b may be referred to as Option 7-2x Category B. In the fifth function split 425, the RU performs up to RE mapping (or RE de-mapping) in both the DL and the UL, and the DU performs the upper PHY functions after the RE mapping (or RE de-mapping). For example, the fifth function split 425 may be referred to as Option 7-2. In the sixth function split 430, the RU performs up to modulation (or demodulation) in both the DL and the UL, and the DU performs the upper PHY functions after the modulation (or demodulation). For example, the sixth function split 430 may be referred to as Option 7-3. In the seventh function split 440, the RU performs up to encoding/scrambling (or decoding/de-scrambling) in both the DL and the UL, and the DU performs the upper PHY functions following the modulation (or demodulation). For example, the seventh function split 440 may be referred to as Option 6.

In the case where a large amount of signal processing is expected as in FR 1 MMU, the function split (e.g., fourth function split 420b) at a relatively upper layer may be required to reduce the fronthaul capacity. Further, the function split at a too high layer (e.g., the sixth function split 430) may lead to more complicated control interface and cause a significant burden on the implementation of the RU due to inclusion of multiple PHY processing blocks in the RU, and therefore, an appropriate function split may be required depending on the deployment and the implementation scheme of the DU and RU.

In the case where it is not possible to process the precoding of data received from the DU (i.e., when the precoding capability of the RU is limited), the third function split 420a or its lower function split (e.g., the second function split 410) may be applied. In the case where the function split is capable of processing the precoding of data received from the DU, the fourth function split 420b or its higher function split (e.g., the sixth function split 430) may be applied.

Hereinafter, in the disclosure, the embodiments are described on the basis of the third function split 420a (which may be referred to as category A or CAT-A) or the fourth function split 420b (which may be referred to as category B or CAT-B), for performing beamforming process in the RU, unless otherwise defined. The O-RAN specification distinguishes the type of O-RU, depending on whether the precoding function is located either on an O-DU interface or on an O-RU interface. An O-RU (i.e., with low complexity) in which no precoding is performed may be referred to as a CAT-A O-RU. The O-RU in which the precoding is performed may be referred to as a CAT-B O-RU.

Hereinafter, an upper PHY refers to a physical layer processing carried out in a DU of a fronthaul interface. For example, the upper PHY may include FEC encoding/decoding, scrambling, and modulation/demodulation. Hereinafter, a lower PHY refers to a physical layer processing carried out in a RU of a fronthaul interface. For example, the lower PHY may include FFT/iFFT, digital beamforming, or physical random access channel (PRACH) extraction and filtering. However, it is to be noted that the aforementioned criteria do not exclude embodiments implemented through other function splits. Functional configuration, signaling, or operations to be described below may be described on the basis of the third function split 420a or the fourth function split 420b, but they may also apply to other function splits.

Embodiments of the disclosure describe as an example the specifications of eCPRI and O-RAN as a fronthaul interface, when transmitting a message between a DU (e.g., DU 210 in FIG. 2A) and an RU (e.g., RU 220 in FIG. 2A). The Ethernet payload of the message may include an eCPRI header, an O-RAN header, and additional fields. Hereinafter, various embodiments of the disclosure will be described using the standard terms of eCPRI or O-RAN, but it is to be noted that any other expressions having the same or equivalent meaning to a corresponding term may be used in substitution in the various embodiments of the disclosure.

For a transport protocol of the fronthaul, Ethernet and eCPRI may be used which are easy to share with the network. An eCPRI header and an O-RAN header may be included in the Ethernet payload. The eCPRI header may be located at a front-end of the Ethernet payload. The contents of the eCPRI header are as follows.

ecpriVersion (4 bits): This parameter indicates an eCPRI protocol version.

ecpriReserved (3 bits): This parameter is reserved for further use of eCPRI.

ecpriConcatenation (1 bit): This parameter indicates when eCPRI concatenation is in use.

ecpriMessage (1 byte): This parameter indicates a type of service carried by a message type. For example, the parameter indicates an IQ (in-phase/quadrature-phase) data message, a real-time control data message, or a transmission network delay measurement message.

ecpriPayload (2 bytes): This parameter indicates a byte size of a payload portion of the eCPRI message.

ecpriRtcid/ecpriPcid (2 bytes): This parameter is an eAxC (extended antenna-carrier) identifier (eAxC ID), identifying specific data flow related to each C-plane (ecpriRtcid) or U-plane (ecpriPcid) message.

ecpriSeqid (2 bytes): This parameter provides unique message identification and sequence in two levels. A first octet of this parameter is a sequence ID used to identify the sequence of messages within eAxC message stream, and the sequence ID is used to verify that all the messages have been received and to rearrange out-of-order messages. A second octet of this parameter is a sub sequence ID. This sub sequence ID is used to verify the sequence and implement its rearrangement, when a radio-transport-level fragmentation (eCPRI or IEEE-1914.3) occurs.

eAxC identifier (ID): This ID includes a band and sector identifier ('BandSector_ID'), a component carrier identifier ('CC_ID'), a spatial stream identifier ('RU_Port_ID'), and a distributed unit identifier ('DU_Port_ID'). Bit allocation of eAxC ID may be classified as follows.

DU_port ID: This ID is used to distinguish processing units in O-DU (e.g., other baseband cards). It is expected that the O-DU will allocate bits for the DU_port ID and the O-RU will attach the same value to the UL U-plane message carrying the same sectionId data.

BandSector_ID: This ID is an aggregated cell identifier (band and sector classification supported by O-RU).

CC_ID: This ID is used to distinguish carrier components supported by O-RU.

RU_port ID: This ID specifies logical flows such as e.g., data layers or spatial streams, and logical flows such as signal channels requiring special antenna assignment, such as e.g., separate numerologies (e.g., PRACH) or SRS.

Application protocol of the fronthaul may include a control plane (C-plane), a user plane (U-plane), a synchronization plane (S-plane), and a management plane (M-plane).

The control plane may be configured to provide scheduling information and beamforming information via a control message. The control plane means real-time control between a DU and a RU. The user plane may include IQ sample data transmitted between the DU and the RU. The user plane may include downlink data (IQ data or SSB/RS), uplink data (IQ data or SRS/RS), or PRACH data of the user. The weight vector of the aforementioned beamforming information may be multiplied by a user's data. The synchronization plane generally typically means traffic between the DU and the RU for a synchronization controller (e.g., IEEE grandmaster). The synchronization plane may be related to timing and synchronization. The management plane means non-real-time control between the DU and the RU. The management plane may be related to an initial setup, a non-real-time reset, or a reset, or a non-real-time report.

A message of the control plane (i.e., a C-plane message) may be encapsulated based on a two-layer header approaching scheme. The first layer may consist of an eCPRI common header or an IEEE 1914.3 common header, including fields used to indicate a message type. The second layer is an application layer including fields necessary for control and synchronization. A section in the application layer defines the characteristics of U-plane data transmitted or received in a beam with one pattern ID. The section types supported in the C-plane are as follows.

The section type may indicate the use of the control message transmitted in the control plane. For example, the use per section type may be defined as follows.

sectionType=0: This is used to indicate resource blocks or symbols that are not used in DL or UL.

sectionType=1: This is used for most DL/UL radio channels, wherein the term 'most' indicates the channels that do not require time or frequency offset, as those required for mixed neuronal channels.

sectionType=2: This is reserved for further use.

sectionType=3: This is for a PRACH and mixed-numerology channel, and the channel requiring a time or frequency offset or different from the nominal SCS value(s).

sectionType=4: This is reserved for further use.

sectionType=5: This is UE scheduling information, delivering UE scheduling information so that the RU can perform real-time BF weight calculation (O-RAN optional BF scheme).

sectionType=6: This is for UE-specific channel information transmission, periodically delivering the UE channel information so that the RU can perform real-time BF weight calculation (O-RAN optional BF scheme).

sectionType=7: This is used to support LAA sectionType=8: This is used for ACK/NACK feedback to provide ACK/NACK feedback for section descriptions of C-plane messages from RU to DU.

In RAN, several types of compression methods may be used in each section to increase data transmission efficiency between a DU and an RU. The compression techniques may include, for example, no-compression technique, block floating point compression (BFPC) technique, modulation compression (MC) technique, or the like. An IQ data frame of O-RAN standard may include a user data compression header (e.g., udCompHdr). The user data compression header may be defined and transferred with a designated bit width (e.g., 4-bit 'udIqWidth') and the compression method (e.g., 4-bit 'udCompMeth'). For example, the compression method may be defined as shown in the Table 1 below.

Amongst the aforementioned compression techniques, the MC technique is a non-loss method, with no data loss and high compression efficiency. The MC technique relies on the feature that a modulated data symbol may be expressed with bits of a very limited number of in-phase (I) component and bits of quadrature (Q) component. For example, since a QPSK (quadrature phase shift keying) modulated symbol has only two potential states of I and two potential states of Q, the QPSK modulated symbol may be represented as a single bit for I component and a single bit for Q component without information loss. For another example, a symbol modulated with 64 QAM may be represented with 3 bits for I component and 3 bits for Q component at maximum.

For the I component of data in a U-plane message, 16 bits may be used. For the Q component of data in the U-plane message, 16 bits may be also used. That is, 32 bits may be used for data transfer in the U-plane message. When QPSK modulation is used for the modulation compression, the number of transferred bits may be reduced from 32 bits to 2 bits. When 16 QAM modulation is used for the modulation compression, the number of transferred bits may be reduced from 32 bits to 4 bits. When 64 QAM modulation is used for modulation compression, the number of transferred bits may be reduced from 32 bits to 6 bits.

In order to express the values of I component and Q component that allow for superposition of multiple constellation sizes that can be expressed with a single word-width, the constellations may be 'shifted' so that twos-complement can represent each constellation point. For example, QPSK constellation points may be moved by $-\frac{1}{2}$. The I component may be $-1$ or 0. The Q component may be $-1$ or 0. Further, for example, 16 QAM constellation points may be moved by $-\frac{1}{4}$. The I component may be $-1$, $-\frac{1}{2}$, 0, $\frac{1}{2}$. The Q component may be $-1$, $\frac{1}{2}$, 0, or $\frac{1}{2}$. Further, for example, 64 QAM constellation points may be moved by $-\frac{1}{8}$. The I component may be $-1$, $-\frac{3}{4}$, $-\frac{1}{2}$, $-\frac{1}{4}$, 0, $\frac{1}{4}$, $\frac{1}{2}$, or $\frac{3}{4}$. The Q component may be $-1$, $-\frac{3}{4}$, $-\frac{1}{2}$, $-\frac{1}{4}$, 0, $\frac{1}{4}$, $\frac{1}{2}$, or $\frac{3}{4}$.

The MC technique converts bit-level information into a shifted constellation point (SCP). A DU (e.g., DU 210) may transfer a U-plane message including converted information according to the SCP to an RU (e.g., RU 220). The DU 210 may transmit, to the RU 220, a constellation shift flag (csf) to indicate whether it is to be shifted. For example, when the 'csf' value is '1', a movement value of each constellation point in a specific bit width may be defined as shown in Table 2 below.

TABLE 1

| udCompMeth | compression method | udIqWidth meaning |
|---|---|---|
| 0000b | no compression | bitwidth of each uncompressed I and Q value |
| 0001b | Block floating point (BFP) | bitwidth of each I and Q mantissa value |
| 0010b | Block scaling | bitwidth of each I and Q scaled value |
| 0011b | µ-law | bitwidth of each compressed I and Q value |
| 0100b | Modulation compression | bitwidth of each compressed I and Q value |
| 0101b | BFP + selective RE sending | bitwidth of each compressed I and Q value |
| 0110b | Mod-compr + selective RE sending | bitwidth of each compressed I and Q value |
| 0111b-1111b | Reserved for further methods | depends on the specific compression method |

TABLE 2

| udIqWidth | Shift value |
|---|---|
| 1 | $\frac{1}{2}$ |
| 2 | $\frac{1}{4}$ |
| 3 | $\frac{1}{8}$ |
| 4 | $\frac{1}{16}$ |
| 5 | $\frac{1}{32}$ |

Data compressed according to the MC technique does not indicate an actual power value. The DU 210 may transfer a modulation compression scaler value (modCompScaler) to the RU 220, so that the RU can set a power level for the modulation-compressed data. A 'modCompScaler' parameter indicates a scale factor to be applied to an unshifted constellation point during decompression. In the O-RAN specification, the 'modCompScaler' parameter may be provided to the RU through section extension information (e.g., Section Extension Type 4). The 'modCompScaler' parameter may indicate an exponential component and a mantissa component through the following Equation.

$$\text{"mantissa"} = \sum_{k=0}^{10} modCompScaler[k] \cdot 2^{k-11} \qquad \text{Equation 1}$$

$$\text{"exponent"} = \sum_{k=11}^{14} modCompScaler[k] \cdot 2^{k-11}$$

wherein 'mantissa' indicates the mantissa component of an indicated value, 'exponent' indicates the exponential component of the indicated value, and modCompScaler[k] represents a k+1th bit of the 'modCompScaler' parameter. For example, modCompScaler[0] indicates a first bit of the 'modCompScaler' parameter, and modCompScaler[14] represents a 15th bit of the 'modCompScaler' parameter.

The most significant 4-bits amongst 15 bits of the 'modCompScaler' parameter, indicate the exponential component, and the least significant 11-bits among 15 bits of the 'modCompScaler' parameter indicate the mantissa component. Therefore, the value indicated by the 'modCompScaler' parameter may be obtained from the following Equation.

$$modCompScaler = mantissa \cdot 2^{-exponent} \qquad \text{Equation 2}$$

wherein 'mantissa' indicates the mantissa component of the indicated value and 'exponent' indicates the exponential component of the indicated value.

Section extension 4 of the O-RAN standard transmitting the 'modCompScaler' parameter is shown in the Table 3 below.

TABLE 3

| ef | extType = 0x04 | 1 | Octet N |
|---|---|---|---|
| | extLen = 0x01 (1 word) | 1 | N + 1 |
| csf | modCompScaler[14:8] | 1 | N + 2 |
| | modCompScaler[7:0] | 1 | N + 3 |

The DU 210 may transmit a modulation compression power scale RE mask (mcScaleReMask) to the RU 220. The 'mcScaleReMask' parameter may indicate a position of RE along with the same scaling and modulation type in the PRB. Similar to the 'modCompScaler' parameter, the DU 210 may transmit a scaling value for modulation compression ('mcScaleOffset') to the RU 220.

The 'mcScaleOffset' parameter indicates a scale factor to be applied to an unshifted constellation point during decompression. In the O-RAN standard, the 'mcScaleOffset' parameter may be provided to the RU 220 through section extension information (e.g., Section Extension Type 5). The 'mcScaleOffset' parameter may indicate an exponential component and a mantissa component through the following Equation.

$$\text{"mantissa"} = \sum_{k=0}^{10} mcScaleOffset[k] \cdot 2^{k-11} \qquad \text{Equation 3}$$

$$\text{"exponent"} = \sum_{k=11}^{14} mcScaleOffset[k] \cdot 2^{k-11}$$

wherein 'mantissa' indicates the mantissa component of the indicated value, 'exponent' indicates the exponential component of the indicated value, and mcScaleOffset[k]

indicates a (k+1)th bit of the 'mcScaleOffset' parameter. For example, mcScaleOffset[0] indicates a first bit of the 'mcScaleOffset' parameter, and mcScaleOffset[14] indicates a 15th bit of the 'mcScaleOffset' parameter.

Among 15 bits of the 'mcScaleOffset' parameter, the most significant 4-bits indicate the exponential component, and among the 15 bits of the 'mcScaleOffset' parameter, the least significant 11-bits indicate the mantissa component. Therefore, the value indicated by the 'mcScaleOffset' parameter is as the following Equation.

$$mcScaleOffset = mantissa \cdot 2^{-exponent} \qquad \text{Equation 4}$$

wherein 'mantissa' indicates the mantissa component of the indicated value, and 'exponent' indicates the exponential component of the indicated value.

The section extension 5 of the O-RAN standard transmitting the 'mcScaleOffset' parameter is shown in the following Tables. Table 4 indicates one scaler value, and Table 5 indicates two scaler values.

TABLE 4

| ef | extType = 0x05 | 1 | Octet N |
|---|---|---|---|
| | extLen = 0x2 (2 words) | 1 | N + 1 |
| | mcScaleReMask[11:4] | 1 | N + 2 |
| mcScaleReMask[3:0] | csf mcScaleOffset [14:12] | 1 | N + 3 |
| | mcScaleOffset [11:4] | 1 | N + 4 |
| mcScaleOffset [3:0] | zero padding | 1 | N + 5 |
| | zero padding | 1 | N + 6 |
| | zero padding | 1 | N + 7 |

TABLE 5

| ef | extType = 0x05 | 1 | Octet N |
|---|---|---|---|
| | extLen = 0x03 (3 words) | 1 | N + 1 |
| | mcScaleReMask[11:4] | 1 | N + 2 |
| mcScaleReMask[3:0] | csf mcScaleOffset [14:12] | 1 | N + 3 |
| | mcScaleOffset [11:4] | 1 | N + 4 |
| mcScaleOffset [3:0] | mcScaleReMask[11:8] | 1 | N + 5 |
| | mcScaleReMask[7:0] | 1 | N + 6 |
| csf | mcScaleOffset [14:8] | 1 | N + 7 |
| | mcScaleOffset [7:0] | 1 | N + 8 |
| | zero padding | 1 | N + 9 |
| | zero padding | 1 | N + 10 |
| | zero padding | 1 | N + 11 |

The section extension information of Tables 3 to 5 described above may be included in the C-plane message. The RU 220 may restore the original signal intended by the DU 210, based on the compressed data received through the U-plane message and the parameters received through the C-plane message. According to an embodiment, the RU 220 may obtain the original signal from the compressed bits based on the 'csf' parameter. According to an embodiment, the RU 220 may obtain the original signal from the compressed bits based on a 'modCompScaler' parameter. According to an embodiment, the RU 220 may obtain the original signal from the compressed bits based on the 'mcscaleoffset' parameter and the 'mcScaleReMask' parameter.

Figure 5A:
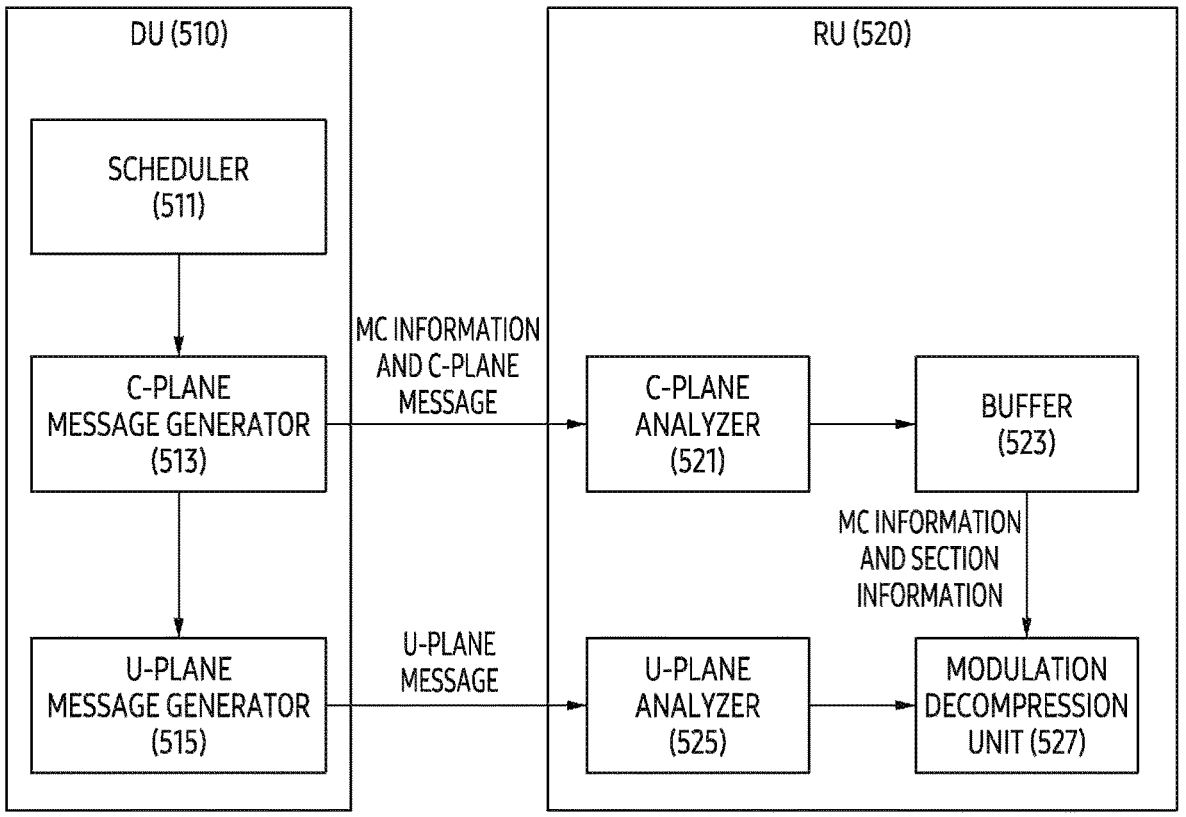
FIGS. 5A and 5B illustrate an example of modulation compression (MC) according to various embodiment of the disclosure.
Figure 5B:
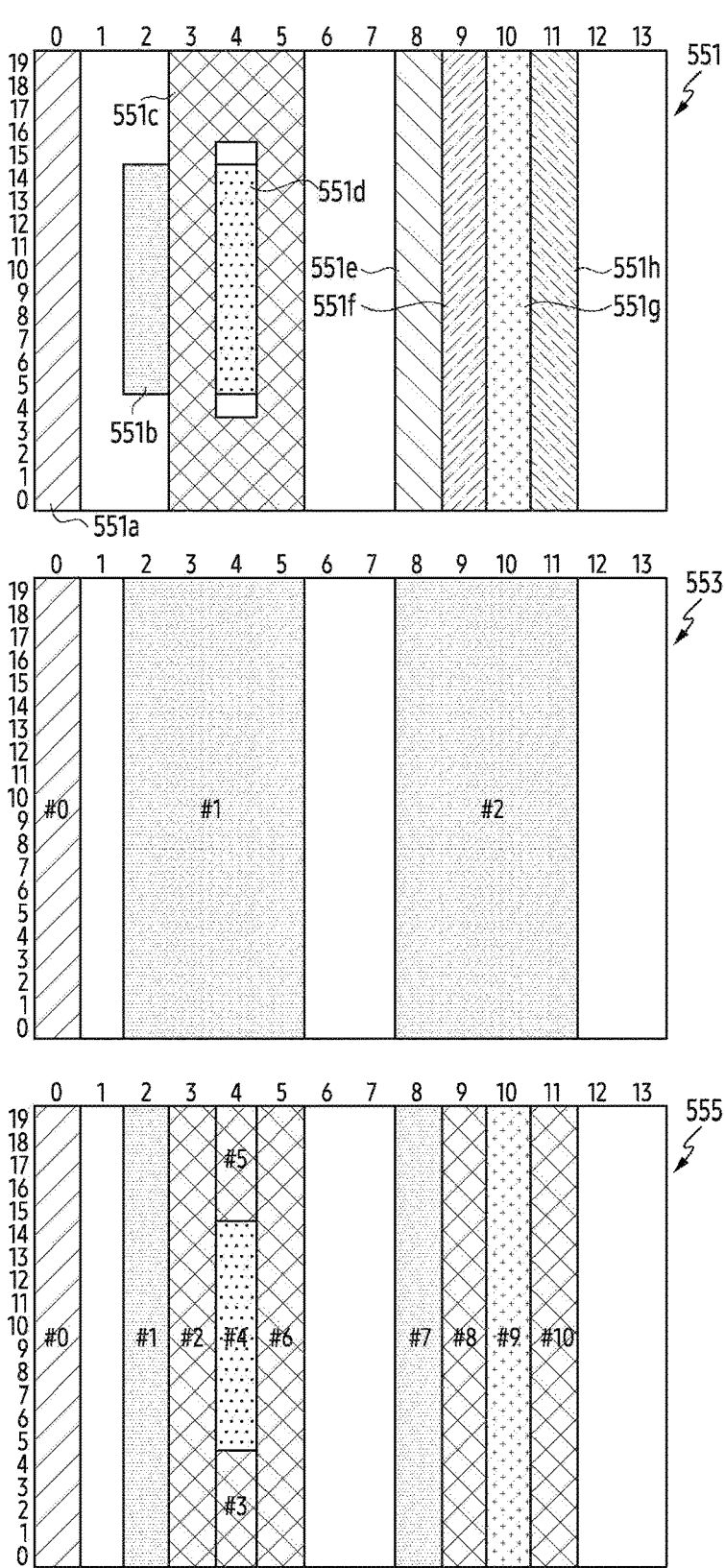

FIGS. 5A and 5B each show an example of modulation compression (MC) according to various embodiment of the disclosure.

Referring to FIG. 5A, the terms such as ' . . . module', ' . . . unit', or the like refer to a unit to process at least one function or operation, which may be implemented by hardware or software, or a combination thereof.

Referring to FIG. 5A, a DU 510 may include a scheduler 511, a C-plane message generator 513, and a U-plane message generator 515. The scheduler 511 may perform scheduling for the U-plane messages according to the above-described modulation compression technique. The C-plane message generator 513 may generate a C-plane message including control information according to the modulation compression technique. For example, the C-plane message generator 513 may generate a C-plane message including the Section Extension 4 as shown in Table 3. Further, for example, the C-plane message generator 513 may generate a C-plane message including the Section Extension 5 as shown in Table 4 or Table 5. The U-plane message generator 515 may generate a U-plane message including the I component and the Q component according to the modulation compression technique.

An RU 520 may include a C-plane analyzer 521, a buffer 523, a U-plane analyzer 525, and a modulation decompression unit 527. The C-plane analyzer 521 may receive a C-plane message from the DU 510. The C-plane analyzer 521 may obtain parameter(s) related to the modulation compression from section extension information (e.g., Section Extension 4, Section Extension 5) included in the C-plane message. The C-plane analyzer 521 may obtain section information from the C-plane message. The C-plane analyzer 521 may store the parameter(s) related to the modulation compression and the section information in the buffer 523. The U-plane analyzer 525 may receive a U-plane message from the DU 510. The U-plane analyzer 525 may include the I component and the Q component included in the U-plane message. The modulation decompression unit 527 may obtain the parameter(s) related to the modulation compression and the section information from the buffer 523. The modulation decompression unit 527 may obtain the I component and the Q component from the U-plane analyzer 525. The modulation decompression unit 527 may obtain a bit string for the I component and a bit string for the Q component, based on the parameters related to the modulation compression. For example, upon decompressing, the modulation decompression unit 527 may 'unshift' the constellation according to the 'csf' value and apply a scale factor for the constellation type indicated in the section. A section can have multiple modulation types. The modulation type may be inferred from reMask bits. Each '1' bit in the reMask bits indicates a shift command ('csf') and a scale factor (e.g., 'modCompScaler' when using the Section Extension 4, or 'mcScaleOffset' when using Section Extension 5), for the REs of the PRB.

The RAN standard provides section-based modulation compression. When a compression technique other than the modulation compression is used in data transfer of a specific slot, the section may be configured according to beamId (or ueId) allocation of data resources (e.g., RE/PRB/symbol). However, when the modulation compression is applied, it may be required that all PRBs and symbols in the section use the same 'csf' and the same scaler value (e.g., 'modCompScaler' when using the Section Extension 4, and 'mcScaleOffset' when using Section Extension 5). In other words, since the sections are configured according to the 'csf' and scaler values of data, relatively more sections may be configured in the modulation compression compared to compression techniques other than the modulation compression. For example, if the resource area have the same beamId but different 'csf' and different scaler values, the resource area may be required to be split into different sections.

Referring to FIG. 5B, a resource grid 551 indicates data allocation for each independent data type. A vertical axis of the resource grid 551 may represent a frequency domain (unit: PRB), and a horizontal axis thereof may represent a time domain (unit: symbol). For example, data 551a, data

551b, data 551c, data 551d, data 551e, data 551f, data 551g, data 551h may be included in an area of the resource grid 551.

A resource grid 553 indicates data allocation using no modulation compression. Data individually transmitted through the DU (e.g., data for each beamID or data for each ueId) may have a unique modulation type. However, when the modulation compression technique is not applied, the DU may define a certain area specified by an PRB interval and a symbol interval as a section, and the DU may transmit data for the section to the RU. For example, three sections (e.g., section #0, section #1, and section #2) in the resource grid 553) may be included in the resource grid 553. The section #1 may include a resource area of data 551b, a resource area of data 551c, and a resource area of data 551d. The section #2 may include a resource area of data 551e, a resource area of data 551f, a resource area of data 551g, and a resource area of data 551h.

The resource grid 555 indicates data allocation using modulation compression. A unique modulation type may be applied to each individual data. For example, the data 551c and the data 551d are frequency-divided in a specific symbol (e.g., symbol #4). The data 551c and the data 551d may be divided into different RB regions in the same symbol. If the same modulation compression is applied for each section, the data 551c and the data 551d are required to be allocated to different sections. Unlike the resource grid 553, the data 551d may be requested to be included in a section different from the section including the data 551c. Further, since the modulation type may be distinguished for each symbol for the modulation compression, the section may be time-divided. For example, an independent modulation compression may be applied to each of data 551e, data 551f, data 551g, and data 551h. In case where the same modulation compression is applied for each section, it is required that data 551e, data 551f, data 551g, and data 551h are allocated to different sections.

Although not shown in FIG. 5B, in addition to the case of separation in RB units, another case may occur in which separation for each RE is made, using the Section Extension 4, upon the modulation compression.

As described with reference to FIG. 5B, compared to data transmission using no modulation compression, the data transmission using the modulation compression may require more sections. However, the more the sections being distinguished, the more the amount of fronthaul transmission may increase. Thus, inefficiency in the RU may occur due to an increased overhead for defining the section and redundant transmission of parameter(s) in addition to the modulation compression.

In order to reduce the above-described problem, embodiments of the disclosure propose control information for providing modulation compression information (e.g., 'csf' and scaler value) for data allocated in a partial area of a section. Several areas may be configured within one section, and the modulation compression information may be allocated to each area. The DU (e.g., DU 210) may transmit a C-plane message for the section including the modulation compression information for each region to the RU (e.g., RU 220). For convenience of description of the embodiments of the disclosure, an area distinguished for the modulation compression is referred to as a modulation compression (MC) chunk, in the one section, but instead of the MC chunk, it may be replaced with data chunk, a data bundle, section bundle, and section group, subblock, data subblock, MC subblock, section subblock, MC area, section sub-area, pattern, a symbol pattern, a symbol PRB pattern, section partial area, or a term having an equivalent technical meaning thereto.

Figure 6:
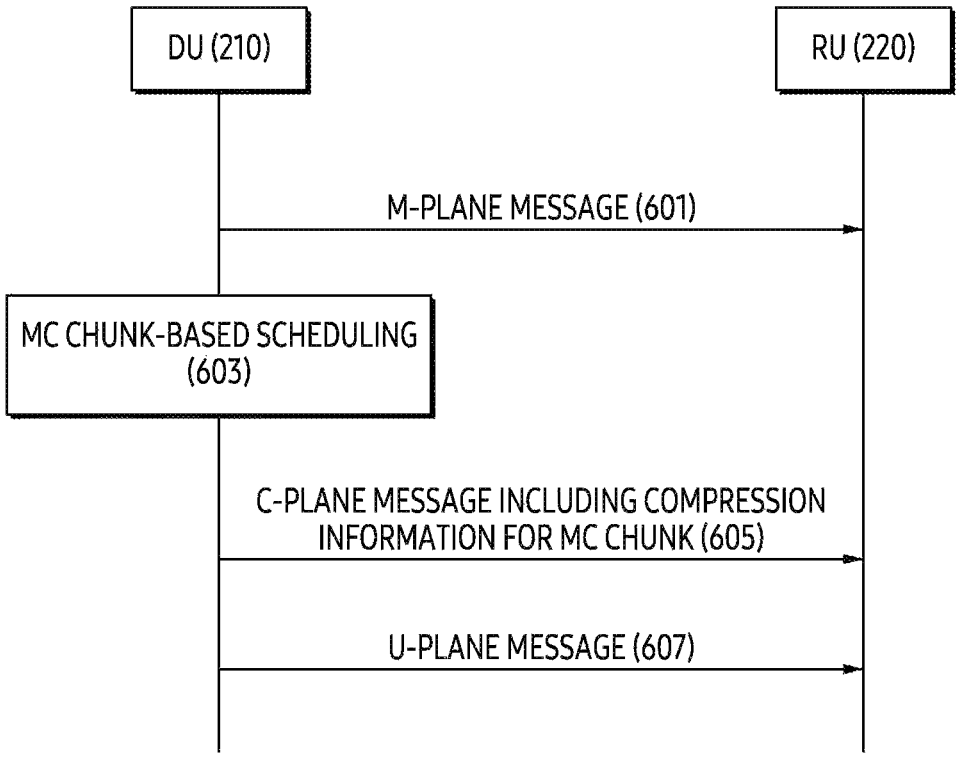
FIG. 6 illustrates an example of signaling between a DU and an RU for providing modulation compression information on a subblock of a section according to an embodiment of the disclosure.

FIG. 6 illustrates an example of signaling between a DU (e.g., DU 210) and an RU (e.g., RU 220) for providing modulation compression information on a subblock of a section according to an embodiment of the disclosure. A subblock of the section is a unit to which the modulation compression is applied and may be referred to as 'MC chunk'.

Referring to FIG. 6, in operation 601, the DU 210 may transmit an M-plane message to the RU 220. According to an embodiment, the DU 210 may provide modulation compression in units of subblocks (i.e., an M-plane message including information notifying that it is possible to provide modulation compression specific to the MC chunk) (hereinafter, referred to as MC chunk-based modulation compression), to the MC chunk. For example, a section extension type for providing MC chunk-based modulation compression may be defined. The M-plane message may indicate a section extension type that is supportable by the DU 210. The supportable section extension type may indicate section extension information for the MC chunk-based modulation compression. The DU 210 may provide at least one parameter for the MC chunk-based modulation compression (described below with reference to FIGS. 7A, 7B, 8A, 8B, and 9A and 9B), to the RU 220 through the M-plane message. Although FIG. 6 describes an example that the DU 210 transmits the M-plane message to the RU 220, the embodiments of the disclosure are not limited thereto. In some embodiments, the RU 220 may transmit the M-plane message to the DU 210. The M-plane message may include at least one of information on a section extension type supportable by the RU 220 or information indicating the parameter(s) applicable in the RU 220.

In operation 603, the DU 210 may perform an MC chunk-based scheduling. The DU 210 may divide one section into one or more MC chunks. The DU 210 may divide one section into a plurality of MC chunks. For example, the DU 210 may divide one section into 4 MC chunks. The DU 210 may determine one or more parameters to indicate each MC chunk. For example, the DU 210 may determine a parameter indicating the number of MC chunks. The DU 210 may determine a parameter indicating the number of one or more symbols for each MC chunk. The DU 210 may determine a parameter indicating the number of one or more PRBs of each MC chunk. The DU 210 may determine an interval between PRBs of MC chunk or a parameter indicating an interval between symbols.

In operation 605, the DU 210 may transmit a C-plane message including compression information on the MC chunk to the RU 220. The C-plane message may include section information. The section information may indicate a resource area for a section. The C-plane message may include section extension information. The section extension information may include information indicating a resource area for an MC chunk (hereinafter, referred to as 'resource area information'). The section extension information may include compression information on the MC chunk.

The resource area information may include at least one of parameters according to a scheduling result of the MC chunk (e.g., the number of MC chunks, the number of one or more symbols of each MC chunk, the number of one or more PRBs of each MC chunk, an interval between PRBs of an MC chunk, or an interval between symbols).

The compression information may include at least one of parameters related to modulation compression (e.g., 'csf' parameter, 'mcScaleReMask' parameter, 'modCompScaler' parameter, or 'mcScaleOffset' parameter) to be applied to data on the resource area of the MC chunk. The 'csf' parameter is a flag indicating whether or not the constellation for the MC chunk is shifted. The 'mcScaleReMask' parameter is a bitmap (hereinafter, referred to as masking information) for Res in the PRB for the MC chunk, in which each bit setting of mcScaleReMask indicates whether 'mcScaleOffset' and 'csf' are applicable to an RE (resource element) transmitted through U-Plane message. The 'modCompScaler' parameter or the 'mcScaleOffset' parameter indicates a scale value for the MC chunk.

At operation 607, the DU 210 may transmit the U-plane message to the RU 220. The DU 210 may perform a modulation compression of data, based on the modulation compression technique according to operations 601 to 605. The DU 210 may generate the U-plane message including I component and Q component according to the modulation compression technique. The U-plane message may include data to be transmitted on an area occupied by the MC chunk. The RU 220 may obtain the parameters related to the modulation compression, based on the modulation compression information for the MC chunk of the section extension information received from the DU 210. Based on the parameters related to the modulation compression, a bit stream for the I component and a bit stream for the Q component may be obtained. For example, upon decompressing, the RU 220 may 'unshift' the constellation according to the 'csf' value and apply a scale value for the constellation type indicated in the section.

Although only the U-plane message for a downlink signal has been described as an example in FIG. 6, the embodiments of the disclosure are not limited thereto. In some embodiments, the modulation compression using the MC chunk according to the embodiments of the disclosure may be also applied to a U-plane message for an uplink signal.

Several areas (i.e., MC chunks) may be defined within one section. The DU 210 may allocate modulation compression information for each MC chunk. The modulation compression information may include a constellation shift flag (e.g., 'csf'). Further, according to an embodiment, the modulation compression information may include scale information (e.g., 'mcScaleReMask' parameter, 'modCompScaler' parameter, or 'mcScaleOffset' parameter, as a scaler value). Further, the modulation compression information may include a constellation shift flag and scale information. Since each MC chunk has its own constellation shift flag and scale information, control information may be configured differently for every method by which the MC chunk is specified.

Hereinafter, referring to FIGS. 7A and 7B, description is made of a method in which an MC chunk is specified by a scheme that it is first distinguished by a symbol unit and then by a PRB unit.

Figure 7A:
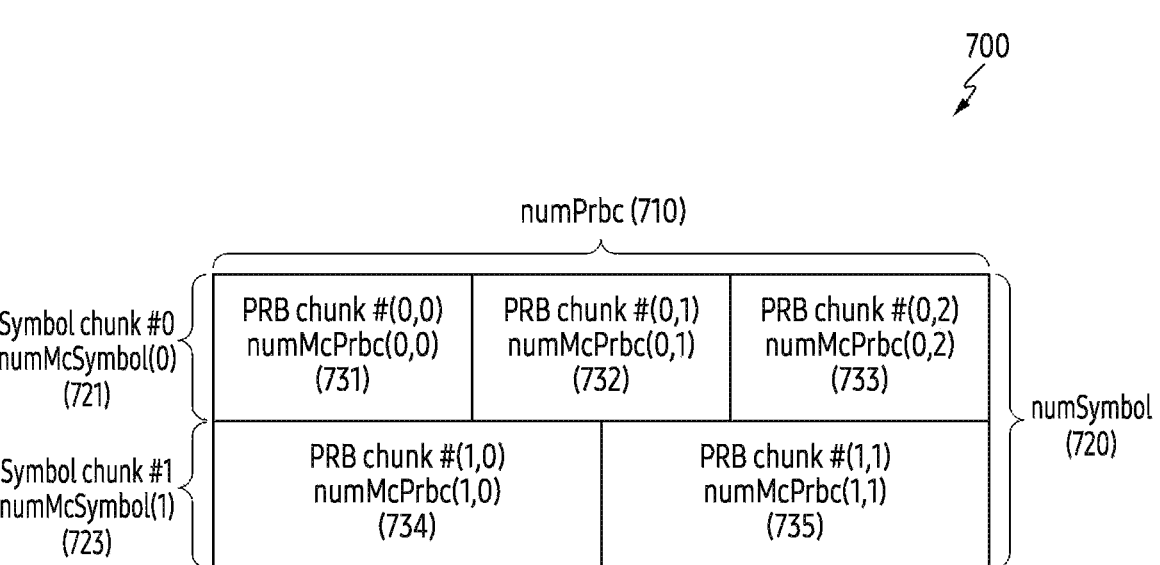
FIGS. 7A and 7B each show an example of a first scheme for partitioning a section according to various embodiments of the disclosure.
Figure 7B:
Figure 7B:
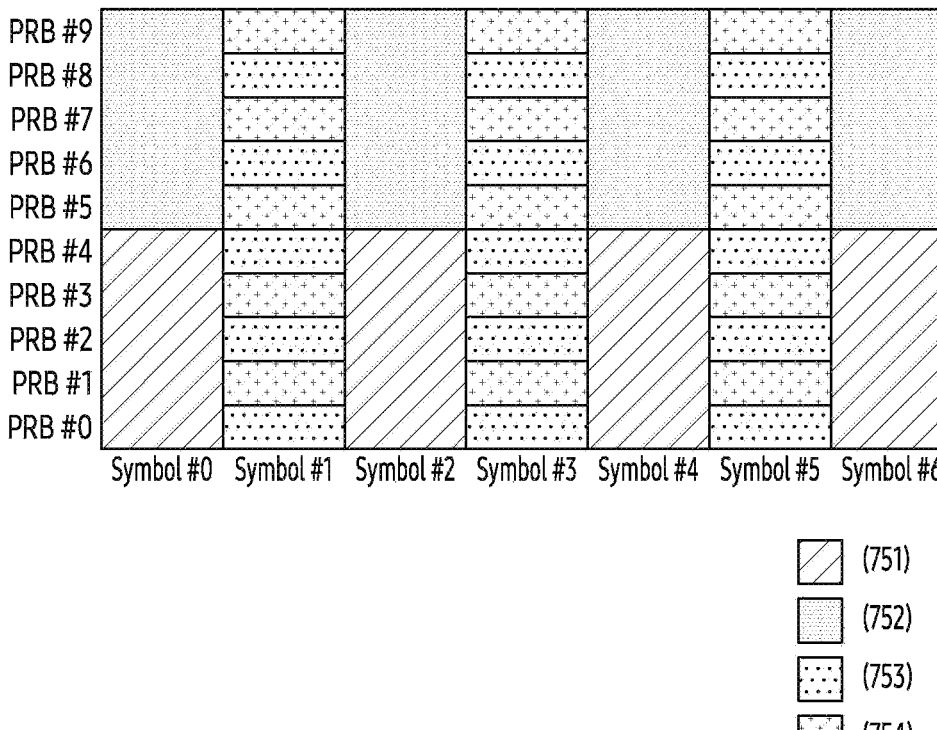

FIGS. 7A and 7B each show an example of a first scheme for dividing a section, according to various embodiments of the disclosure.

Referring to FIGS. 7A and 7B, a single section may be divided into one or more MC chunks. The first scheme may refer to, when configuring the MC chunks, a method in which a section is first divided into bundles of symbols (i.e., symbol chunk), and a frequency domain of the symbol chunk is then divided into bundles of PRBs (i.e., PRB chunk).

Referring to FIG. 7A, a section 700 may be specified by a resource area defined by a 'numPrbc' parameter 710 and a 'numSymbol' parameter 720. The 'numPrbc' parameter 710 represents the number of PRBs. The 'numSymbol' parameter 720 represents the number of symbols. The section 700 may be divided into a plurality of MC chunks. Hereinafter, for describing the MC chunk, parameters for specifying the MC chunk may be used. At least one or all of the parameters described below may be used to specify (or classify) the MC chunk. The following parameters may be exemplified. Parentheses next to parameter names indicate examples of the number of bits.

startMcSymbolId(4b): Start symbol index for a symbol chunk having the same symbol range (can be absent).

numMcSymbol(4b): Th number of symbols for a symbol chunk having the same symbol range. The sum of numMcSymbol should be the same as numSymbol of section. '0' means numSymbol.

mcSymbPeriod(2b): Symbol chunk period. The parameter may indicate whether every symbol, every other symbol (i.e., symbol interval of one symbol), every 2 symbols (i.e., symbol interval of two symbols), or every 4 symbols (i.e., symbol interval of four symbols) is used for a symbol chunk having the same symbol range. It indicates 0=every symbol, 1=every other symbol, 2=every 2 symbols, and 3=every 4 symbols (It may be absent when always every symbol is used). [It indicates if every symbols, every other symbols, every 2 symbols, or every 4 symbols is used for a symbol chunk having the same symbol range. 0=every symbols, 1=every other symbols, 2=every 2 symbols, 3=every 4 symbols. (can be absent when always every symbol is used.)]

numMcPrbChunks(4b): The number of PRB chunks on a symbol chunk #i with numMcSymbol(i) (can be absent).

startMcPrbc(10b): Start PRB index for a PRB chunk in a PRB chunk (can be absent).

numMcPrbc(8b): Number of PRBs for a PRB chunk on a symbol chunk. The sum of numMcPrbc should be the same as numPrbc of section. '0' means numPrbc.

mcPrbPeriod(2b): PRB chunk period. The parameter may indicate whether every RB, every other RB (i.e., PRB interval of one PRB), every 2 RBs (i.e., PRB interval of two PRBs), or every 4 RBs (i.e., PRB interval of 4 PRBs) is used for a PRB chunk. It indicates 0=every RBs, 1=every other RBs, 2=every 2 RBs, 3=every 4 RBs (it may be absent when always every RB is used.) [It indicates if every RBs, every other RBs, every 2 RBs, or every 4 RBs is used for a PRB chunk. 0=every RBs, 1=every other RBs, 2=every 2 RBs, 3=every 4 RBs. (can be absent when always every RB is used.)]

mcRemaskOnOff(1b): This indicates whether mcScaleRemask is present in section extension or the MC chunk. The format of section extension type of a C-plane message to be described later may be changed, through this field (if every Res of the MC chunk share the same csf and modCompScaler, it may be omitted). [This indicates whether there is mcScaleRemask in this section extension or the MC chunk. (can change format of section extension type with this field) (can be absent when all Res in a MC chunk shares the same CSF and modCompScaler.)]

numMcRemask(4b): This indicates the number of mcScaleRemasks in section extensions or MC chunk. (it may be omitted if all Res in MC chunk share the same CSF and the same modCompScaler) [This indicates the number of mcScaleRemask in this section extension or MC chunk (can be absent when all Res in a MC chunk shares the same CSF and modCompScaler.)]

mcScaleReMask(12b): This indicates RE mask of each RE in a PRB applying the corresponding csf/scaler.

periodFlag (1b): This indicates whether mcSymbolPeriod and mcPrbPeriod are used or not for each section extension or MC chunk (This parameter can be absent)

The section 700 may be divided into a plurality of MC chunks. According to the first scheme, it may be first divided into symbol units. The 'numSymbol' parameter 720 may be divided into numMcSymbol(0) 721 and numMcSymbol(1) 723. numMcSymbol(0) 721 means the number of one or more symbols of symbol chunk #0. numMcSymbol(1) 723 means the number of symbols of one or more symbol chunks #1. The 'numSymbol' parameter 720 indicates a sum of the number of one or more symbols of symbol chunk #0 and the number of one or more symbols of symbol chunk #1. After the section 700 is divided into symbol units, the frequency domain per symbol chunk may be divided into PRB units. The 'numPrbc' parameter 710 can be divided. A frequency domain corresponding to numMcSymbol(0) 721 may be divided into three domains (hereinafter, referred to as PRB chunks). The frequency domain corresponding to numMcSymbol(0) 721 may be divided into PRB chunk #0 731 of numMcPrbc(0,0), PRB chunk #1 732 of numMcPrbc(0,1), and PRB chunk #2 733 of numMcPrbc(0,2). A frequency domain corresponding to numMcSymbol(1) 723 may be divided into two domains. A frequency domain corresponding to numMcSymbol(1) 723 may be divided into PRB chunk #3 734 of numMcPrbc(1,0) and PRB chunk #4 735 of numMcPrbc(1,1).

For example, when all of the above-described parameters are used, a symbol index value of one symbol chunk #i and a PRB index value of PRB chunk #j may be obtained by Equations 5 and 6.

$$\text{Symbol index}(l)=\text{startMcSymbolId}+l*(2^{\text{mcSymbPeriod}}), l=0, \ldots \text{numMcSymbol}(i)-1. \qquad \text{Equation 5}$$

$$\text{PRB index}(k)=\text{startMcPrbc}+k*(2^{\text{mcPrbPeriod}}), k=0, \ldots \text{numMcPrbc}(j)-1. \qquad \text{Equation 6}$$

For example, if startMcSymbolId or startMcPrbc is not used among the parameters, then the symbol index value of one symbol chunk #i and the PRB index value of one PRB chunk #j may be obtained by the following Equation.

$$\text{Symbol index}(l)=\text{first symbol index in symbol chunk } \#i+l*(2^{\text{mcSymbPeriod}}), l=0, \ldots \text{numMcSymbol}(i)-1. \qquad \text{Equation 7}$$

The first symbol index is the first empty symbol index after the previous symbol chunk.

$$\text{PRB index}(k)=\text{first PRB index in PRB chunk } \#j+k*(2^{\text{mcPrbPeriod}}), k=0, \ldots \text{numMcPrbc}(j)-1. \qquad \text{Equation 8}$$

The first PRB index is the first empty PRB index after the previous PRB chunk within the symbol chunk.

'numMcPRBChunks' indicates the number of PRB chunks in each symbol chunk. For example, the 'numMcPRBChunks' indicates the number of at least one PRB chunk in each symbol chunk. 'numMcPRBChunks' indicates the number of total MC chunks within a section extension. For example, the 'numMcPRBChunks' indicates the number of all MC chunks included in the section extension.

According to an embodiment of the disclosure, both of 'mcRemaskOnOff' and 'numMcRemask' may exist together in each section extension and/or MC chunk (e.g., symbol chunk or PRB chunk). According to another embodiment, only one of 'mcRemaskOnOff' and 'numMcRemask' may exist in each section extension and/or MC chunk (e.g., symbol chunk or PRB chunk). According to another embodiment, 'mcRemaskOnOff' and 'numMcRemask' may be omitted in each section extension and/or MC chunk (e.g., symbol chunk or PRB chunk).

Both of 'mcRemaskOnOff' and 'numMcRemask' may be included in each section extension (or MC chunk (e.g., symbol chunk or PRB chunk)). For example, all of 'mcRemaskOnOff' and 'numMcRemask' may be included in each section extension. For example, all of 'mcRemaskOnOff' and 'numMcRemask' are included in each MC chunk (e.g., symbol chunk or PRB chunk).

At least one of 'mcRemaskOnOff' or 'numMcRemask' may be included in each section extension (or MC chunk (e.g., symbol chunk or PRB chunk)). For example, at least one of 'mcRemaskOnOff' or 'numMcRemask' are included in each section extension. For example, at least one of 'mcRemaskOnOff' and 'numMcRemask' are included in each MC chunk (e.g., symbol chunk or PRB chunk).

'mcRemaskOnOff' and 'numMcRemask' may be omitted in each section extension (or MC chunk (e.g., symbol chunk or PRB chunk)). For example, 'mcRemaskOnOff' and 'numMcRemask' are included in a field distinct from a section extension (or MC chunk (e.g., symbol chunk or PRB chunk)).

If resources are periodically allocated in the time domain within one section, a parameter for a symbol chunk (e.g., 'mcSymbolPeriod' parameter) may be defined. Further, according to an embodiment, if resources are allocated at regular intervals in the frequency domain within one section, a parameter for a PRB chunk (e.g., 'mcPrbPeriod' parameter) may be defined. In the above-described embodiments, a periodFlag value may or may not exist in each section extension or an MC chunk (symbol chunk or PRB chunk) according to the embodiment. Meanwhile, in the above-described embodiments, one flag parameter has been described, but according to another embodiment, flag parameters for each of mcSymbolPeriod and mcPrbPeriod may separately exist.

The DU 210 may generate section extension information including at least one of the above parameters, in order to indicate the MC chunk partitioned according to the first scheme. The DU 210 may transmit a C-plane message including the section extension information to the RU 220.

The DU 210 may configure a section with one MC chunk, but not use 'mcScaleReMask'. For example, in order to indicate the one MC chunk, the section extension information may be configured as shown in the Table below.

TABLE 6

| ef | extType = X | 1 | Octet N |
|---|---|---|---|
| | extLen = 0x02 (2 words) | 1 | N + 1 |
| numMcSymbol = numSymbol | numMcPrbChunks = 1 | 1 | N + 2 |
| | numMcPrbc = numPrbc | 1 | N + 3 |
| csf | modCompScaler[14:8] | 1 | N + 4 |
| | modCompScaler[7:0] | 1 | N + 5 |
| | Zero padding | 1 | N + 6 |
| | Zero padding | 1 | N + 7 |

'extType' indicates a type of the section extension information. 'extLen' indicates a length of the section extension information. 'numMcSymbol' indicates the number of symbols in the MC chunk (i.e., symbols within the symbol chunk). In the case where there is only one MC chunk in a section, 'numMcSymbol' may be the same as 'numSymbol'. 'numMcPrbChunks' indicates the number of one or more PRB chunks within the symbol chunk. The number of the one or more PRB chunks may be 1. 'numMcPrbc' indicates the number of PRBs in the one PRB chunk. In the case where only one MC chunk exists in a section, 'numMcPrbc' may be the same as 'numPrbc'. 'csf' indicates whether the constellation for the MC chunk is shifted or not, and 'modCompScaler' indicates a scale value for the MC chunk. The scale value may be derived from 15-bits of the 'modCompScaler' field according to calculation of the Equations 1 to 2 above.

According to an embodiment, the DU 210 may configure a section with two MC chunks, without using 'mcScaleReMask'. For example, in order to indicate the two MC chunks, the section extension information may be configured as shown in the Table below.

TABLE 7

| ef | extType = X | 1 | Octet N |
|---|---|---|---|
| | extLen = 0x03 (3 words) | 1 | N + 1 |
| numMcSymbol = numSymbol | numMcPrbChunks = 2 | 1 | N + 2 |
| | numMcPrbc = A | 1 | N + 3 |
| csf | modCompScaler[14:8] | 1 | N + 4 |
| | modCompScaler[7:0] | 1 | N + 5 |
| | numMcPrbc = B | 1 | N + 6 |
| csf | modCompScaler[14:8] | 1 | N + 7 |
| | modCompScaler[7:0] | 1 | N + 8 |
| | Zero padding | 1 | N + 9 |
| | Zero padding | 1 | N + 10 |
| | Zero padding | 1 | N + 11 |

'extType' indicates the type of section extension information. 'extLen' indicates the length of section extension information. 'numMcSymbol' indicates the number of symbols of the MC chunks (i.e., the number of symbols in the symbol chunk). For example, the number of symbol chunks may be 1. 'numMcSymbol' may be the same as 'numSymbol'. As such, the section extension information may include one 'numMcSymbol' field. 'numMcPrbChunks' indicates the number of one or more PRB chunks in the symbol chunk. For example, the number of one or more PRB chunks may be 2. 'numMcPrbc' of N+3 octet indicates the number of PRBs in the first PRB chunk. The symbol chunk and the first PRB chunk may indicate one MC chunk. 'csf' of N+4 octet indicates whether the constellation is shifted for the one MC chunk, and 'modCompScaler' of N+4 octet and N+5 octet indicates a scale value for the one MC chunk. The scale value may be derived from 15-bits of the 'modCompScaler' field according to calculation of the Equations 1 to 2 as above. 'numMcPrbc' of N+6 octet indicates the number of PRBs in the second PRB chunk. The symbol chunk and the second PRB chunk may indicate another MC chunk. 'csf' of N+7 octet indicates whether the constellation is shifted for the other MC chunk, and 'modCompScaler' of N+7 octet and N+8 octet indicates the scale value for the other MC chunk. The scale value may be derived from 15-bits of the 'modCompScaler' field according to calculation of the Equations 1 to 2 above.

According to an embodiment, the DU 210 may use 'mcScaleReMask' and configure a section with one MC chunk. For example, in order to indicate the one MC chunk, the section extension information may be configured as shown in the Table below.

TABLE 8

| ef | extType = X | 1 | Octet N |
|---|---|---|---|
| | extLen = 0x2 (2 words) | 1 | N + 1 |
| numMcSymbol = numSymbol | numMcPrbChunk = 1 | 1 | N + 2 |
| | numMcPrbc = numPrbc | 1 | N + 3 |
| | mcScaleReMask[11:4] | 1 | N + 4 |

TABLE 8-continued

| mcScaleReMask[3:0] | csf | mcScaleOffset [14:12] | 1 | N + 5 |
| mcScaleOffset [11:4] | | | 1 | N + 6 |
| mcScaleOffset [3:0] | | zero padding | 1 | N + 7 |

'extType' indicates the type of section extension information. 'extLen' indicates the length of section extension information. 'numMcSymbol' indicates the number of symbols in the MC chunk (i.e., symbols within the symbol chunk). 'numMcPrbChunks' indicates the number of one or more PRB chunks within the symbol chunk. For example, the number of the one or more PRB chunks may be 1. Thus, 'numMcPrbc' may be the same as 'numPrbc'. 'mcScaleReMask' is a bitmap (hereinafter, referred to as 'masking information') for Res in the PRB, and each bit setting of mcScaleReMask may indicate whether 'mcScaleOffset' and 'csf' are applicable to an RE (resource element) transmitted through U-Plane message (e.g. '0'=not applicable, '1'=applicable). 'csf' indicates whether the constellation is shifted or not, and 'mcScaleOffset' indicates a scale value. The scale value may be derived from 15-bits of the 'mcScaleOffset' field according to calculation of the Equations 3 to 4 above.

According to an embodiment, the DU 210 may use 'mcScaleReMask' and configure a section with two MC chunks. For example, in order to indicate the two MC chunks, the section extension information may be configured as shown in the Table below.

TABLE 9

| ef | | extType = X | 1 | Octet N |
|---|---|---|---|---|
| | | extLen = 0x4 (4 words) | 1 | N + 1 |
| numMcSymbol = A | | numMcPrbChunk = 1 | 1 | N + 2 |
| | | numMcPrbc = numPrbc | 1 | N + 3 |
| | | mcScaleReMask[11:4] | 1 | N + 4 |
| mcScaleReMask[3:0] | csf | mcScaleOffset [14:12] | 1 | N + 5 |
| | | mcScaleOffset [11:4] | 1 | N + 6 |
| mcScaleOffset [3:0] | | zero padding | 1 | N + 7 |
| numMcSymbol = B | | numMcPrbChunk = 1 | 1 | N + 8 |
| | | numMcPrbc = numPrbc | 1 | N + 9 |
| | | mcScaleReMask[11:4] | 1 | N + 10 |
| mcScaleReMask[3:0] | csf | mcScaleOffset [14:12] | 1 | N + 11 |
| | | mcScaleOffset [11:4] | 1 | N + 12 |
| mcScaleOffset [3:0] | | zero padding | 1 | N + 13 |
| | zero padding | | 1 | N + 14 |
| | zero padding | | 1 | N + 15 |

'extType' indicates the type of section extension information. 'extLen' indicates the length of section extension information. 'numMcSymbol' indicates the number of symbols in the MC chunk, that is, symbols within the symbol chunk. For example, the number of symbol chunks may be 2. As such, the section extension information may include two 'numMcSymbol' fields. Among the two 'numMcSymbol' fields, the first 'numMcSymbol' field indicates the number of one or more symbols of the first symbol chunk. Among the two 'numMcSymbol' fields, the second 'numMcSymbol' field indicates the number of one or more symbols of the second symbol chunk. The section extension information may include information for MC chunks for each 'numMcSymbol' field.

'numMcPrbChunks' for the first 'numMcSymbol' field indicates the number of one or more PRB chunks within the first symbol chunk. For example, the number of the one or more PRB chunks in the first symbol chunk may be 1. 'numMcPrbc' of N+3 octet indicates the number of PRBs in the first symbol chunk and the corresponding PRB chunk. The first symbol chunk and the PRB chunk may indicate one MC chunk. 'mcScaleReMask' of N+4 octet to N+5 octet is a bitmap for Res in PRB of the one MC chunk, and each bit setting of mcScaleReMask may indicate whether 'mcScaleOffset' and 'csf' are applicable to an RE transmitted through U-Plane message (e.g., '0'=not applicable, '1'=applicable). 'csf' of N+5 octet indicates whether the constellation is shifted for the one MC chunk, and 'mcScaleOffset' of N+5 octet to N+6 octet indicates a scale value for the one MC chunk. The scale value may be derived from 15-bits of the 'mcScaleOffset' field according to calculation of the Equations 3 to 4 above.

'numMcPrbChunks' for the second 'numMcSymbol' field indicates the number of one or more PRB chunks in the second symbol chunk. For example, the number of the one or more PRB chunks in the second symbol chunk may be 1. 'numMcPrbc' of N+3 octet indicates the number of PRBs in the second symbol chunk and the corresponding PRB chunk. The second symbol chunk and the PRB chunk may point to another MC chunk. 'mcScaleReMask' of N+10 octet to N+11 octet is a bitmap for Res in PRB of the one MC chunk, and each bit setting of mcScaleReMask may indicate whether 'mcScaleOffset' and 'csf' are applicable to an RE transmitted through U-Plane message (e.g., '0'=not applicable, '1'=applicable). 'csf' of N+11 octet indicates whether the constellation is shifted for the one MC chunk, and 'mcScaleOffset' of octets N+11 to N+12 indicates a scale value for the one MC chunk. The scale value may be derived from 15-bits of the 'mcScaleOffset' field according to calculation of the Equations 3 to 4 as above.

According to an embodiment, the DU 210 may use 'mcScaleReMask' and configure a section 750 with four MC chunks having a period. Two symbol chunks may be configured in one section, and two PRB chunks may be configured in each symbol chunk. A 'period flag' parameter for each symbol chunk may be used. In order to indicate MC chunks according to the section fragmentation shown in FIG. 7B, the section extension information may be configured as shown in the Table below.

TABLE 10

| ef | | extType = X | | 1 | Octet N |
|---|---|---|---|---|---|
| | | extLen = 0x8 (8 words) | | 1 | N + 1 |
| numMcSymbol = A | periodFlag = 1 | mcSymbPeriod = 1 | | 1 | N + 2 |
| numMcPrbChunk = 2 | | zero padding | | | N + 3 |
| | | numMcPrbc = C | | 1 | N + 4 |
| mcPrbPeriod = 0 | | zero padding | | 1 | N + 5 |
| | | mcScaleReMask[11:4] | | 1 | N + 6 |
| mcScaleReMask[3:0] | csf | | mcScaleOffset [14:12] | 1 | N + 7 |
| | | mcScaleOffset [11:4] | | 1 | N + 8 |
| mcScaleOffset [3:0] | | zero padding | | 1 | N + 9 |
| | | numMcPrbc = D | | 1 | N + 10 |
| mcPrbPeriod = 0 | | reserved | | 1 | N + 11 |
| | | mcScaleReMask[11:4] | | 1 | N + 12 |

TABLE 10-continued

| | | | | |
|---|---|---|---|---|
| mcScaleReMask[3:0] | csf | mcScaleOffset [14:12] | 1 | N + 13 |
| mcScaleOffset [11:4] | | | 1 | N + 14 |
| mcScaleOffset [3:0] | | zero padding | 1 | N + 15 |
| numMcSymbol = B | periodFlag = 1 | mcSymbPeriod = 1 | 1 | N + 16 |
| numMcPrbChunk = 2 | | zero padding | | N + 17 |
| | numMcPrbc = C | | 1 | N + 18 |
| mcPrbPeriod = 1 | | zero padding | 1 | N + 19 |
| mcScaleReMask[11:4] | | | 1 | N + 20 |
| mcScaleReMask[3:0] | csf | mcScaleOffset [14:12] | 1 | N + 21 |
| mcScaleOffset [11:4] | | | 1 | N + 22 |
| mcScaleOffset [3:0] | | zero padding | 1 | N + 23 |
| | numMcPrbc = D | | 1 | N + 24 |
| mcPrbPeriod = 1 | | zero padding | 1 | N + 25 |
| mcScaleReMask[11:4] | | | 1 | N + 26 |
| mcScaleReMask[3:0] | csf | mcScaleOffset [14:12] | 1 | N + 27 |
| mcScaleOffset [11:4] | | | 1 | N + 28 |
| mcScaleOffset [3:0] | | zero padding | 1 | N + 29 |

In the example shown in FIG. 7B, the section 750 may be configured with 7 symbols and 10 PRBs, wherein A=4, B=3, C=5, D=5.

According to the above Table and FIG. 7B, the first MC chunk 751 may be specified by 4 symbols (A=4) and 5 PRBs (C=5). Since 'mcSymbPeriod' is 1, an interval between two symbols among the four symbols may be one symbol. Since 'mcPrbPeriod' is zero, an interval between PRBs among the 5 PRBs may be zero. The first MC chunk 751 may occupy five consecutive PRBs. For example, the first MC chunk 751 may occupy PRB #0, PRB #1, PRB #2, PRB #3, and PRB #4.

According to the above Table and FIG. 7B, the second MC chunk 752 may be specified by 4 symbols (A=4) and 5 PRBs (D=5). Since 'mcSymbPeriod' is 1, the interval between two symbols among the four symbols may be one symbol. Since 'mcPrbPeriod' is zero, the interval between PRBs among the 5 PRBs may be zero. The second MC chunk 752 may occupy five consecutive PRBs. For example, the second MC chunk 752 may occupy PRB #5, PRB #6, PRB #7, PRB #8, and PRB #9.

According to the above Table and FIG. 7B, the third MC chunk 753 may be specified by 3 symbols (B=3) and 5 PRBs (C=5). Since 'mcSymbPeriod' is 1, the interval between two symbols among the three symbols may be one symbol. Since 'mcPrbPeriod' is 1, the interval between PRBs among the 5 PRBs may be one PRB. For example, the third MC chunk 753 may occupy PRB #0, PRB #2, PRB #4, PRB #6, and PRB #8.

According to the above Table and FIG. 7B, the fourth MC chunk 754 may be specified by 3 symbols (B=3) and 5 PRBs (D=5). Since 'mcSymbPeriod' is 1, the interval between two symbols among the three symbols may be one symbol. Since 'mcPrbPeriod' is 1, the interval between PRBs among the 5 PRBs may be one PRB. The fourth MC chunk 754 may start from an empty PRB area. For example, the fourth MC chunk 754 may occupy PRB #1, PRB #3, PRB #5, PRB #7, and PRB #9.

A format in which some area of octets corresponding to zero padding in Tables 6 to 10 (e.g., octet N+7 in Table 9, octets N+3, N+5, N+9, N+17, N+19, N+23, N+25 in Table 10) are reduced so that all the parameters are continuously disposed may also be understood as an embodiment of the disclosure.

Figure 8A:
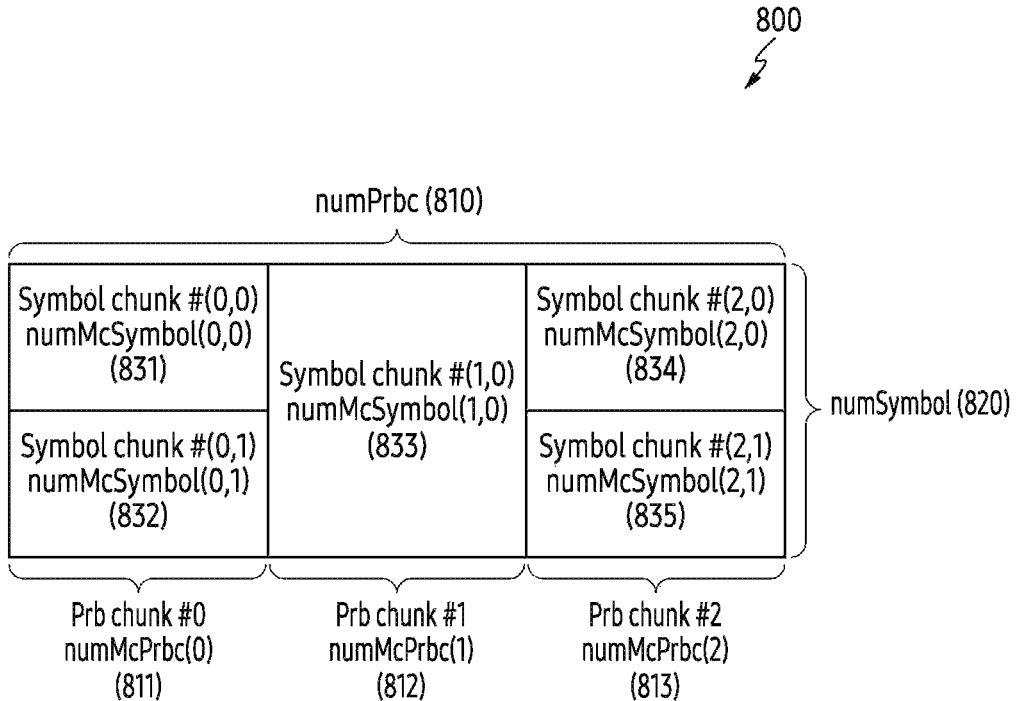
FIGS. 8A and 8B each show an example of a second scheme for partitioning a section according to various embodiments of the disclosure.
Figure 8B:
Figure 8B:
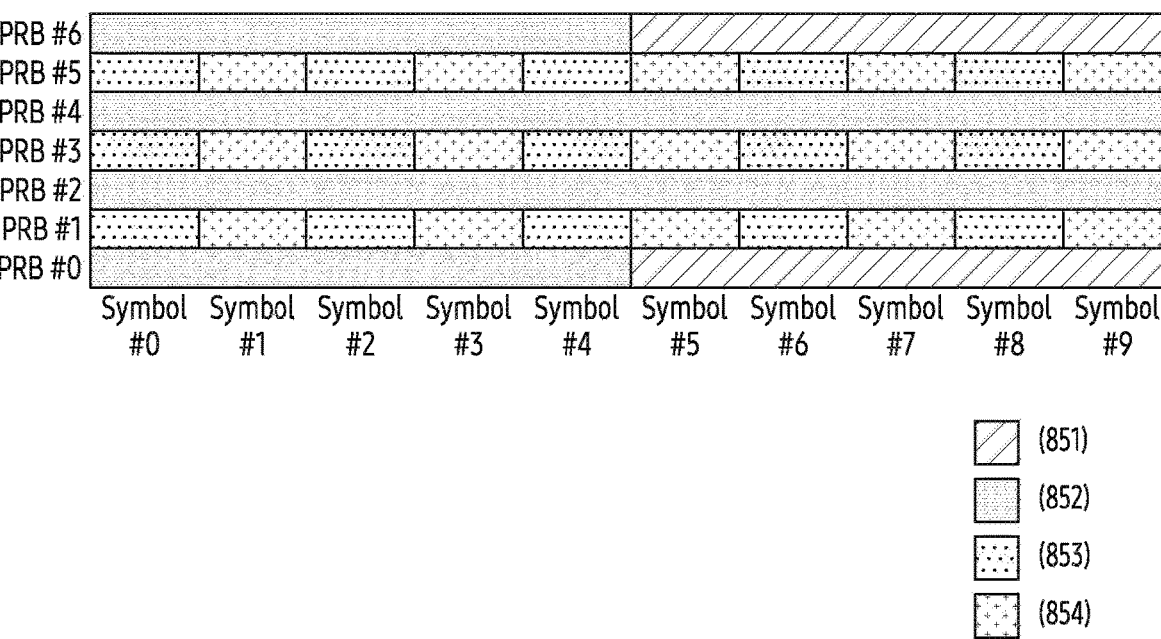

FIGS. 8A and 8B each show an example of a second scheme for dividing a section, according to various embodiments of the disclosure. One section may be divided into one or more MC chunks. The second scheme may imply a method that, when configuring the MC chunks, a section is first divided into bundles of PRBs (i.e., PRB chunks), and the time domain of the PRB chunks is then divided into bundles of symbols (i.e., symbol chunks).

Referring to FIG. 8A, a section 800 may be specified by a resource area defined by a 'numPrbc' parameter 810 and a 'numSymbol' parameter 820. The 'numPrbc' parameter 810 indicates the number of PRBs. The 'numSymbol' parameter 820 indicates the number of symbols. The section 800 may be divided into a plurality of MC chunks. Hereinafter, in order to describe the MC chunk, the parameters for specifying the MC chunk may be first used. At least one or all of the parameters described below may be used to specify (or classify) the MC chunk. The following parameters may be exemplified. Parentheses right next to the parameter names indicate an example of the number of bits.

startMcPrbc(10b): Start PRB index for PRB chunk (can be absent).

numMcPrbc(8b): The number of PRBs for a PRB chunk having the same PRB range. The sum of numMcPrbc should be the same as numPrbc of section. '0' means numPrbc.

mcPrbPeriod(2b): PRB chunk period. The parameter indicates whether every RB, every other RB (i.e. PRB interval of one PRB), every 2 RBs (i.e. PRB interval of two PRBs), or every 4 RBs (i.e. PRB interval of 4 PRBs) is used for a PRB chunk. This parameter indicates 0=every RB, 1=every other RB, 2=every 2 RB, 3=every 4 RB. (can be absent when always every RB is used). [It indicates if every RBs, every other RBs, every 2 RBs, or every 4 RBs is used for a PRB chunk. 0=every RBs, 1=every other RBs, 2=every 2 RBs, 3=every 4 RBs. (can be absent when always every RB is used.)]

numMcSymbolChunks(4b): number of symbol chunks of PRB chunk #i with numMcPrbc(i) (can be absent).

startMcSymbolId(4b): Start symbol index for a symbol chunk having the same symbol range (can be absent).

numMcSymbol(4b): The number of symbols for a symbol chunk on a PRB chunk with numMcPrb. The sum of numMcSymbol should be the same as numSymbol of section. '0' ma mean numSymbol.

mcSymbPeriod(2b): The parameter may indicate whether every symbol, every other symbol (i.e. symbol interval of one symbol), every 2 symbols (i.e. symbol interval of two symbols), or every 4 symbols (i.e., the symbol interval of 4 symbols) is used for a symbol chunk having the same symbol range. This parameter indicates 0=all symbols, 1=all other symbols, 2=every 2 symbols, 3=every 4 symbols (can be absent when always every symbol is used.) [It indicates if every symbols, every other symbols, every 2 symbols, or every 4 symbols is used for a symbol chunk having the same symbol range. 0=every symbol, 1=every other symbol, 2=every 2 symbols, 3=every 4 symbols. (can be absent when always every symbol is used.)]

mcRemaskOnOff(1b): This indicates whether mcScaleRemask is present in the section extension or MC chunk. The format of section extension type of a C-plane message described below may be changed through this field (can be omitted) [This indicates there are mcScaleRemask in this section extension or MC chunk (can change format of section extension type with this field). (can be absent)]

numMcRemask(4b): This indicates the number of mcScaleRemasks in section extensions or MC chunk. (it may be omitted if all Res in MC chunk share the same CSF and the same modCompScaler) [This indicates the number of mcScaleRemask in this section extension or MC chunk (can be absent when all Res in a MC chunk shares the same CSF and modCompScaler.)]

mcScaleReMask(12b): This indicates an RE mask of each RE of a PRB which applies the corresponding csf/scaler.

periodFlag (1b): This indicates whether mcSymbolPeriod and mcPrbPeriod for each section are used or not for each section extension or MC chunk. (can be absent)

The section 800 may be divided into a plurality of MC chunks. According to the second scheme, the section 800 may be first divided into PRB units. The 'numPrbc' parameter 810 may be divided into numMcPrbc(0) 811, numMcPrbc(1) 812, and numMcPrbc(2) 813. The numMcPrbc(0) 811 means the number of one or more PRBs of PRB chunk #0. The numMcSymbol(1) 812 means the number of one or more PRBs of PRB chunk #1. The numMcSymbol(2) 813 means the number of one or more PRBs of PRB chunk #2. The 'numPrbc' parameter 810 indicates a sum of the number of one or more PRBs of PRB chunk #0, the number of one or more PRBs of PRB chunk #1, and the number of one or more PRBs of PRB chunk #2. After the section 800 is divided into PRB units, a time domain per PRB chunk may be divided into symbol units. The 'numSymbol' parameter 820 may be divided. The time domain corresponding to numMcPrbc(0) 811 may be divided into two domains (hereinafter referred to as 'symbol chunks'). The time domain corresponding to numMcPrbc(0) 811 may be divided into symbol chunk #0 831 of numMcSymbol(0,0) and symbol chunk #1 832 of numMcSymbol(0, 1). The time domain corresponding to numMcPrbc(1) 812 may not be divided. The time domain corresponding to numMcPrbc(1) 812 may include symbol chunk #2 833 of one numMcSymbol(1,0). The time domain corresponding to numMcPrbc(2) 813 may be divided into two domains. The time domain corresponding to numMcPrbc(0) 811 may be divided into symbol chunk #3 834 of numMcSymbol(2,0) and symbol chunk #4 835 of numMcSymbol(2,1).

For example, when all of the above-described parameters are used, a PRB index value of PRB chunk #i and a symbol index value of one symbol chunk #i may be obtained by the following Equation.

$$\text{PRB index}(k)=\text{startMcPrbc}+k*(2^{\text{mcPrbPeriod}}),$$
$$k=0, \ldots \text{numMcPrbc}(i)-1 \qquad \text{Equation 9}$$

$$\text{Symbol index}(l)=\text{startMcSymbolId}+l*(2^{\text{mcSymbPeriod}}),l=0, \ldots \text{numMcSymbol}(j)-1 \qquad \text{Equation 10}$$

When neither the startMcSymbolId parameter nor the startMcPrbc parameter is used, the PRB index value of PRB chunk #i and the symbol index value of one symbol chunk #i may be determined by the following Equation.

$$\text{PRB index}(k)=\text{first PRB index in PRB chunk } \#j+k*(2^{\text{mcPrbPeriod}}),k=0, \ldots \text{numMcPrbc}(i)-1 \qquad \text{Equation 11}$$

The first PRB index is a first empty PRB index after the previous PRB chunk within the symbol chunk.

$$\text{Symbol index}(l)=\text{first symbol index in symbol chunk } \#i+l*(2^{\text{mcSymbPeriod}}),l=0, \ldots \text{numMcSymbol}(j)-1 \qquad \text{Equation 12}$$

The first symbol index is a first empty symbol index after the previous symbol chunk.

'numMcSymbolChunks' indicates the number of PRB chunks in each symbol chunk. For example, the 'numMcSymbolChunks' indicates the number of at least one symbol chunk in each symbol chunk. 'numMcSymbolChunks' indicates the number of total MC chunks within a section extension. For example, the 'numMcSymbolChunks' indicates the number of all MC chunks included in the section extension.

According to an embodiment, both of 'mcRemaskOnOff' and 'numMcRemask' may exist together in each section extension and/or MC chunk (e.g., symbol chunk or PRB chunk). According to an embodiment, only one of 'mcRemaskOnOff' and 'numMcRemask' may exist in each section extension and/or MC chunk (e.g., symbol chunk or PRB chunk). According to an embodiment, 'mcRemaskOnOff' and 'numMcRemask' may be omitted in each section extension and/or MC chunk (e.g., symbol chunk or PRB chunk).

Both of 'mcRemaskOnOff' and 'numMcRemask' may be included in each section extension (or MC chunk (e.g., symbol chunk or PRB chunk)). For example, all of 'mcRemaskOnOff' and 'numMcRemask' are included in each section extension. For example, all of 'mcRemaskOnOff' and 'numMcRemask' are included in each MC chunk (e.g., symbol chunk or PRB chunk).

At least one of 'mcRemaskOnOff' or 'numMcRemask' may be included in each section extension (or MC chunk (e.g., symbol chunk or PRB chunk)). For example, at least one of 'mcRemaskOnOff' or 'numMcRemask' are included in each section extension. For example, at least one of 'mcRemaskOnOff' and 'numMcRemask' are included in each MC chunk (e.g., symbol chunk or PRB chunk).

'mcRemaskOnOff' and 'numMcRemask' may be omitted in each section extension (or MC chunk (e.g., symbol chunk or PRB chunk)). For example, 'mcRemaskOnOff' and 'numMcRemask' are included in a field distinct from a section extension (or MC chunk (e.g., symbol chunk or PRB chunk)).

When the resources are periodically allocated in the time domain within one section, a parameter for a symbol chunk (e.g., 'mcSymbolPeriod' parameter) may be defined. When the resources are allocated at regular intervals in the frequency domain within one section, a parameter for a PRB chunk (e.g., 'mcPrbPeriod' parameter) may be defined. In the above-described embodiments, the 'periodFlag' value may or may not exist in each section extension or MC chunk (symbol chunk or PRB chunk) according to each embodiment. Although in the above-described embodiments, one flag parameter has been described, the flag parameters for each of 'mcSymbolPeriod' or 'mcPrbPeriod' may exist separately, according to another embodiment.

The DU 210 may generate section extension information including at least one of the above parameters in order to indicate the MC chunk partitioned according to the second scheme. The DU 210 may transmit a C-plane message including the section extension information to RU 220.

The DU 210 may configure a section with one MC chunk without using 'mcScaleReMask'. For example, in order to indicate the one MC chunk, the section extension information may be configured as shown in the following Table.

TABLE 11

| ef | extType = X | 1 | Octet N |
|---|---|---|---|
| | extLen = 0x02 (2 words) | 1 | N + 1 |
| | numMcPrbc = numPrbc | 1 | N + 2 |
| numMcSymbolChunks = 1 | numMcSymbol = numSymbol | 1 | N + 3 |
| csf | modCompScaler[14:8] | 1 | N + 4 |
| | modCompScaler[7:0] | 1 | N + 5 |
| | Zero padding | 1 | N + 6 |
| | Zero padding | 1 | N + 7 |

'extType' indicates the type of section extension information. 'extLen' indicates the length of section extension information. 'numMcPrbc' indicates the number of PRBs of MC chunk (i.e., the number of PRBs in the PRB chunk). For example, when only one MC chunk exists in a section, 'numMcPrbc' may be the same as 'numPrbc'. 'numMcSymbolChunks' indicates the number of one or more symbol chunks in the PRB chunk. For example, the number of the one or more symbol chunks may be 1. 'numMcSymbol' indicates the number of symbols within the one symbol chunk. For example, when only one MC chunk is present in a section, 'numMcSymbol' may be the same as 'numSymbol'. 'csf' indicates whether the constellation is shifted or not, and 'modCompScaler' indicates a scale value. The scale value may be derived from 15-bits of the 'modCompScaler' field according to calculation of the Equations 1 to 2 as above.

According to an embodiment, the DU 210 may configure a section with two MC chunks without using 'mcScaleReMask'. For example, in order to indicate the two MC chunks, the section extension information may be configured as shown in the following Table.

TABLE 12

| ef | extType = X | 1 | Octet N |
|---|---|---|---|
| | extLen = 0x03 (3 words) | 1 | N + 1 |
| | numMcPrbc = numPrbc | 1 | N + 2 |
| numMcSymbolChunks = 2 | numMcSymbol = A | 1 | N + 3 |
| csf | modCompScaler[14:8] | 1 | N + 4 |
| | modCompScaler[7:0] | 1 | N + 5 |
| reserved | numMcSymbol = B | 1 | N + 6 |
| csf | modCompScaler[14:8] | 1 | N + 7 |
| | modCompScaler[7:0] | 1 | N + 8 |
| | Zero padding | 1 | N + 9 |
| | Zero padding | 1 | N + 10 |
| | Zero padding | 1 | N + 11 |

'extType' indicates the type of section extension information. 'extLen' indicates the length of section extension information. 'numMcPrbc' indicates the number of PRBs of the MC chunk, that is, the number of PRBs within the PRB chunk. For example, the number of PRB chunks may be 1. 'numMcPrbc' may be the same as 'numPrbc'. As such, the section extension information may include one 'numMcPrbc' field. 'numMcSymbolChunks' indicates the number of one or more symbol chunks within the PRB chunk. For example, the number of the one or more symbol chunks may be 2. 'numMcSymbol' of N+3 octet indicates the number of symbols within the first symbol chunk. The PRB chunk and the first symbol chunk may indicate one MC chunk. 'csf' of N+4 octet indicates whether the constellation is shifted for the one MC chunk, and 'modCompScaler' of N+4 octet and N+5 octet indicates a scale value for the one MC chunk. The scale value may be derived from 15-bits of the 'modCompScaler' field according to calculation of the Equations 1 to 2 as above. 'numMcSymbol' of N+6 octet indicates the number of symbols within the second symbol chunk. The PRB chunk and the second symbol chunk may indicate another MC chunk. 'csf' of N+7 octet indicates whether the constellation is shifted for the other MC chunk, and 'modCompScaler' of N+7 octet and N+8 octet indicates a scale value for the other MC chunk. The scale value may be derived from 15-bits of the 'modCompScaler' field according to calculation of the Equations 1 to 2 as above.

According to an embodiment, the DU 210 may use 'mcScaleReMask' and configure a section with one MC chunk. For example, in order to indicate the one MC chunk, the section extension information may be configured as shown in the Table below.

TABLE 13

| ef | extType = X | 1 | Octet N |
|---|---|---|---|
| | extLen = 0x2 (2 words) | 1 | N + 1 |
| | numMcPrbc = numPrbc | 1 | N + 2 |
| numMcSymbolChunk = 1 | numMcSymbol = numSymbol | 1 | N + 3 |
| | mcScaleReMask[11:4] | 1 | N + 4 |
| mcScaleReMask[3:0] | csf | mcScaleOffset [14:12] | 1 | N + 5 |
| | mcScaleOffset [11:4] | 1 | N + 6 |
| mcScaleOffset [3:0] | zero padding | 1 | N + 7 |

'extType' indicates the type of section extension information. 'extLen' indicates the length of section extension information. 'numMcPrbc' indicates the number of PRBs of the MC chunk, that is, the number of PRBs within the PRB chunk. 'numMcSymbolChunks' indicates the number of one or more symbol chunks within the PRB chunk. For example, the number of the one or more symbol chunks may be 1. Thus, 'numMcSymbol' can be the same as 'numSymbol'. 'mcScaleReMask' is a bitmap (hereinafter, referred to as 'masking information') for Res in the PRB, and each bit setting of mcScaleReMask may indicate whether 'mcScaleOffset' and 'csf' are applicable to an RE (resource element) transmitted through U-Plane message (e.g., '0'=not applicable, '1'=applicable). 'csf' indicates whether the constellation is shifted or not, and 'mcScaleOffset' indicates a scale value. The scale value may be derived from 15-bits of the 'mcScaleOffset' field according to calculation of the Equations 3 to 4 as above.

According to an embodiment, the DU 210 may use 'mcScaleReMask' and configure a section with two MC chunks. For example, in order to indicate the two MC chunks, the section extension information may be configured as shown in the Table below.

TABLE 14

| ef | extType = X | 1 | Octet N |
|---|---|---|---|
| | extLen = 0x4 (4 words) | 1 | N + 1 |
| | numMcPrbc = A | 1 | N + 2 |
| numMcSymbolChunk = 1 | numMcSymbol = numSymbol | 1 | N + 3 |
| | mcScaleReMask[11:4] | 1 | N + 4 |
| mcScaleReMask[3:0] | csf | mcScaleOffset [14:12] | 1 | N + 5 |
| | mcScaleOffset [11:4] | 1 | N + 6 |
| mcScaleOffset [3:0] | zero padding | 1 | N + 7 |
| | numMcPrbc = B | 1 | N + 8 |
| numMcSymbolChunk = 1 | numMcSymbol = numSymbol | 1 | N + 9 |
| | mcScaleReMask[11:4] | 1 | N + 10 |
| mcScaleReMask[3:0] | csf | mcScaleOffset [14:12] | 1 | N + 11 |
| | mcScaleOffset [11:4] | 1 | N + 12 |
| mcScaleOffset [3:0] | zero padding | 1 | N + 13 |
| | zero padding | 1 | N + 14 |
| | zero padding | 1 | N + 15 |

The DU 210 may use 'mcScaleReMask' and configure a section with two MC chunks. For example, in order to indicate the two MC chunks, the section extension information may be configured as shown in the Table below.

'extType' indicates the type of section extension information. 'extLen' indicates the length of section extension information. 'numMcPrbc' indicates the number of PRBs of the MC chunk, that is, the number of PRBs within the PRB chunk. For example, the number of PRB chunks may be 2. As such, the section extension information may include two 'numMcPrbc' fields. The first 'numMcPrbc' field of the two 'numMcPrbc' fields indicates the number of one or more PRBs of the first PRB chunk. The second 'numMcPrbc' field of the two 'numMcPrbc' fields indicates the number of one or more PRBs of the second PRB chunk. The section extension information may include information for the MC chunk for each 'numMcPrbc' field.

'numMcSymbolChunks' for the first 'numMcPrbc' field indicates the number of one or more symbol chunks within the first PRB chunk. For example, the number of the one or more symbol chunks within the first PRB chunk may be 1. 'numMcSymbol' of N+3 octet indicates the number of for Res in the PRB of the one MC chunk, and each bit setting of mcScaleReMask may indicate whether 'mcScaleOffset' and 'csf' are applicable to an RE transmitted through U-Plane message (e.g., '0'=not applicable, '1'=applicable). 'csf' in N+11 octet indicates whether the constellation is shifted for the one MC chunk, and 'mcScaleOffset' in N+11 octet to N+12 octet indicates a scale value for the one MC chunk. The scale value may be derived from 15-bits of the 'mcScaleOffset' field according to calculation of the Equations 3 to 4 as above.

The DU 210 may use 'mcScaleReMask' and configure the section 850 with four MC chunks having a period. Two PRB chunks may be configured in one section, and two symbol chunks may be configured in each PRB chunk. A 'period flag' parameter for each PRB chunk may be used. For example, in order to indicate the MC chunks according to the section fragmentation shown in FIG. 8B, section extension information may be configured as shown in the Table below.

TABLE 15

| | | | | | | |
|---|---|---|---|---|---|---|
| ef | | extType = X | | | 1 | Octet N |
| | | extLen = 0x7 (7 words) | | | 1 | N + 1 |
| | | numMcPrbc = A | | | 1 | N + 2 |
| periodFlag = 1 | mcPrbPeriod = 1 | numMcSymbolChunk = 2 | | | 1 | N + 3 |
| numMcSymbol = C | | mcSymbPeriod = 0 | | | | N + 4 |
| | | mcScaleReMask[11:4] | | | 1 | N + 5 |
| mcScaleReMask[3:0] | csf | mcScaleOffset [14:12] | | | 1 | N + 6 |
| | | mcScaleOffset [11:4] | | | 1 | N + 7 |
| mcScaleOffset [3:0] | | zero padding | | | 1 | N + 8 |
| numMcSymbol = D | | mcSymbPeriod = 0 | | | 1 | N + 9 |
| | | mcScaleReMask[11:4] | | | 1 | N + 10 |
| mcScaleReMask[3:0] | csf | mcScaleOffset [14:12] | | | 1 | N + 11 |
| | | mcScaleOffset [11:4] | | | 1 | N + 12 |
| mcScaleOffset [3:0] | | zero padding | | | 1 | N + 13 |
| | | numMcPrbc = B | | | 1 | N + 14 |
| periodFlag = 1 | mcPrbPeriod = 1 | numMcSymbolChunk = 2 | | | 1 | N + 15 |
| numMcSymbol = C | | mcSymbPeriod = 1 | | | | N + 16 |
| | | mcScaleReMask[11:4] | | | 1 | N + 17 |
| mcScaleReMask[3:0] | csf | mcScaleOffset [14:12] | | | 1 | N + 18 |
| | | mcScaleOffset [11:4] | | | 1 | N + 19 |
| mcScaleOffset [3:0] | | zero padding | | | 1 | N + 20 |
| numMcSymbol = D | | mcSymbPeriod = 1 | | | 1 | N + 21 |
| | | mcScaleReMask[11:4] | | | 1 | N + 22 |
| mcScaleReMask[3:0] | csf | mcScaleOffset [14:12] | | | 1 | N + 23 |
| | | mcScaleOffset [11:4] | | | 1 | N + 24 |
| mcScaleOffset [3:0] | | zero padding | | | 1 | N + 25 | symbols in the first PRB chunk and the corresponding symbol chunk. The first PRB chunk and the symbol chunk may indicate one MC chunk. 'mcScaleReMask' of octets N+4 to N+5 is a bitmap for Res in the PRB of the one MC chunk, and each bit setting of mcScaleReMask may indicate whether 'mcScaleOffset' and 'csf' are applicable to an RE transmitted through U-Plane message (e.g., '0'=not applicable, '1'=applicable). 'csf' of N+5 octet indicates whether the constellation is shifted for the one MC chunk, and 'mcScaleOffset' of N+5 octet to N+6 octet indicates a scale value for the one MC chunk. The scale value may be derived from 15-bits of the 'mcScaleOffset' field according to calculation of the Equations 3 to 4 as above.

'numMcSymbolChunks' for the second 'numMcPrbc' field indicates the number of one or more symbol chunks within the second PRB chunk. For example, the number of the one or more symbol chunks in the second PRB chunk may be 1. 'numMcSymbol' of N+3 octet indicates the number of PRBs in the second PRB chunk and the corresponding symbol chunk. The second PRB chunk and the symbol chunk may indicate another MC chunk. 'mcScaleReMask' of N+10 octet to N+11 octet is a bitmap In the example shown in FIG. 8B, a section 850 may be configured of 7 PRBs and 10 symbols, wherein it may be A=4, B=3, C=5, D=5.

According to the above Table and FIG. 8B, the first MC chunk 851 may be specified by 4 PRBs (A=4) and 5 symbols (C=5). Since 'mcPrbPeriod' is 1, an interval between PRBs among the 4 PRBs may be 1. For example, the first MC chunk 851 may occupy PRB #0, PRB #2, PRB #4, and PRB #6. Since 'mcSymbPeriod' is 0, an interval between two symbols among the five symbols may be 0. That is, the first MC chunk 851 may occupy 5 consecutive symbols. For example, the first MC chunk 851 may occupy symbol #0, symbol #1, symbol #2, symbol #3, and symbol #4.

According to the above Table and FIG. 8B, the second MC chunk 852 may be specified by 4 PRBs (A=4) and 5 symbols (D=5). Since 'mcPrbPeriod' is 1, an interval between PRBs among the 4 PRBs may be 1. For example, the second MC chunk 852 may occupy PRB #0, PRB #2, PRB #4, and PRB #6. Since 'mcSymbPeriod' is 0, an interval between two symbols among the five symbols may be 0. The second MC chunk 852 may occupy five consecutive symbols. For example, the second MC chunk 852 may occupy symbol #5, symbol #6, symbol #7, symbol #8, and symbol #9.

According to the above Table and FIG. 8B, the third MC chunk 853 may be specified by 3 PRBs (B=3) and 5 symbols (C=5). Since 'mcPrbPeriod' is 1, the interval between PRBs of the three PRBs may be 1. For example, the third MC chunk 853 may occupy PRB #1, PRB #3, and PRB #5. Since 'mcSymbPeriod' is 1, the interval between two symbols of the 5 symbols may be 1. The third MC chunk 853 may occupy 5 symbols. For example, the third MC chunk 853 may occupy symbol #0, symbol #2, symbol #4, symbol #6, and symbol #8.

According to the above Table and FIG. 8B, the fourth MC chunk 854 may be specified by 3 PRBs (B=3) and 5 symbols (D=5). Since 'mcPrbPeriod' is 1, the interval between PRBs of the three PRBs may be 1. For example, the fourth MC chunk 854 may occupy PRB #1, PRB #3, and PRB #5. Since 'mcSymbPeriod' is 1, the interval between two symbols of the five symbols may be 1. The fourth MC chunk 854 may occupy 5 symbols. For example, the fourth MC chunk 854 may occupy symbol #1, symbol #3, symbol #5, symbol #7, and symbol #8.

A format in which some areas of octets (e.g., octet N+7 in Table 14, octets N+8, N+13, N+20, N+25 in Table 15) corresponding to zero padding in the Tables 11 to 15 are reduced so that all the parameters are continuously disposed may also be understood as an embodiment of the disclosure.

Figure 9A:
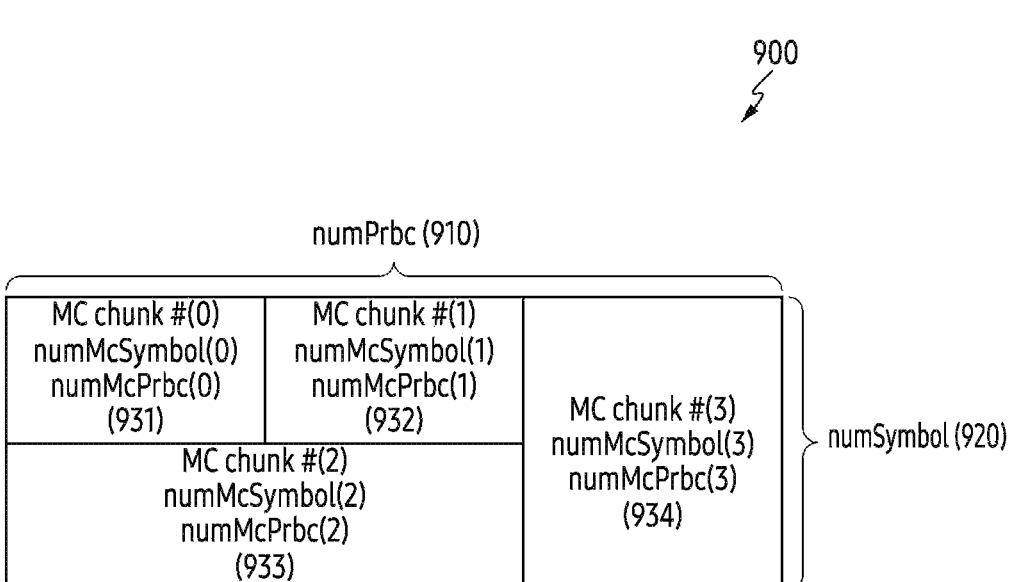
FIGS. 9A to 9B each show an example of a third scheme for partitioning a section according to various embodiments of the disclosure.
Figure 9B:

FIGS. 9A and 9B each show an example of a third scheme for partitioning a section according to various embodiments of the disclosure.

Referring to FIGS. 9A and 9B, one section may be divided into one or more MC chunks. Unlike the first scheme and the second scheme, the third scheme is a method in which MC chunks are configured in units of arbitrary PRB chunks and symbol chunks.

Referring to FIG. 9A, a section 900 may be specified by a resource area defined by a 'numPrbc' parameter 910 and a 'numSymbol' parameter 920. The 'numPrbc' parameter 910 indicates the number of PRBs. The 'numSymbol' parameter 920 indicates the number of symbols. The section 900 may be divided into a plurality of MC chunks. Hereinafter, for describing the MC chunk, use may be first made of the parameters for specifying the MC chunk. At least one or all of the parameters described below may be used to specify (or classify) the MC chunk. The following parameters may be exemplified, wherein parentheses right next to parameter names indicate examples of the number of bits.

numMcChunks(4b): The number of MC chunks.
startMcPrbc(10b): Start PRB for a chunk.
numMcPrbc(8b): The number of PRBs for a chunk. '0' indicates numPrbc.
mcPrbPeriod(2b): PRB chunk period. The parameter indicates whether every RB, every other RB (i.e. PRB interval of one PRB), every 2 RBs (i.e. PRB interval of two PRBs), or every 4 RBs (i.e. PRB interval of 4 PRBs) is used for a PRB chunk. It indicates 0=every RB, 1=every other RB, 2=every 2 RB, 3=every 4 RB. (can be absent when always every RB is used). [It indicates if every RBs, every other RBs, every 2 RBs, or every 4 RBs is used for a PRB chunk. 0=every RBs, 1=every other RBs, 2=every 2 RBs, 3=every 4 RBs. (can be absent when always every RB is used.)]

startMcSymbol(4b): Start symbol index for an MC chunk.
numMcSymbol(4b): The number of symbols for an MC chunk. '0' indicates numSymbol
mcSymbPeriod(2b): The parameter may indicate whether every symbol, every other symbol (i.e. symbol interval of one symbol), every 2 symbols (i.e. symbol interval of two symbols), or every 4 symbols (i.e., the symbol interval of 4 symbols) is used for a symbol chunk having the same symbol range. It indicates 0=all symbols, 1=all other symbols, 2=every 2 symbols, 3=every 4 symbols (can be absent when always every symbol is used.) [It indicates if every symbols, every other symbols, every 2 symbols, or every 4 symbols is used for a symbol chunk having the same symbol range. 0=every symbol, 1=every other symbol, 2=every 2 symbols, 3=every 4 symbols. (can be absent when always every symbol is used.)]

mcRemaskOnOff(1b): This indicates whether mcScaleRemask or MC chunk is present in the section extension. The format of section extension type of a C-plane message described below may be changed through this field (can be omitted) [This indicates there are mcScaleRemask in this section extension or MC chunk (can change format of section extension type with this field) (can be absent)]

numMcRemask(4b): This indicates the number of mcScaleRemasks in section extensions or MC chunk. (it may be omitted if all Res in MC chunk share the same CSF and the same modCompScaler) [This indicates the number of mcScaleRemask in this section extension or MC chunk (can be absent when all Res in a MC chunk shares the same CSF and modCompScaler).]

mcScaleReMask(12b): This indicates RE mask of each RE of a PRB which applies the corresponding csf/scaler.

periodFlag (1b): This indicates whether mcSymbolPeriod and mcPrbPeriod are used for each section extension or MC chunk (can be absent).

'numMcPRBChunks' indicates the number of PRB chunks in each symbol chunk. For example, the 'numMcPRBChunks' indicates the number of at least one PRB chunk in each symbol chunk. 'numMcPRBChunks' indicates the number of total MC chunks within a section extension. For example, the 'numMcPRBChunks' indicates the number of all MC chunks included in the section extension.

According to an embodiment, both of 'mcRemaskOnOff' and 'numMcRemask' may exist together in each section extension and/or MC chunk (e.g., symbol chunk or PRB chunk). According to an embodiment, only one of 'mcRemaskOnOff' and 'numMcRemask' may be exist in each section extension and/or MC chunk (e.g., symbol chunk or PRB chunk). According to an embodiment, 'mcRemaskOnOff' and 'numMcRemask' may be omitted in each section extension and/or MC chunk (e.g., symbol chunk or PRB chunk).

According to an embodiment, both of 'mcRemaskOnOff' and 'numMcRemask' may be included in each section extension (or MC chunk (e.g., symbol chunk or PRB chunk)). For example, all of 'mcRemaskOnOff' and 'numMcRemask' are included in each section extension. For example, all of 'mcRemaskOnOff' and 'numMcRemask' are included in each MC chunk (e.g., symbol chunk or PRB chunk).

According to an embodiment, at least one of 'mcRemaskOnOff' or 'numMcRemask' may be included in each section extension (or MC chunk (e.g., symbol chunk or PRB chunk)). For example, at least one of 'mcRemaskOnOff' or 'numMcRemask' are included in each section extension. For example, at least one of 'mcRemaskOnOff' and 'numMcRemask' are included in each MC chunk (e.g., symbol chunk or PRB chunk).

According to an embodiment, 'mcRemaskOnOff' and 'numMcRemask' may be omitted in each section extension (or MC chunk (e.g., symbol chunk or PRB chunk)). For example, 'mcRemaskOnOff' and 'numMcRemask' are included in a field distinct from a section extension (or MC chunk (e.g., symbol chunk or PRB chunk)).

When the resources are periodically allocated in the time domain within one section, a parameter for a symbol chunk (e.g., 'mcSymbolPeriod' parameter) may be defined. When the resources are allocated at regular intervals in the frequency domain within one section, a parameter for a PRB chunk (e.g., 'mcPrbPeriod' parameter) may be defined. In the above-described embodiments, the periodFlag value may or may not exist in each section extension or MC chunk (symbol chunk or PRB chunk) according to an embodiment. One flag parameter has been described in the above-described embodiments, but flag parameters for each of mcSymbolPeriod or mcPrbPeriod may separately exist, according to another embodiment.

A plurality of MC chunks may include a first MC chunk 931, a second MC chunk 932, a third MC chunk 933, and a fourth MC chunk 934. The first MC chunk 931 may be specified by numMcSymbol(0) and numMcPrbc(0). The second MC chunk 932 may be specified by numMcSymbol(1) and numMcPrbc(1). The third MC chunk 933 may be specified by numMcSymbol(2) and numMcPrbc(2). The fourth MC chunk 934 may be specified by numMcSymbol(3) and numMcPrbc(3).

The DU 210 may generate section extension information including at least one of the above parameters in order to indicate the MC chunk partitioned according to the first scheme. The DU 210 may transmit a C-plane message including the section extension information to the RU 220.

According to an embodiment, the DU 210 may configure a section 950 of FIG. 9B with three MC chunks, without using 'mcScaleReMask'. The section 950 may include a first MC chunk 931, a second MC chunk 932, and a third MC chunk 933. For example, in order to indicate the three MC chunks, the section extension information may be configured as shown in the Table below.

TABLE 16

| ef | extType = X | | 1 | Octet N |
|---|---|---|---|---|
| | extLen = 0x05 (5 words) | | 1 | N + 1 |
| numMcChunks = 3 | reserved | startMcPrbc(0) | 1 | N + 2 |
| | startMcPrbc(0) | | 1 | N + 3 |
| | numMcPrbc(0) | | 1 | N + 4 |
| startMcSymbol(0) | numMcSymbol(0) | | 1 | N + 5 |
| csf | modCompScaler[14:8] | | 1 | N + 6 |
| | modCompScaler[7:0] | | 1 | N + 7 |
| reserved | reserved | startMcPrbc(1) | 1 | N + 8 |
| | startMcPrbc(1) | | 1 | N + 9 |
| | numMcPrbc(1) | | 1 | N + 10 |
| startMcSymbol(1) | numMcSymbol(1) | | 1 | N + 11 |
| csf | modCompScaler[14:8] | | 1 | N + 12 |
| | modCompScaler[7:0] | | 1 | N + 13 |
| reserved | reserved | startMcPrbc(2) | 1 | N + 14 |
| | startMcPrbc(2) | | 1 | N + 15 |
| | numMcPrbc(2) | | 1 | N + 16 |
| startMcSymbol(2) | numMcSymbol(2) | | 1 | N + 17 |
| csf | modCompScaler[14:8] | | 1 | N + 18 |
| | modCompScaler[7:0] | | 1 | N + 19 |

The first MC chunk 931 may be specified by numMcSymbol(0) and numMcPrbc(0). A start symbol of one or more symbols of numMcSymbol(0) may be indicated by startMcSymbol(0). A start PRB of one or more PRBs of numMcPrbc(0) may be indicated by startMcPrbc(0). 'modCompScaler' of octets N+6 to N+7 indicates a scale value for the first MC chunk 931. The scale value may be derived from 15-bits of the 'modCompScaler' field according to the calculation of the Equations 1 to 2 as above.

The second MC chunk 932 may be specified by numMcSymbol(1) and numMcPrbc(1). A start symbol of one or more symbols of numMcSymbol(1) may be indicated by startMcSymbol(1). A start PRB of one or more PRBs of numMcPrbc(1) may be indicated by startMcPrbc(1). 'modCompScaler' of octets N+12 to N+13 indicates a scale value for the second MC chunk 932. The scale value may be derived from 15-bits of the 'modCompScaler' field according to the calculation of the Equations 1 to 2 as above.

The third MC chunk 933 may be specified by numMcSymbol(2) and numMcPrbc(2). A start symbol of one or more symbols of numMcSymbol(2) may be indicated by startMcSymbol(2). A start PRB of one or more PRBs of numMcPrbc(2) may be indicated by startMcPrbc(2). 'modCompScaler' of octets N+13 to N+14 indicates a scale value for the third MC chunk 933. The scale value may be derived from 15-bits of the 'modCompScaler' field according to the calculation of the Equations 1 to 2 as above.

According to an embodiment, the DU 210 may use 'mcScaleReMask' and configure the section 950 of FIG. 9B with three MC chunks. For example, in order to indicate the three MC chunks, the section extension information may be configured as shown in the Table below.

TABLE 17

| ef | extType = X | | | 1 | Octet N |
|---|---|---|---|---|---|
| | extLen = 0x07 (7 words) | | | 1 | N + 1 |
| numMcChunks = 3 | reserved | | startMcPrbc(0) | 1 | N + 2 |
| | startMcPrbc(0) | | | 1 | N + 3 |
| | numMcPrbc(0) | | | 1 | N + 4 |
| startMcSymbol(0) | | numMcSymbol(0) | | 1 | N + 5 |
| | mcScaleReMask[11:4] | | | 1 | N + 6 |
| mcScaleReMask[3:0] | csf | | mcScaleOffset [14:12] | 1 | N + 7 |
| | mcScaleOffset [11:4] | | | 1 | N + 8 |
| mcScaleOffset [3:0] | | zero padding | | 1 | N + 9 |
| reserved | reserved | | startMcPrbc(1) | 1 | N + 10 |
| | startMcPrbc(1) | | | 1 | N + 11 |
| | numMcPrbc(1) | | | 1 | N + 12 |
| startMcSymbol(1) | | numMcSymbol(1) | | 1 | N + 13 |
| | mcScaleReMask[11:4] | | | 1 | N + 14 |
| mcScaleReMask[3:0] | csf | | mcScaleOffset [14:12] | 1 | N + 15 |
| | mcScaleOffset [11:4] | | | 1 | N + 16 |
| mcScaleOffset [3:0] | | zero padding | | 1 | N + 17 |
| reserved | reserved | | startMcPrbc(2) | 1 | N + 18 |
| | startMcPrbc(2) | | | 1 | N + 19 |
| | numMcPrbc(2) | | | 1 | N + 20 |
| startMcSymbol(2) | | numMcSymbol(2) | | 1 | N + 21 |
| | mcScaleReMask[11:4] | | | 1 | N + 22 |
| mcScaleReMask[3:0] | csf | | mcScaleOffset [14:12] | 1 | N + 23 |
| | mcScaleOffset [11:4] | | | 1 | N + 24 |
| mcScaleOffset [3:0] | | zero padding | | 1 | N + 25 |
| | zero padding | | | 2 | N + 27 |

The first MC chunk 931 may be specified by numMcSymbol(0) and numMcPrbc(0). A start symbol of one or more symbols of numMcSymbol(0) may be indicated by startMcSymbol(0). A start PRB of one or more PRBs of numMcPrbc(0) may be indicated by startMcPrbc(0). 'mcScaleReMask' of octets N+6 to N+7 indicates masking information for the first MC chunk 931. 'csf' of octet N+7 indicates whether the constellation is shifted for the first MC chunk 931, and 'mcScaleOffset' of octets N+7 to N+9 indicates a scale value for the first MC chunk 931. The scale value may be derived from 15-bits of the 'mcScaleOffset' field according to the calculation of the Equations 3 to 4 as above.

The second MC chunk 932 may be specified by numMcSymbol(1) and numMcPrbc(1). A start symbol of one or more symbols of numMcSymbol(1) may be indicated by startMcSymbol(1). A start PRB of one or more PRBs of numMcPrbc(1) may be indicated by startMcPrbc(1).

'mcScaleReMask' of octets N+14 to N+15 indicates masking information for the second MC chunk 932. 'csf' of octet N+15 indicates whether the constellation is shifted for the second MC chunk 932, and 'mcScaleOffset' of octets N+15 to N+17 indicates a scale value for the second MC chunk 932. The scale value may be derived from 15-bits of the 'mcScaleOffset' field according to the calculation of the Equations 3 to 4.

The third MC chunk 933 may be specified by numMcSymbol(2) and numMcPrbc(2). A start symbol of one or more described in FIG. 9A in order to indicate each MC chunk partitioned according to the third scheme. The DU 210 may transmit a C-plane message including the section extension information to RU 220.

In order to indicate the three MC chunks, the section extension information may be configured as shown in the Table below. The periodFlag parameter may be omitted.

TABLE 18

| ef | | extType = X | | 1 | Octet N |
|---|---|---|---|---|---|
| | | extLen = 0x08 (8 words) | | 1 | N + 1 |
| | numMcChunks = 3 | mcPrbPeriod = 1 | startMcPrbc(0) | 1 | N + 2 |
| | | startMcPrbc(0) | | 1 | N + 3 |
| | | numMcPrbc(0) | | 1 | N + 4 |
| | startMcSymbol(0) | numMcSymbol(0) | | 1 | N + 5 |
| | mcSymbPeriod = 1 | zero padding | | 1 | N + 6 |
| | | mcScaleReMask[11:4] | | 1 | N + 7 |
| | mcScaleReMask[3:0] | csf | mcScaleOffset [14:12] | 1 | N + 8 |
| | | mcScaleOffset [11:4] | | 1 | N + 9 |
| | mcScaleOffset [3:0] | zero padding | | 1 | N + 10 |
| | reserved | mcPrbPeriod = 1 | startMcPrbc(1) | 1 | N + 11 |
| | | startMcPrbc(1) | | 1 | N + 12 |
| | | numMcPrbc(1) | | 1 | N + 13 |
| | startMcSymbol(1) | numMcSymbol(1) | | 1 | N + 14 |
| | mcSymbPeriod = 1 | zero padding | | 1 | N + 15 |
| | | mcScaleReMask[11:4] | | 1 | N + 16 |
| | mcScaleReMask[3:0] | csf | mcScaleOffset [14:12] | 1 | N + 17 |
| | | mcScaleOffset [11:4] | | 1 | N + 18 |
| | mcScaleOffset [3:0] | zero padding | | 1 | N + 19 |
| | reserved | mcPrbPeriod = 0 | startMcPrbc(2) | 1 | N + 20 |
| | | startMcPrbc(2) | | 1 | N + 21 |
| | | numMcPrbc(2) | | 1 | N + 22 |
| | startMcSymbol(2) | numMcSymbol(2) | | 1 | N + 23 |
| | mcSymbPeriod = 1 | zero padding | | 1 | N + 24 |
| | | mcScaleReMask[11:4] | | 1 | N + 25 |
| | mcScaleReMask[3:0] | csf | mcScaleOffset [14:12] | 1 | N + 26 |
| | | mcScaleOffset [11:4] | | 1 | N + 27 |
| | mcScaleOffset [3:0] | zero padding | | 1 | N + 28 |
| | | zero padding | | 2 | N + 29 | symbols of numMcSymbol(2) may be indicated by startMcSymbol(2). A start PRB of one or more PRBs of numMcPrbc(2) may be indicated by startMcPrbc(2). 'mcScaleReMask' of octets N+22 to N+23 indicates masking information for the third MC chunk 933. 'csf' of octet N+23 indicates whether the constellation is shifted for the 3$^{rd}$ MC chunk 933, and 'mcScaleOffset' of octets N+23 to N+24 indicates a scale value for the 3$^{rd}$ MC chunk 933. The scale value may be derived from 15-bits of the 'mcScaleOffset' field according to the calculation of the Equations 3 to 4 as above.

Figure 10:
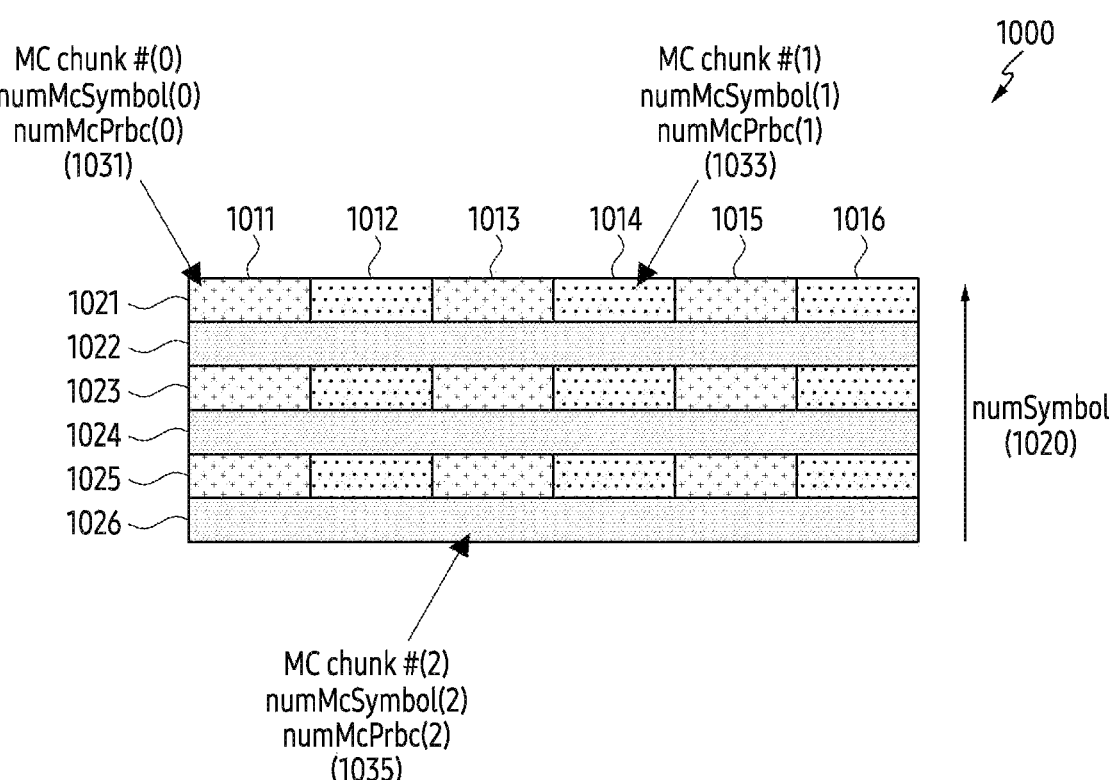
FIG. 10 shows an example of section fragmentation for periodic resource allocation according to an embodiment of the disclosure.

FIG. 10 shows an example of section fragmentation for a periodic resource allocation according to an embodiment of the disclosure. FIG. 10 describes a situation in which periodic resource allocation is applied in the section fragmentation using the third scheme.

Referring to FIG. 10, a section 1000 may be specified by a resource area defined by a 'numPrbc' parameter and a 'numSymbol' parameter 1020. For example, the 'numPrbc' parameter may indicate 6. The section 1000 may be configured of six PRBs 1011, 1012, 1013, 1014, 1015, and 1016. The section 1000 may include six symbols 1021, 1022, 1023, 1024, 1025, and 1026.

According to an embodiment, the DU 210 uses 'mcScaleReMask', 'mcPrbPeriod', and 'mcSymbolPeriod' to configure three MC chunks 1031, 1033 and 1035 within one section 1000. The DU 210 may generate section extension information including at least one of the parameters 'extType' indicates the type of section extension information. 'extLen' indicates the length of section extension information. 'numMcChunks' indicates the number of MC chunks. For example, 'numMcChunks' may be 3. The MC chunks may include a first MC chunk 1031, a second MC chunk 1033, and a third MC chunk 1035.

The first MC chunk 1031 may be specified by numMcSymbol(0) and numMcPrbc(0). A start symbol of one or more symbols of numMcSymbol(0) may be indicated by startMcSymbol(0). A start PRB of one or more PRBs of numMcPrbc(0) may be indicated by startMcPrbc(0). Since 'mcSymbPeriod' is 1, an interval between two symbols in the first MC chunk 1031 may be one symbol. Since 'mcPrbPeriod' is 1, an interval between PRBs in the first MC chunk 1031 may be one PRB.

The second MC chunk 1033 may be specified by numMcSymbol(2) and numMcPrbc(2). A start symbol of one or more symbols of numMcSymbol(2) may be indicated by startMcSymbol(2). A start PRB of one or more PRBs of numMcPrbc(1) may be indicated by startMcPrbc(1). Since 'mcSymbPeriod' is 1, an interval between two symbols in the second MC chunk 1033 may be one symbol. Since 'mcPrbPeriod' is 1, an interval between PRBs in the second MC chunk 1033 may be one PRB.

The third MC chunk 1035 may be specified by numMcSymbol(2) and numMcPrbc(2). A start symbol of one or more symbols of numMcSymbol(2) may be indicated by startMcSymbol(2). A start PRB of one or more PRBs of numMcPrbc(2) may be indicated by startMcPrbc(2). Here, since 'mcSymbPeriod' is 1, an interval between two symbols in the first MC chunk 1031 may be one symbol. Since 'mcPrbPeriod' is 0, the PRBs may be allocated consecutively in the first MC chunk 1031.

A format in which some areas of octets (e.g., octet N+9, N+17 in Table 17, octet N+6, N+10, N+19, N+24 in Table 18) corresponding to zero padding in Tables 16 to 18 are reduced so that all the parameters are continuously disposed may also be understood as an embodiment of the disclosure.

Although various examples of section extension information have been described according to the resource division schemes with reference to FIGS. 5A, 5B, 6, 7A, 7B, 8A, 8B, 9A, 9B, and 10, the embodiments of the disclosure are not limited thereto. In addition to such a designated scheme, a section fragmentation scheme using a format mode may be utilized. According to an embodiment, its mode parameter value may indicate a specific format of section extension information. For example, when the mode parameter value is 0, the section extension information having a format of Table 6 or Table 7 may be used. Further, for example, when the mode parameter value is 1, the section extension information having a format of Table 2 or Table 3 may be used. Further, for example, when the mode parameter value is 2, the section extension information having a format of Table 3 or Table 4 may be used.

When the mode parameter indicates 0, the section extension information shown in the Table below may be used.

TABLE 19

| ef | extType = X | 1 | Octet N |
|---|---|---|---|
| | extLen = 0x03 (3 words) | 1 | N + 1 |
| | mode = 0 | 1 | N + 2 |
| numMcSymbol | numMcPrbChunk = 2 | 1 | N + 3 |
| | numMcPrbc | 1 | N + 4 |
| csf | modCompScaler[14:8] | 1 | N + 5 |
| | modCompScaler[7:0] | 1 | N + 6 |
| | numMcPrbc | 1 | N + 7 |
| csf | modCompScaler[14:8] | 1 | N + 8 |
| | modCompScaler[7:0] | 1 | N + 9 |
| | Zero padding | 1 | N + 10 |
| | Zero padding | 1 | N + 11 |

In the section extension information having the format of Table 7, a field indicating a mode parameter may be added to an N+2 octet area. For descriptions of other parameters, reference may be made to Table 7 above and the description thereof.

When the mode parameter indicates 1, the section extension information shown in the Table below may be used.

TABLE 20

| ef | extType = X | 1 | Octet N |
|---|---|---|---|
| | extLen = 0x4 (4 words) | 1 | N + 1 |
| | mode = 1 | 1 | N + 2 |
| numMcSymbol | numMcPrbChunk = 2 | 1 | N + 3 |
| | numMcPrbc | 1 | N + 4 |
| | mcScaleReMask[11:4] | 1 | N + 5 |
| mcScaleReMask[3:0] | csf | mcScaleOffset [14:12] | 1 | N + 6 |
| | mcScaleOffset [11:4] | 1 | N + 7 |
| mcScaleOffset [3:0] | zero padding | 1 | N + 8 |
| | numMcPrbc | 1 | N + 9 |
| | mcScaleReMask[11:4] | 1 | N + 10 |
| mncScaleReMask[3:0] | csf | mcScaleOffset [14:12] | 1 | N + 11 |
| | mcScaleOffset [11:4] | 1 | N + 12 |
| mcScaleOffset [3:0] | zero padding | 1 | N + 13 |
| | zero padding | 1 | N + 14 |
| | zero padding | 1 | N + 15 |

In the section extension information having the format of Table 9, a field indicating a mode parameter may be added to an N+2 octet area. For descriptions of other parameters, reference may be made to Table 9 above and the description thereof. In Table 9, the 'numMcPrbChunk' parameter may be omitted.

According to an additional embodiment, a format in which some area of an octet (e.g., octet N+8) corresponding to zero padding in Tables 19 to 20 is reduced and all the parameters are continuously arranged may be also understood as an embodiment of the disclosure. With this arrangement, at least some of the parameters of Tables 19 to 20 may be omitted or the positions of the at least some of the parameters may be changed.

According to an additional embodiment, octets corresponding to zero padding in Tables 11 to 15 (e.g., octets N+7 in Table 14, octets N+8, N+13, N+20, N+25 in Table 15) may also be understood as an embodiment of the disclosure.

Figure 11:
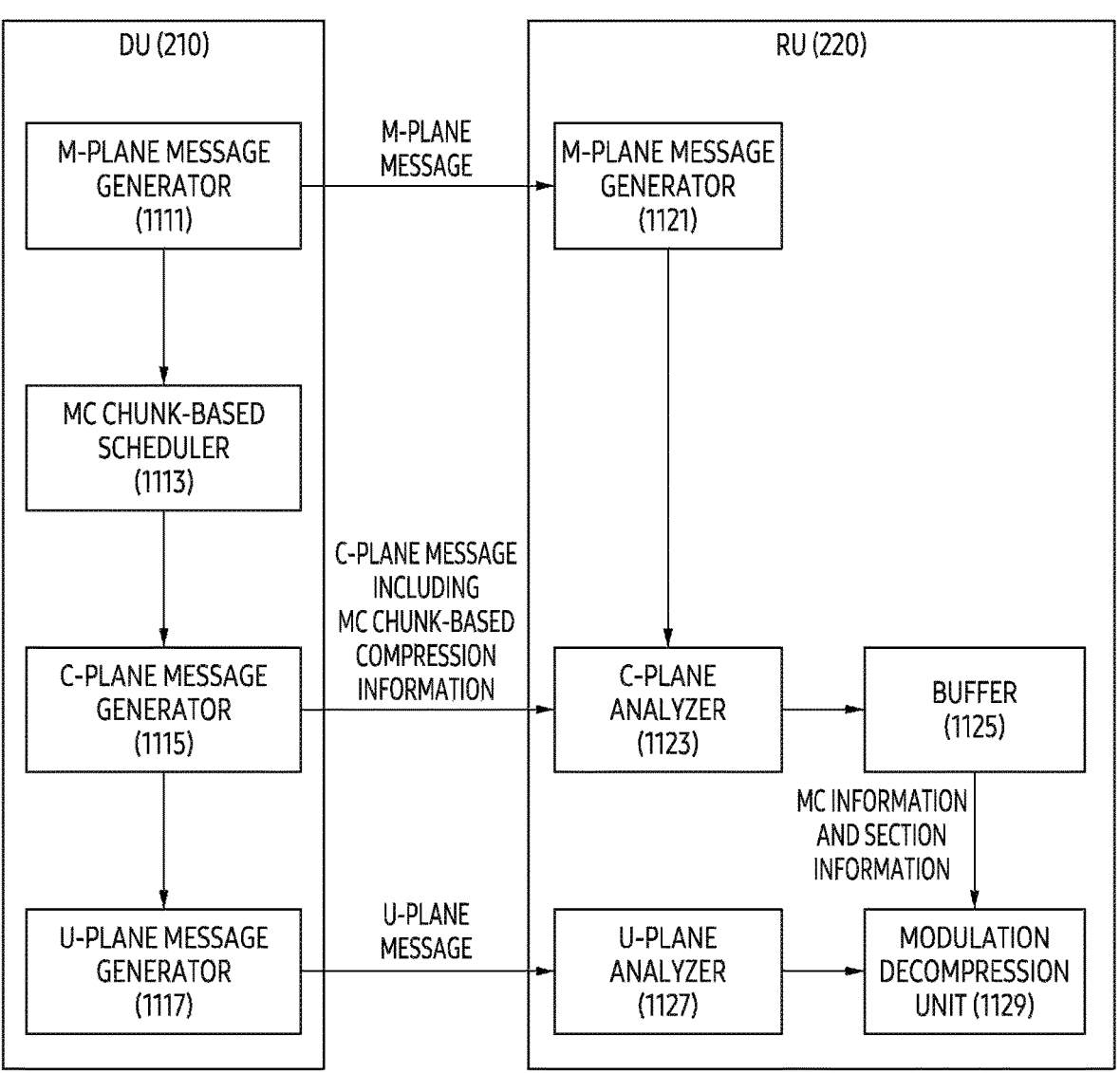
FIG. 11 illustrates an example of modulation compression for a subblock according to an embodiment of the disclosure.

FIG. 11 shows an example of modulation compression for a subblock, according to an embodiment of the disclosure.

Referring to FIG. 11, the DU 210 may include an M-plane message generator 1111, an MC chunk-based scheduler 1113, a C-plane message generator 1115, and a U-plane message generator 1117. The M-plane message generator 1111 may generate an M-plane message including at least one parameter required for a modulation compression scheme configured in units of MC chunks. The M-plane message generator 1111 may transmit the at least one parameter to the RU 220. According to an embodiment, the M-plane message generator 1111 may generate the M-plane message including information for indicating whether the DU 210 supports new section extension information (e.g., a format of one of Tables 6 to 20). Further, according to an embodiment, the M-plane message generator 1111 may generate the M-plane message including at least one of the parameters described with reference to FIGS. 7A, 7B, 8A, 8B, 9A and 9B. Thereafter, the DU 210 may transmit the M-plane message to the RU 220.

The MC chunk-based scheduler 1113 may perform scheduling on C-plane messages and U-plane messages according to the above-described modulation compression technique. The C-plane message generator 1115 may generate a C-plane message including section extension information according to the modulation compression technique described with reference to FIGS. 6, 7A, 7B, 8A, 8B, 9A, 9B and 10. The C-plane message generator 1115 may generate section extension information specific to an MC chunk constituting a partial area within one section. The section extension information may include resource area information (e.g., the number of symbols, the number of PRBs) for the MC chunk and modulation compression information to be applied to data occupied by the MC chunk. For example, the C-plane message generator 1115 may generate a C-plane message including section extension information having a format for indicating one or more MC chunks as shown in Tables 6 to 20. The U-plane message generator 1117 may generate a U-plane message including I component and Q component according to the modulation compression technique. The U-plane message may include data to be transmitted on an area occupied by the MC chunk.

The RU 220 may include an M-plane message generator 1121, a C-plane analyzer 1123, a buffer 1125, a U-plane analyzer 1127, and a modulation decompression unit 1129. The M-plane message generator 1121 may generate an M-plane message including at least one parameter required for a modulation compression technique configured in units of MC chunks. The M-plane message generator 1121 may transmit the at least one parameter to the DU 210. According to an embodiment, the M-plane message generator 1121 may generate an M-plane message including information for indicating whether the RU 220 supports new section extension information (e.g., a format of any one of Tables 6 to 20). Further, according to an embodiment, the M-plane message generator 1121 may generate an M-plane message including at least one of the parameters described with reference to FIGS. 7A, 7B, 8A, 8B, 9A, and 9B. Thereafter, the RU 220 may transmit the M-plane message to the DU 210.

The C-plane analyzer 1123 may receive a C-plane message from the DU 210. The C-plane analyzer 1123 may obtain parameter(s) related to the modulation compression from the section extension information (e.g., Tables 6 to 20) included in the C-plane message. The C-plane analyzer 1123 may obtain the parameter(s) related to the modulation compression for each MC chunk within one section. The C-plane analyzer 1123 may the obtain section information from the C-plane message. The C-plane analyzer 1123 may identify a time-frequency resource domain occupied by each MC chunk from the section extension information of the C-plane message. The C-plane analyzer 1123 may include modulation compression information ('modCompScaler', 'mcScaleReMask', 'mcScaleOffset') for data to be applied to the time-frequency resource domain. The C-plane analyzer 1123 may store the parameter(s) related to the modulation compression and the section information in the buffer 1125. The U-plane analyzer 1127 may receive a U-plane message from the DU 210. The U-plane analyzer 1127 may include I and Q components included in the U-plane message. The modulation decompression unit 1129 may obtain parameter(s) related to the modulation compression and the section information from the buffer 1125. The modulation decompression unit 1129 may obtain I and Q components from the U-plane analyzer 1127. The modulation decompression unit 1129 may obtain a bit string for the I component and a bit string for the Q component, based on the parameters related to the modulation compression. For example, when decompressing, the modulation decompression unit 1129 may 'unshift' the constellation according to the 'csf' value and apply a scale factor for a constellation type indicated in the section. One section has one or two modulation types. The modulation type may be inferred from the reMask bits. Each '1' bit in the reMask bits indicates a shift command ('csf') and a scale factor (e.g., 'modCompScaler', or 'mcScaleOffset' when using 'mcScaleReMask') for the Res of PRB.

Figure 12:
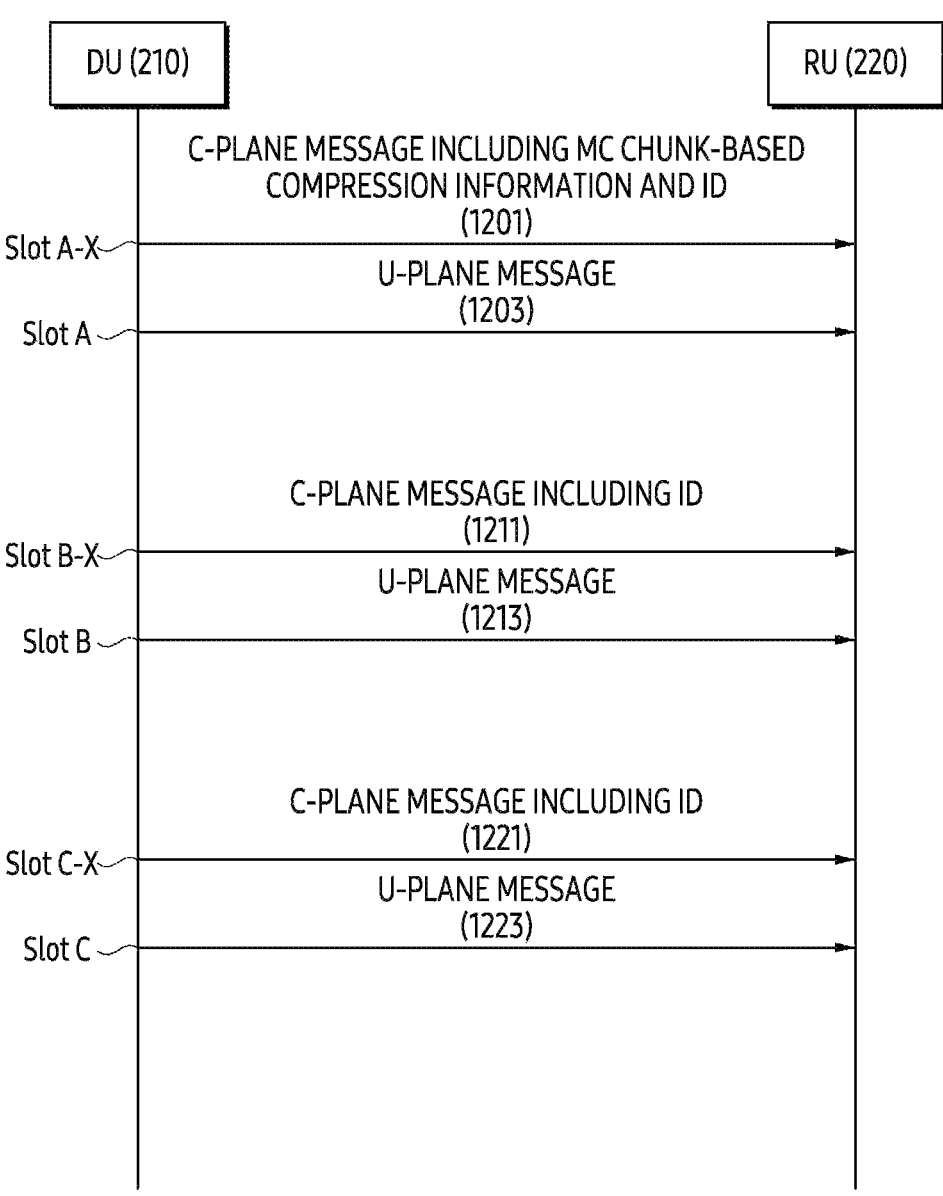
FIG. 12 illustrates an example of signaling between a DU and an RU for providing compression information using an identifier (ID) according to an embodiment of the disclosure.

FIG. 12 illustrates an example of signaling between a DU (e.g., DU 210) and an RU (e.g., RU 220) for providing compression information using an identifier (ID), according to an embodiment of the disclosure.

Referring to FIG. 12, the compression information may be specified for each subblock within one section. The subblock is a unit to which the modulation compression is applied and may be referred to as an MC chunk.

ID-based section extension information may be used. In this case, the ID may be associated with an MC chunk and modulation compression information for the MC chunk, in the above-described embodiments. With the ID, overhead due to the compression information repeated in data of a U-plane message may be reduced. A plurality of MC chunks may be configured within one section. Compression information (e.g., a constellation shift flag and a scaler value) may be allocated for each MC chunk. After the area information on the MC chunk (e.g., the number of symbols of MC chunk and the number of PRBs of MC chunk) and the modulation compression information on the MC chunk are transmitted once through the initial C-plane message, a subsequent indication of the area information and the modulation compression information on the MC chunk may be performed only with the ID. The section extension information including the ID may be newly defined.

Referring to FIG. 12, in operation 1201, the DU 210 may transmit a C-plane message including MC chunk-based compression information and an ID to the RU 220. For example, the C-plane message may be transmitted in slot A-X. The MC chunk-based compression information means compression information specific to an MC chunk. The section extension information of the C-plane message may include at least one parameter indicating the MC chunk (e.g., the number of symbols of MC chunk, the number of PRBs of MC chunk). The section extension information of the C-plane message may include compression information specific to the MC chunk (e.g., 'csf' parameter, 'modCompScaler' parameter, or 'mcScaleOffset' parameter). The section extension information of the C-plane message may include an ID associated with the compression information. According to an embodiment, the ID may be associated with compression information. Further, according to an embodiment, the ID may be associated with the compression information and the MC chunk.

The RU 220 may receive the ID value from the DU 210 and store the modulation compression information (e.g., constellation shift flag and scaler value) corresponding to the ID in a storage (e.g., buffer 1125, memory 370).

In operation 1203, the DU 210 may transmit a U-plane message including data to the RU 220. The U-plane message may be coupled with the C-plane message of operation 1201. For example, the C-plane message may be transmitted in slot A. The data may be transmitted on a scheduling area (e.g., MC chunk) of the C-plane message. The RU 220 may decompress the data based on the compression information of operation 1201. Although not shown in FIG. 12, the RU 220 may transmit the data obtained through the decompression to a terminal (e.g., terminal 120).

In operation 1211, the DU 210 may transmit the C-plane message including the ID to the RU 220. For example, the C-plane message may be transmitted in slot B-X. The DU 210 may transfer only the ID value to the RU 220, thereby providing the modulation compression information to the RU 220. The RU 220 may receive the ID value from the DU 210, and identify the modulation compression information (e.g., a constellation shift flag and a scaler value) corresponding to the ID stored in a storage (e.g., the buffer 1125 or the memory 370).

In operation 1213, the DU 210 may transmit the U-plane message including data to the RU 220. The U-plane message may be coupled with the C-plane message of operation 1211. For example, the C-plane message may be transmitted in slot B. The data may be transmitted on a scheduling area (e.g., MC chunk) of the C-plane message. The RU 220 may decompress the data, based on the modulation compression information (e.g., a constellation shift flag and a scaler value) corresponding to the ID.

In operation 1221, the DU 210 may transmit the C-plane message including the ID to the RU 220. For example, the C-plane message may be transmitted in slot C-X. The RU 220 may receive the ID value from the DU 210, and identify the modulation compression information (e.g., a constellation shift flag and scaler) corresponding to the ID stored in the storage (e.g., the buffer 1125 or the memory 370).

In operation 1223, the DU 210 may transmit the U-plane message including data to the RU 220. The U-plane message may be coupled with the C-plane message of operation 1221. For example, the C-plane message may be transmitted in slot C. The data may be transmitted on a scheduling area (e.g., MC chunk) of the C-plane message. The RU 220 may decompress the data, based on the modulation compression information (e.g., a constellation shift flag and a scaler value) corresponding to the ID.

According to an embodiment of the disclosure, the ID described in FIG. 12 may designate various information in addition to the modulation compression information. For example, at least one of the following parameters for the ID may be included in the section extension information.

mcInfoId: This parameter is configured with arbitrary N bits, designating csf and scaler information. For example, the scaler information may include a 'modCompScaler' parameter or a 'mcScaleOffset' parameter.

mcRemaskId: This parameter is configured with arbitrary M bits, designating remask information. For example, the remask information may include a 'mcScaleRemask' parameter.

mcId: This parameter is configured with arbitrary P bits, specifying csf, scaler, and remask information.

chunkandmcinfoId: This parameter is configured with arbitrary Q bits, designating resource area information and modulation compression information (e.g., csf and scaler information) of MC chunk. For example, the scaler information may include a 'modCompScaler' parameter or a 'mcScaleOffset' parameter.

Each ID may exist in all, exist only in part, or may be omitted, depending on an example. Further, the bitwidth (e.g., N, M, P, Q) of each of IDs may be predetermined based on the O-RAN standard or may be predetermined through a negotiating process of an M-plane message. The RU may require a storage device (e.g., a memory or a buffer) for storing the above-described ID and the compression information or masking information corresponding to the ID. Further, another ID for specifying at least one of the parameters described with reference to FIGS. 6, 7B, 8A, 8B, 9A, 9B, and 10 in addition to the above-described IDs may be used. Furthermore, an ID parameter of another definition may replace the IDs described above.

Provision of modulation compression information specific to some resource areas of a section makes it possible to reduce the amount of fronthaul transmission between a DU and an RU. Further, since additional section allocation is not required, a burden of packet processing in each of the DU and the RU can be reduced. Furthermore, when the modulation compression technique and other compression techniques are operated in a dynamic manner, any section fragmentation does not occur, therefor achieving efficient scheduling for configuring a section.

Effects that can be obtained in the disclosure are not limited to those mentioned above, and other effects not mentioned herein will be clearly understood by those skilled in the art from the foregoing and following description.

According to embodiments of the disclosure, a method performed by a distributed unit (DU) may include identifying a subblock in one section. The method may include generating a control plane (C-plane) message including section extension information including modulation compression information corresponding to the subblock. The method may include transmitting, to a radio unit (RU), the C-plane message through a fronthaul interface. The modulation compression information may include a flag for indicating whether a constellation for the subblock is shifted or not and scale information to be applied to the subblock. The section extension information may include information for indicating the number of one or more symbols of the subblock and information for indicating the number of one or more physical resource blocks (PRBs) of the subblock.

According to an embodiment, the one section may comprise a plurality of subblocks. The section extension information may include modulation compression information for an additional subblock different from the subblock, information indicating the number of one or more symbols of the additional subblock, and information indicating the number of one or more physical resource blocks (PRBs) of the additional subblock.

According to an embodiment, the subblock may include at least one of a first parameter indicating a period between symbols or a second parameter indicating an interval between the PRBs. Within the one section, the one or more symbols may be allocated to be separated by the period indicated by the first parameter. Within the one section, the one or more PRBs may be allocated to be separated by the interval indicated by the second parameter.

According to an embodiment, the section extension information may include identification information linked to the modulation compression information. The method may include transmitting another C-plane message including the identification information to the RU. The method may include transmitting a U-plane message coupled with the other C-plane message to the RU. Data of the U-plane message may be compressed based on the modulation compression information corresponding to the identification information.

According to an embodiment, the scale information may include 15 bits for indicating a scale value. Alternatively, the scale information may include 15 bits for indicating a scale value and 12 bits for indicating whether the scale value is applied for each resource element (RE) in a PRB.

According to embodiments of the disclosure, a method performed by a radio unit (RU) may include receiving, from a distributed unit (DU) through a fronthaul interface, a control plane (C-plane) message including section extension information. The method may include identifying modulation compression information corresponding to a subblock in one section. The modulation compression information may include a flag for indicating whether a constellation for the subblock is shifted or not and scale information to be applied to the subblock. The section extension information may include information for indicating the number of one or more symbols of the subblock and information for indicating the number of one or more physical resource blocks (PRBs) of the subblock.

According to an embodiment, the one section may include a plurality of subblocks. The section extension information may include modulation compression information for an additional subblock different from the subblock, information indicating the number of one or more symbols of the additional subblock, and information indicating the number of one or more physical resource blocks (PRBs) of the additional subblock.

According to an embodiment, the subblock may include at least one of a first parameter indicating a period between symbols or a second parameter indicating an interval between the PRBs. Within the one section, the one or more symbols may be allocated to be separated by the period indicated by the first parameter. Within the one section, the one or more PRB s may be allocated to be separated by the interval indicated by the second parameter.

According to an embodiment, the section extension information may include identification information linked to the modulation compression information. The method may include receiving another C-plane message including the identification information from the RU. The method may include receiving a U-plane message coupled with the other C-plane message from the RU. Data of the U-plane message may be decompressed based on the modulation compression information corresponding to the identification information.

According to an embodiment, the scale information may include 15 bits for indicating a scale value. Alternatively, the scale information may include 15 bits for indicating a scale value and 12 bits for indicating whether the scale value is applied for each resource element (RE) in a PRB.

According to embodiments of the disclosure, an electronic device of a distributed unit (DU) may include at least one transceiver, and at least one processor coupled to the at least one transceiver. The at least one processor may be configured to identify a subblock in one section, generate a control plane (C-plane) message including section extension information including modulation compression information corresponding to the subblock, and transmit, to a radio unit (RU), the C-plane message through a fronthaul interface. The modulation compression information may include a flag for indicating whether a constellation for the subblock is shifted or not and scale information to be applied to the subblock. The section extension information may include information for indicating the number of one or more symbols of the subblock and information for indicating the number of one or more physical resource blocks (PRBs) of the subblock.

According to an embodiment, the one section may include a plurality of subblocks. The section extension information may include modulation compression information for an additional subblock different from the subblock, information indicating the number of one or more symbols of the additional subblock, and information indicating the number of one or more physical resource blocks (PRBs) of the additional subblock.

According to an embodiment, the subblock may include at least one of a first parameter indicating a period between symbols or a second parameter indicating an interval between the PRBs. Within the one section, the one or more symbols may be allocated to be separated by the period indicated by the first parameter. Within the one section, the one or more PRBs may be allocated to be separated by the interval indicated by the second parameter.

According to an embodiment, the section extension information may include identification information linked to the modulation compression information. The at least one processor may be further configured to transmit another C-plane message including the identification information to the RU, and transmit a U-plane message coupled with the other C-plane message to the RU. Data of the U-plane message may be compressed based on the modulation compression information corresponding to the identification information.

According to an embodiment, the scale information may include 15 bits for indicating a scale value. Alternatively, the scale information may include 15 bits for indicating a scale value and 12 bits for indicating whether the scale value is applied for each resource element (RE) in a PRB.

According to embodiments of the disclosure, an electronic device of a radio unit (RU) may include at least one transceiver and at least one processor coupled to the at least one transceiver. The at least one processor may be configured to receive, from a distributed unit (DU) through a fronthaul interface, a control plane (C-plane) message including section extension information, and identify modulation compression information corresponding to a subblock in one section. The modulation compression information may include a flag for indicating whether a constellation for the subblock is shifted or not and scale information to be applied to the subblock. The section extension information may include information for indicating the number of one or more symbols of the subblock and information for indicating the number of one or more physical resource blocks (PRBs) of the subblock.

According to an embodiment, the one section may include a plurality of subblocks. The section extension information may include modulation compression information for an additional subblock different from the subblock, information indicating the number of one or more symbols of the additional subblock, and information indicating the number of one or more physical resource blocks (PRBs) of the additional subblock.

According to an embodiment, the subblock may include at least one of a first parameter indicating a period between symbols or a second parameter indicating an interval between the PRBs. Within the one section, the one or more symbols may be allocated to be separated by the period indicated by the first parameter. Within the one section, the one or more PRBs may be allocated to be separated by the interval indicated by the second parameter.

According to an embodiment, the section extension information may include identification information linked to the modulation compression information. The at least one processor may be further configured to receive another C-plane message including the identification information from the RU, and receive a U-plane message coupled with the other C-plane message from the RU. Data of the U-plane message may be decompressed based on the modulation compression information corresponding to the identification information.

According to an embodiment, the scale information may include 15 bits for indicating a scale value. Alternatively, the scale information may include 15 bits for indicating a scale value and 12 bits for indicating whether the scale value is applied for each resource element (RE) in a PRB.

According to an embodiment, the C-plane message may include the modulation compression information.

According to an embodiment, the processor is configured to receive a U-plane message from the DU, the U-plane message may include data associated with the C-plane message.

According to an embodiment, the processor is configured to decompress data included in the U-plane message based on the modulation compression information and transmit the decompressed data to a terminal.

According to embodiments of the disclosure, a method performed by a distributed unit (DU) is provided. The method comprises generating a control plane (C-plane) message including section extension information for modulation compression. The method comprises transmitting, to a radio unit (RU), the C-plane message through a fronthaul interface. The section extension information for the modulation compression includes information for indicating the number of one or more subblocks for the modulation compression, first symbol information for indicating one or more symbols of a first subblock of the one or more subblocks, first physical resource block (PRB) information for indicating one or more PRBs in the first subblock, a first flag for indicating whether a constellation for the first subblock is shifted or not, first scale offset information for indicating a first scale value to be applied to the first subblock, and first remask information for indicating whether the first scale value is applied for each resource element (RE) in a PRB in the first subblock.

According to an embodiment, the section extension information for the modulation compression further includes second symbol information for indicating one or more symbols of a second subblock of the one or more subblocks, second PRB information for indicating one or more PRBs in the second block, a second flag for indicating whether a constellation for the second subblock is shifted or not, second scale offset information for indicating a second scale value to be applied to the second subblock, and second reMask information for indicating whether the second scale value is applied for each resource element (RE) in a PRB in the second subblock.

According to an embodiment, wherein the first PRB information includes information for indicating a start PRB of the one or more PRBs of the first subblock, and information for indicating the number of the one or more PRBs of the first subblock.

According to an embodiment, the first symbol information indicates a position of each symbol of the one or more symbols of the first subblock.

According to an embodiment, the information for indicating the number of one or more subblocks for the modulation compression is indicated by four bits in the section extension information. The first flag is indicated by one bit in the section extension information. The first scale offset information is indicated by fifteen bits in the section extension information. The first remask information is indicated by twelve bits in the section information.

According to embodiments of the disclosure, a method performed by a radio unit (RU) is provided. The method comprises receiving, from a distributed unit through a fronthaul interface, a control plane (C-plane) message including section extension information for modulation compression. The section extension information for the modulation compression includes information for indicating the number of one or more subblocks for the modulation compression, first symbol information for indicating one or more symbols of a first subblock of the one or more subblocks, first physical resource block (PRB) information for indicating one or more PRBs in the first subblock, a first flag for indicating whether a constellation for the first subblock is shifted or not, first scale offset information for indicating a first scale value to be applied to the first subblock, and first remask information for indicating whether the first scale value is applied for each resource element (RE) in a PRB in the first subblock.

According to an embodiment, the section extension information for the modulation compression further includes second symbol information for indicating one or more symbols of a second subblock of the one or more subblocks, second PRB information for indicating one or more PRBs in the second block, a second flag for indicating whether a constellation for the second subblock is shifted or not, second scale offset information for indicating a second scale value to be applied to the second subblock, and second reMask information for indicating whether the second scale value is applied for each resource element (RE) in a PRB in the second subblock.

According to an embodiment, wherein the first PRB information includes information for indicating a start PRB of the one or more PRBs of the first subblock, and information for indicating the number of the one or more PRBs of the first subblock.

According to an embodiment, the first symbol information indicates a position of each symbol of the one or more symbols of the first subblock.

According to an embodiment, the information for indicating the number of one or more subblocks for the modulation compression is indicated by four bits in the section extension information. The first flag is indicated by one bit in the section extension information. The first scale offset information is indicated by fifteen bits in the section extension information. The first remask information is indicated by twelve bits in the section information.

According to embodiments of the disclosure, an electronic device of a distributed unit (DU) is provided. The electronic device comprises at least one transceiver for a fronthaul interface, at least one processor, and memory configured to store program instructions. The instructions, when executed by the at least one processor, cause the electronic device to perform functions comprising generating a control plane (C-plane) message including section extension information for modulation compression and transmitting, to a radio unit (RU), the C-plane message through the fronthaul interface. The section extension information for the modulation compression includes information for indicating the number of one or more subblocks for the modulation compression, first symbol information for indicating one or more symbols of a first subblock of the one or more subblocks, first physical resource block (PRB) information for indicating one or more PRBs in the first subblock, a first flag for indicating whether a constellation for the first subblock is shifted or not, first scale offset information for indicating a first scale value to be applied to the first subblock, and first remask information for indicating whether the first scale value is applied for each resource element (RE) in a PRB in the first subblock.

According to an embodiment, the section extension information for the modulation compression further includes second symbol information for indicating one or more symbols of a second subblock of the one or more subblocks, second PRB information for indicating one or more PRBs in the second block, a second flag for indicating whether a constellation for the second subblock is shifted or not, second scale offset information for indicating a second scale value to be applied to the second subblock, and second reMask information for indicating whether the second scale value is applied for each resource element (RE) in a PRB in the second subblock.

According to an embodiment, wherein the first PRB information includes information for indicating a start PRB of the one or more PRBs of the first subblock, and information for indicating the number of the one or more PRBs of the first subblock.

According to an embodiment, the first symbol information indicates a position of each symbol of the one or more symbols of the first subblock.

According to an embodiment, the information for indicating the number of one or more subblocks for the modulation compression is indicated by four bits in the section extension information. The first flag is indicated by one bit in the section extension information. The first scale offset information is indicated by fifteen bits in the section extension information. The first remask information is indicated by twelve bits in the section information.

According to embodiments of the disclosure, an electronic device of a radio unit (RU) is provided. The electronic device comprises at least one transceiver for a fronthaul interface, at least one processor, and memory configured to store program instructions. The instructions, when executed by the at least one processor, cause the electronic device to perform functions comprising receiving, from a distributed unit (DU) through the fronthaul interface, a control plane (C-plane) message including section extension information for modulation compression. The section extension information for the modulation compression includes information for indicating the number of one or more subblocks for the modulation compression, first symbol information for indicating one or more symbols of a first subblock of the one or more subblocks, first physical resource block (PRB) information for indicating one or more PRBs in the first subblock, a first flag for indicating whether a constellation for the first subblock is shifted or not, first scale offset information for indicating a first scale value to be applied to the first subblock, and first remask information for indicating whether the first scale value is applied for each resource element (RE) in a PRB in the first subblock.

According to an embodiment, the section extension information for the modulation compression further includes second symbol information for indicating one or more symbols of a second subblock of the one or more subblocks, second PRB information for indicating one or more PRBs in the second block, a second flag for indicating whether a constellation for the second subblock is shifted or not, second scale offset information for indicating a second scale value to be applied to the second subblock, and second reMask information for indicating whether the second scale value is applied for each resource element (RE) in a PRB in the second subblock.

According to an embodiment, wherein the first PRB information includes information for indicating a start PRB of the one or more PRBs of the first subblock, and information for indicating the number of the one or more PRBs of the first subblock.

According to an embodiment, the first symbol information indicates a position of each symbol of the one or more symbols of the first subblock.

According to an embodiment, the information for indicating the number of one or more subblocks for the modulation compression is indicated by four bits in the section extension information. The first flag is indicated by one bit in the section extension information. The first scale offset information is indicated by fifteen bits in the section extension information. The first remask information is indicated by twelve bits in the section information.

According to embodiments of the disclosure, a non-transitory computer-readable medium comprising memory storing a program including instructions is provided. When the instructions are executed by one or more processors, the instructions cause a distributed unit (DU) to generate a control plane (C-plane) message including section extension information for modulation compression and transmitting, to a radio unit (RU), the C-plane message through a fronthaul interface. The section extension information for modulation compression includes information for indicating the number of one or more subblocks for the modulation compression, first symbol information for indicating one or more symbols of a first subblock of the one or more subblocks, first physical resource block (PRB) information for indicating one or more PRBs in the first subblock, a first flag for indicating whether a constellation for the first subblock is shifted or not, first scale offset information for indicating a first scale value to be applied to the first subblock, and first remask information for indicating whether the first scale value is applied for each resource element (RE) in a PRB in the first subblock.

According to embodiments of the disclosure, a non-transitory computer-readable medium comprising memory storing a program including instructions is provided. When the instructions are executed by one or more processors, the instructions cause a radio unit (RU) to receive, from a distributed unit (DU) through a fronthaul interface, a control plane (C-plane) message including section extension information for modulation compression. The section extension information for modulation compression includes information for indicating the number of one or more subblocks for the modulation compression, first symbol information for indicating one or more symbols of a first subblock of the one or more subblocks, first physical resource block (PRB) information for indicating one or more PRBs in the first subblock, a first flag for indicating whether a constellation for the first subblock is shifted or not, first scale offset information for indicating a first scale value to be applied to the first subblock, and first remask information for indicating whether the first scale value is applied for each resource element (RE) in a PRB in the first subblock.

Various embodiments of the disclosure may be implemented as software including one or more instructions stored in a storage medium readable by a machine. It can be. For example, a processor of the machine calls at least one command among one or more instructions stored from a storage medium and enables the machine to be operated to perform at least one function according to the called at least one instruction. The one or more instructions comprises a code generated by a compiler or code executable by an interpreter. The storage medium readable by the machine may be provided in the form of a non-transitory storage medium. The term 'non-transitory' refers that the storage medium is tangible and does not contain signals (e.g., electromagnetic waves), and the term does not distinguish between the case where data is stored semi-permanently and temporarily stored in the storage medium. O-RAN makes it possible to configure a virtualized intelligent network with standardized open interfaces. For network virtualization, operations according to embodiments may be implemented in the form of a recording medium (e.g., memory).

According to an embodiment, the method according to various embodiments of the disclosure may be included and provided in a computer program product. The computer program product may be traded between sellers and buyers as commodities. The computer program product is distributed in the form of a device-readable storage medium (e.g., compact disc read only memory (CD-ROM)), or distributed (e.g., downloaded or uploaded) on online through an application store (e.g., Play Store™) or between two user devices (e.g., smart phones) directly. In the case of online distribution, at least part of the computer program product may be temporarily stored or temporarily created in a storage medium readable by a device such as a manufacturer's server, an application store server, or a relay server's memory.

According to various embodiments, each component (e.g., module or program) of the above-described components may include a single entity or a plurality of entities, and some of the plurality of entities may be separately disposed in other components. According to various embodiments, one or more components or operations among the aforementioned corresponding components may be omitted, or one or more other components or operations may be added. Alternatively or additionally, a plurality of components (e.g., modules or programs) may be integrated into a single component. In this case, the integrated component may perform one or more functions of each of the plurality of components identically or similarly to those performed by a corresponding component of the plurality of components prior to the integration. According to various embodiments, the operations performed by a module, program, or other component are executed sequentially, in parallel, iteratively, or heuristically, or one or more of the operations are executed in a different order, or omitted. or one or more other actions may be added.

The methods according to various embodiments described in the claims and/or the specification of the disclosure may be implemented in hardware, software, or a combination of hardware and software.

When implemented by software, a computer-readable storage medium storing one or more programs (software modules) may be provided. One or more programs stored in such a computer-readable storage medium are configured for execution by one or more processors in an electronic device. The one or more programs include instructions that cause the electronic device to execute the methods according to embodiments described in the claims or specification of the disclosure.

Such a program (e.g., software module, software) may be stored in a random-access memory, a non-volatile memory including a flash memory, a read only memory (ROM), an electrically erasable programmable read only memory (EE-PROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of these components. Further, respective constituent memories may be provided in a multiple number.

Further, the program may be stored in an attachable storage device that can be accessed via a communication network such as e.g., Internet, Intranet, local area network (LAN), wide area network (WAN), or storage area network (SAN), or a communication network configured with a combination thereof. Such a storage device may access an apparatus performing an embodiment of the disclosure through an external port. Further, a separate storage device on the communication network may be accessed to an apparatus performing an embodiment of the disclosure.

In the above-described specific embodiments of the disclosure, a component included therein may be expressed in a singular or plural form according to a specific embodiment presented. However, such a singular or plural expression may be selected to better suit the situation presented, for the convenience of description, and the disclosure is not limited to the singular or plural component(s). Therefore, even any component expressed in the plural form may be configured of a singular component, or even any component expressed in the singular form may be configured of plural components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a distributed unit (DU), the method comprising;

generating a control plane (C-plane) message including section information and section extension information for modulation compression; and transmitting, to a radio unit (RU), the C-plane message through a fronthaul interface, wherein the section extension information for the modulation compression includes:

information for indicating the number of one or more subblocks for the modulation compression in a resource area indicated by the section information, symbol information for indicating one or more symbols of a first subblock of the one or more subblocks, information for indicating a start physical resource block (PRB) of one or more PRBs of the first subblock, information for indicating the number of the one or more PRBs of the first subblock, a flag for indicating whether a constellation for the first subblock is shifted or not, scale offset information for indicating a first scale value to be applied to the first subblock, and remask information for indicating whether the first scale value is applied for each resource element (RE) in a PRB in the first subblock.

2. The method of claim 1, wherein the section extension information for the modulation compression further includes:

symbol information for indicating one or more symbols of a second subblock of the one or more subblocks, information for indicating a start PRB of one or more PRBs of the second subblock, information for indicating the number of the one or more PRBs of the second subblock, a flag for indicating whether a constellation for the second subblock is shifted or not, scale offset information for indicating a second scale value to be applied to the second subblock, and reMask information for indicating whether the second scale value is applied for each RE in a PRB in the second subblock.

3. The method of claim 1, further comprising:

receiving, from the RU, a management plane (M-plane) message including information for indicating that the RU supports the section extension information for specifying the first subblock based on the information for indicating the start PRB of the one or more PRBs of the first subblock and the information for indicating the number of the one or more PRBs of the first subblock.

4. The method of claim 1, wherein the section information includes a mode parameter indicating a first value among the first value and a second value different from the first value, wherein, in case that the mode parameter indicates the first value, the section extension information is configured to include the information for indicating the start PRB of the one or more PRBs of the first subblock and the information for indicating the number of the one or more PRBs of the first subblock, and wherein, in case that the mode parameter indicates the second value, the section extension information is configured to not include the information for indicating the start PRB of the one or more PRBs of the first subblock and the information for indicating the number of the one or more PRBs of the first subblock.

5. The method of claim 1, wherein the symbol information indicates a position of each symbol of the one or more symbols of the first subblock, wherein the information for indicating the number of one or more subblocks for the modulation compression is indicated by four bits in the section extension information, wherein the flag is indicated by one bit in the section extension information, wherein the scale offset information is indicated by fifteen bits in the section extension information, and wherein the remask information is indicated by twelve bits in the section information.

6. A method performed by a radio unit (RU), the method comprising:

receiving, from a distributed unit (DU) through a fronthaul interface, a control plane (C-plane) message including section information and section extension information for modulation compression, wherein the section extension information for the modulation compression includes:

information for indicating the number of one or more subblocks for the modulation compression in a resource area indicated by the section information, symbol information for indicating one or more symbols of a first subblock of the one or more subblocks, information for indicating a start physical resource block (PRB) of one or more PRBs of the first subblock, information for indicating the number of the one or more PRBs of the first subblock, a flag for indicating whether a constellation for the first subblock is shifted or not, scale offset information for indicating a first scale value to be applied to the first subblock, and remask information for indicating whether the first scale value is applied for each resource element (RE) in a PRB in the first subblock.

7. The method of claim 6, wherein the section extension information for the modulation compression further includes:

symbol information for indicating one or more symbols of a second subblock of the one or more subblocks, information for indicating a start PRB of one or more PRBs of the second subblock, information for indicating the number of the one or more PRBs of the second subblock, a flag for indicating whether a constellation for the second subblock is shifted or not, scale offset information for indicating a second scale value to be applied to the second subblock, and reMask information for indicating whether the second scale value is applied for each RE in a PRB in the second subblock.

8. The method of claim 6, further comprising:

transmitting, to the DU, a management plane (M-plane) message including information for indicating that the RU supports the section extension information for specifying the first subblock based on the information for indicating the start PRB of the one or more PRBs of the first subblock and the information for indicating the number of the one or more PRBs of the first subblock.

9. The method of claim 6, wherein the section information includes a mode parameter indicating a first value among the first value and a second value different from the first value, wherein, in case that the mode parameter indicates the first value, the section extension information is configured to include the information for indicating the start PRB of the one or more PRBs of the first subblock and the information for indicating the number of the one or more PRBs of the first subblock, and wherein, in case that the mode parameter indicates the second value, the section extension information is configured to not include the information for indicating the start PRB of the one or more PRBs of the first subblock and the information for indicating the number of the one or more PRBs of the first subblock.

10. The method of claim 6, wherein the symbol information indicates a position of each symbol of the one or more symbols of the first subblock, wherein the information for indicating the number of one or more subblocks for the modulation compression is indicated by four bits in the section extension information, wherein the flag is indicated by one bit in the section extension information, wherein the scale offset information is indicated by fifteen bits in the section extension information, and wherein the remask information is indicated by twelve bits in the section information.

11. An electronic device configured to perform functions of a distributed unit (DU), the electronic device comprising:

at least one transceiver for a fronthaul interface;

at least one processor; and memory storing instructions that, when executed by the at least one processor, cause the electronic device to perform operations including:

generating a control plane (C-plane) message including section information and section extension information for modulation compression; and transmitting, to a radio unit (RU), the C-plane message through the fronthaul interface, wherein the section extension information for the modulation compression includes:

information for indicating the number of one or more subblocks for the modulation compression in a resource area indicated by the section information, symbol information for indicating one or more symbols of a first subblock of the one or more subblocks, information for indicating a start physical resource block (PRB) of one or more PRBs of the first subblock, information for indicating the number of the one or more PRBs of the first subblock, a flag for indicating whether a constellation for the first subblock is shifted or not, scale offset information for indicating a first scale value to be applied to the first subblock, and remask information for indicating whether the first scale value is applied for each resource element (RE) in a PRB in the first subblock.

12. The electronic device of claim 11, wherein the section extension information for the modulation compression further includes:

symbol information for indicating one or more symbols of a second subblock of the one or more subblocks, information for indicating a start PRB of one or more PRBs of the second subblock, information for indicating the number of the one or more PRBs of the second subblock, a flag for indicating whether a constellation for the second subblock is shifted or not, scale offset information for indicating a second scale value to be applied to the second subblock, and remask information for indicating whether the second scale value is applied for each RE in a PRB in the second subblock.

13. The electronic device of claim 11, wherein the instructions, when executed by the at least one processor, cause the electronic device to:

receive, from the RU, a management plane (M-plane) message including information for indicating that the RU supports the section extension information for specifying the first subblock based on the information for indicating the start PRB of the one or more PRBs of the first subblock and the information for indicating the number of the one or more PRBs of the first subblock.

14. The electronic device of claim 11, wherein the section information includes a mode parameter indicating a first value among the first value and a second value different from the first value, wherein, in case that the mode parameter indicates the first value, the section extension information is configured to include the information for indicating the start PRB of the one or more PRBs of the first subblock and the information for indicating the number of the one or more PRBs of the first subblock, and wherein, in case that the mode parameter indicates the second value, the section extension information is configured to not include the information for indicating the start PRB of the one or more PRBs of the first subblock and the information for indicating the number of the one or more PRBs of the first subblock.

15. The electronic device of claim 11, wherein the symbol information indicates a position of each symbol of the one or more symbols of the first subblock, wherein the information for indicating the number of one or more subblocks for the modulation compression is indicated by four bits in the section extension information, wherein the flag is indicated by one bit in the section extension information, wherein the scale offset information is indicated by fifteen bits in the section extension information, and wherein the remask information is indicated by twelve bits in the section information.

16. An electronic device configured to perform functions of a radio unit (RU), the electronic device comprising:

at least one transceiver for a fronthaul interface;

at least one processor; and memory storing instructions that, when executed by the at least one processor, cause the electronic device to perform operations including:

receiving, from a distributed unit (DU) through the fronthaul interface, a control plane (C-plane) message including section information and section extension information for modulation compression, wherein the section extension information for the modulation compression includes:

information for indicating the number of one or more subblocks for the modulation compression in a resource area indicated by the section information, symbol information for indicating one or more symbols of a first subblock of the one or more subblocks, information for indicating a start physical resource block (PRB) of one or more PRBs of the first subblock, information for indicating the number of the one or more PRBs of the first subblock, a flag for indicating whether a constellation for the first subblock is shifted or not, scale offset information for indicating a first scale value to be applied to the first subblock, and remask information for indicating whether the first scale value is applied for each resource element (RE) in a PRB in the first subblock.

17. The electronic device of claim 16, wherein the section extension information for the modulation compression further includes:

second symbol information for indicating one or more symbols of a second subblock of the one or more subblocks, information for indicating a start PRB of one or more PRBs of the second subblock, information for indicating the number of the one or more PRBs of the second subblock, a flag for indicating whether a constellation for the second subblock is shifted or not, scale offset information for indicating a second scale value to be applied to the second subblock, and remask information for indicating whether the second scale value is applied for each RE in a PRB in the second subblock.

18. The electronic device of claim 16, wherein the instructions, when executed by the at least one processor, cause the electronic device to:

transmit, to the DU, a management plane (M-plane) message including information for indicating that the RU supports the section extension information for specifying the first subblock based on the information for indicating the start PRB of the one or more PRBs of the first subblock and the information for indicating the number of the one or more PRBs of the first subblock.

19. The electronic device of claim 16, wherein the section information includes a mode parameter indicating a first value among the first value and a second value different from the first value, wherein, in case that the mode parameter indicates the first value, the section extension information is configured to include the information for indicating the start PRB of the one or more PRBs of the first subblock and the information for indicating the number of the one or more PRBs of the first subblock, and wherein, in case that the mode parameter indicates the second value, the section extension information is configured to not include the information for indicating the start PRB of the one or more PRBs of the first subblock and the information for indicating the number of the one or more PRBs of the first subblock.

20. The electronic device of claim 16, wherein the symbol information indicates a position of each symbol of the one or more symbols of the first subblock, wherein the information for indicating the number of one or more subblocks for the modulation compression is indicated by four bits in the section extension information, wherein the flag is indicated by one bit in the section extension information, wherein the scale offset information is indicated by fifteen bits in the section extension information, and wherein the remask information is indicated by twelve bits in the section information.

21. A non-transitory computer-readable medium comprising memory configured to store program instructions, wherein the program instructions, when executed by one or more processors, cause a distributed unit (DU) to perform functions including:

generating a control plane (C-plane) message including section information and section extension information for modulation compression; and transmitting, to a radio unit (RU), the C-plane message through a fronthaul interface, wherein the section extension information for the modulation compression includes:

information for indicating the number of one or more subblocks for the modulation compression in a resource area indicated by the section information, symbol information for indicating one or more symbols of a first subblock of the one or more subblocks, information for indicating a start physical resource block (PRB) of one or more PRBs of the first subblock, information for indicating the number of the one or more PRBs of the first subblock, a flag for indicating whether a constellation for the first subblock is shifted or not, scale offset information for indicating a first scale value to be applied to the first subblock, and remask information for indicating whether the first scale value is applied for each resource element (RE) in a PRB in the first subblock.

22. A non-transitory computer-readable medium comprising memory configured to store program instructions, wherein the program instructions, when executed by one or more processors, cause a radio unit (RU) to perform functions including:

receiving, from a distributed unit (DU) through a fronthaul interface, a control plane (C-plane) message including section information and section extension information for modulation compression, wherein the section extension information for the modulation compression includes:

information for indicating the number of one or more subblocks for the modulation compression in a resource area indicated by the section information, symbol information for indicating one or more symbols of a first subblock of the one or more subblocks, information for indicating a start physical resource block (PRB) of one or more PRBs of the first subblock, information for indicating the number of the one or more PRBs of the first subblock, a flag for indicating whether a constellation for the first subblock is shifted or not, scale offset information for indicating a first scale value to be applied to the first subblock, and remask information for indicating whether the first scale value is applied for each resource element (RE) in a PRB in the first subblock.

* * * * *